(12) United States Patent
Asami

(10) Patent No.: US 8,670,192 B2
(45) Date of Patent: Mar. 11, 2014

(54) IMAGING LENS AND IMAGING APPARATUS

(71) Applicant: Fujifilm Corporation, Tokyo (JP)

(72) Inventor: Taro Asami, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/907,003

(22) Filed: May 31, 2013

(65) Prior Publication Data

US 2013/0258492 A1 Oct. 3, 2013

Related U.S. Application Data

(63) Continuation of application No. PCT/JP2011/007141, filed on Dec. 20, 2011.

(30) Foreign Application Priority Data

Dec. 21, 2010 (JP) ................................ 2010-284363

(51) Int. Cl.
*G02B 9/60* (2006.01)
(52) U.S. Cl.
USPC ........................................................ 359/770
(58) Field of Classification Search
USPC ................................................. 359/763, 770
See application file for complete search history.

(56) References Cited

U.S. PATENT DOCUMENTS

| 5,278,698 | A | 1/1994 | Iisuka et al. |
| 6,940,662 | B2 | 9/2005 | Sekita |
| 7,911,712 | B2 * | 3/2011 | Kitahara et al. ............... 359/770 |
| 2009/0244723 | A1 | 10/2009 | Kitakata et al. |
| 2010/0103537 | A1 | 4/2010 | Kitahara et al. |

FOREIGN PATENT DOCUMENTS

| JP | S63-070817 | 3/1988 |
| JP | H05-045582 | 2/1993 |
| JP | H10-213742 | 8/1998 |
| JP | H11-084230 | 3/1999 |
| JP | H11-142730 | 5/1999 |
| JP | 2000-066091 | 3/2000 |
| JP | 2002-072095 | 3/2002 |
| JP | 2003-131126 | 5/2003 |
| JP | 2004-069778 | 3/2004 |
| JP | 2008-008960 | 1/2008 |
| JP | 2009-210596 | 9/2009 |
| JP | 2009-230041 | 10/2009 |
| JP | 2010-197599 | 9/2010 |

* cited by examiner

*Primary Examiner* — Joseph P Martinez
(74) *Attorney, Agent, or Firm* — Young & Thompson

(57) ABSTRACT

An imaging lens consists of a negative first lens having a concave object-side surface, a positive second lens, a negative third lens, a positive fourth lens having a convex object-side surface, and a positive fifth lens, which are in this order from an object side. A stop is arranged between an image-side surface of the first lens and an object-side surface of the third lens. When the focal length of an entire system is f, and the focal length of the first lens is f1, and the focal length of the second lens is f2, the following formula is satisfied:

$$-1.30 < f1/f2 > -0.65 \qquad (7).$$

16 Claims, 22 Drawing Sheets

FIG.3
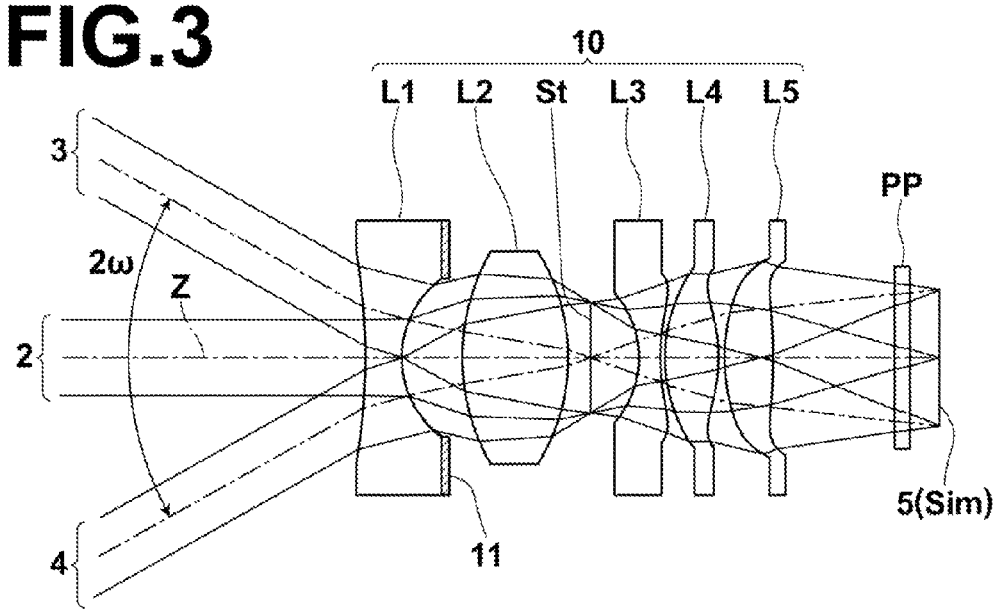
FIG.4   EXAMPLE 1
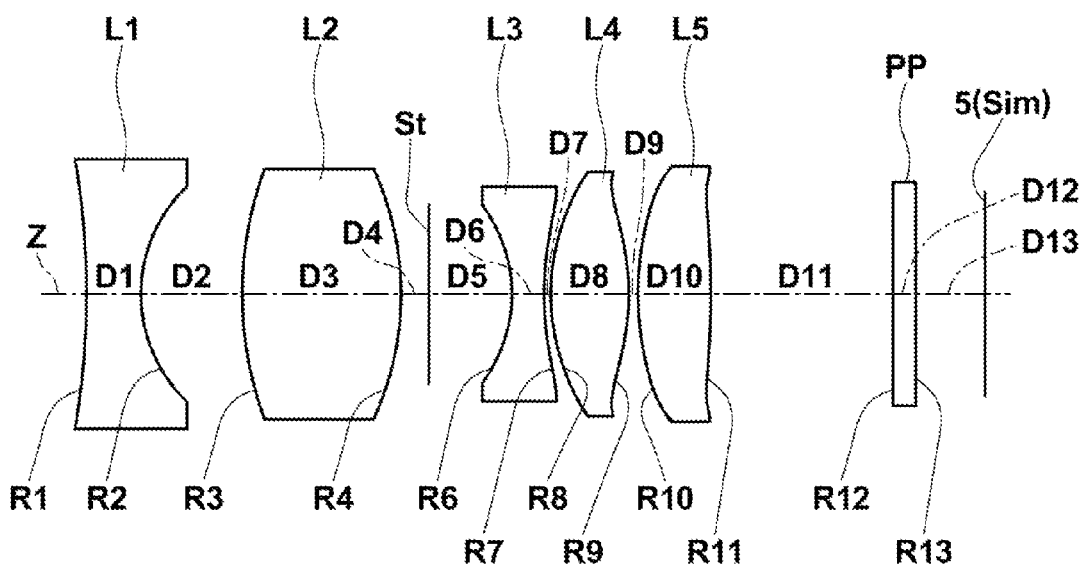

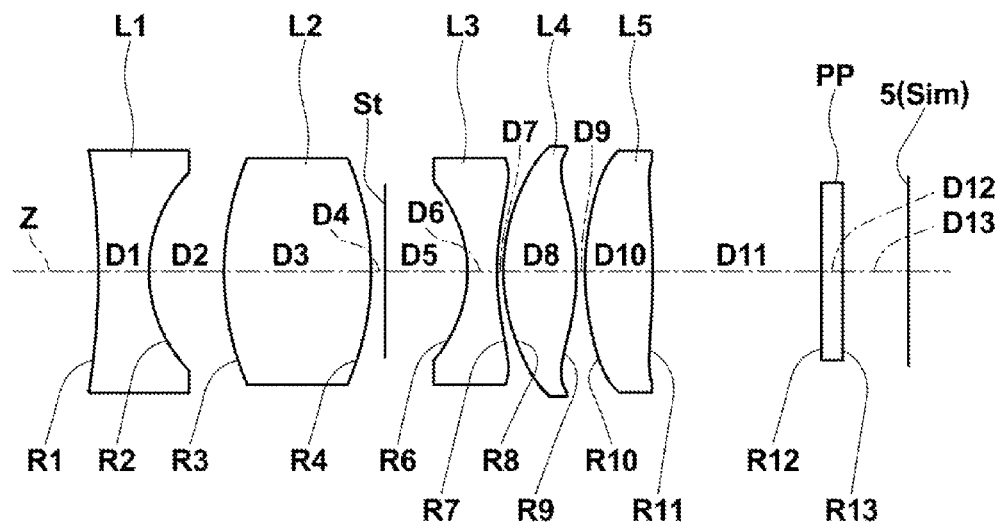
FIG.5 EXAMPLE 2
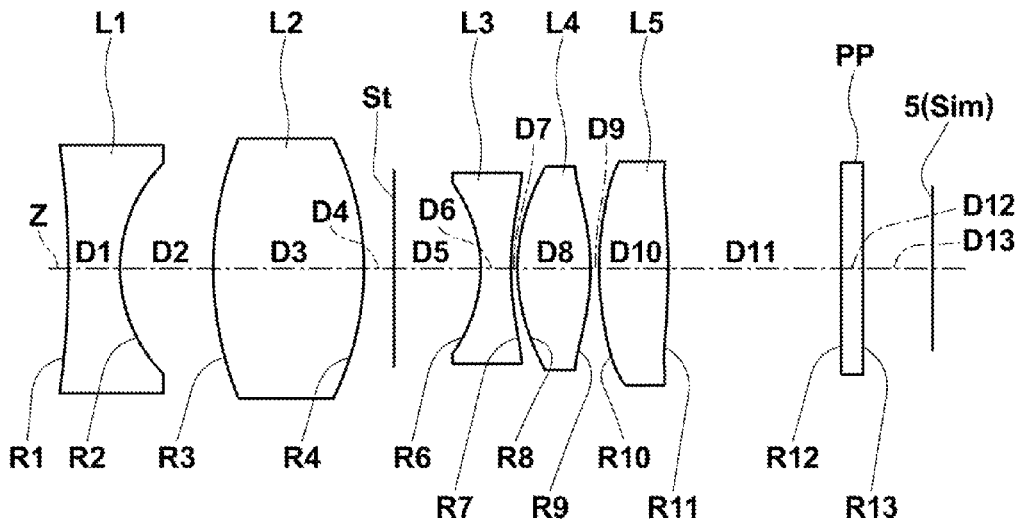
FIG.6 EXAMPLE 3

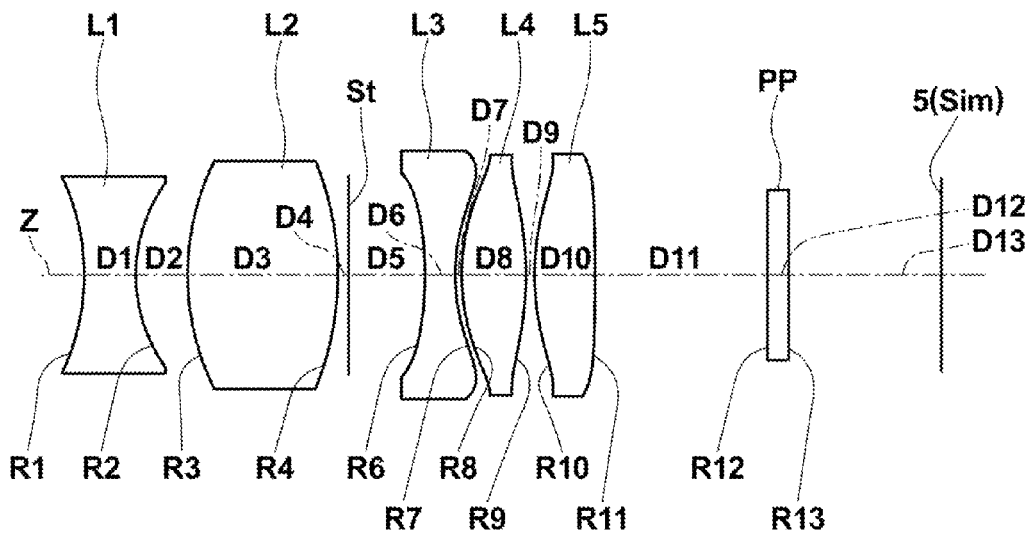
FIG.7  EXAMPLE 4
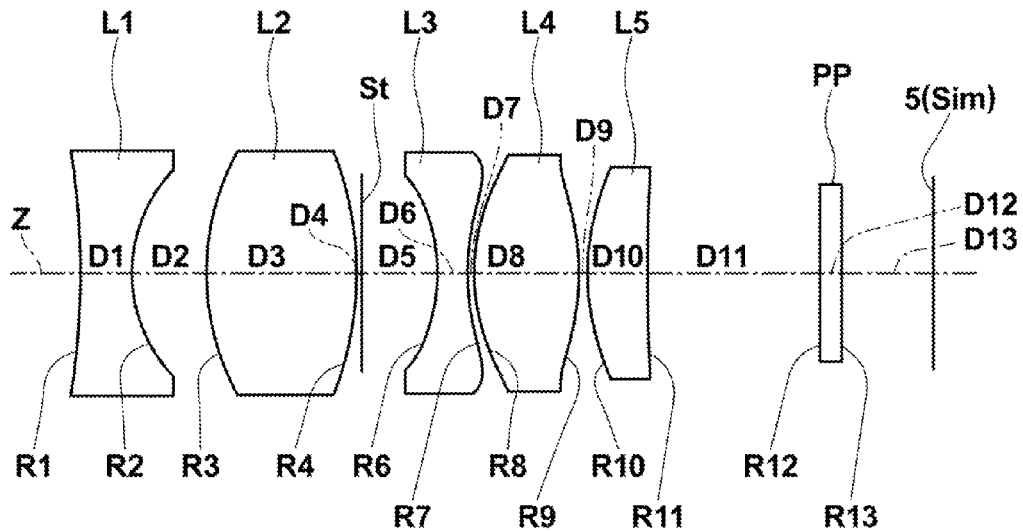
FIG.8  EXAMPLE 5

FIG.9  EXAMPLE 6
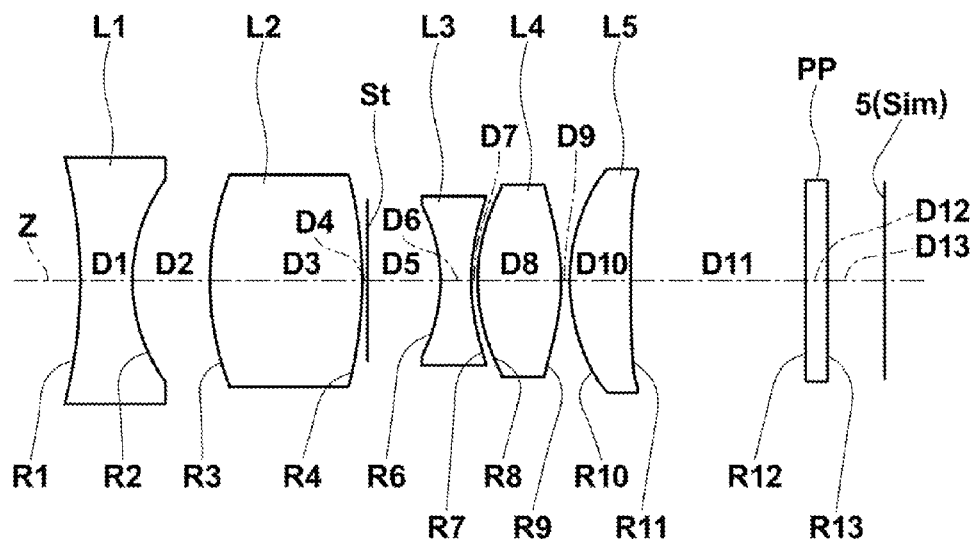
FIG.10  EXAMPLE 7
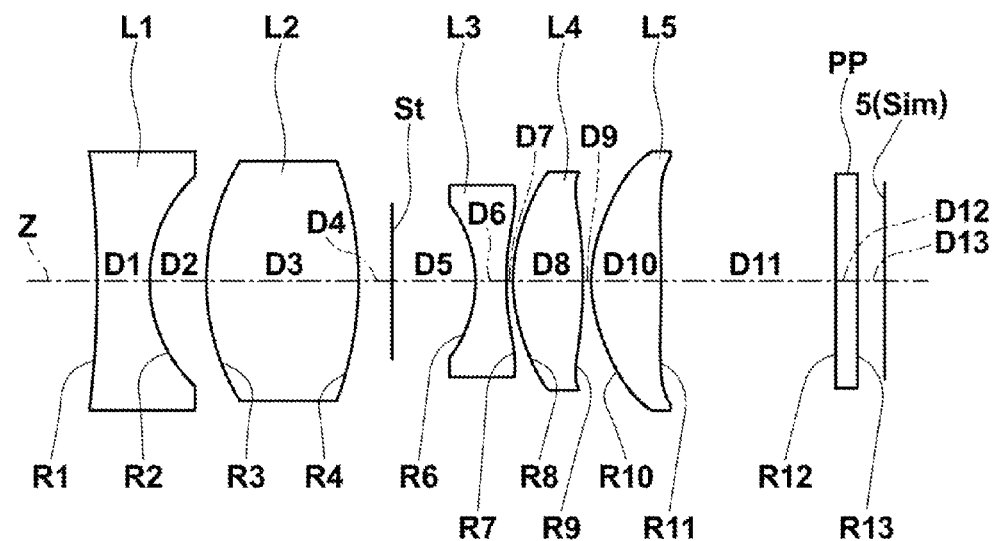

FIG.11  EXAMPLE 8
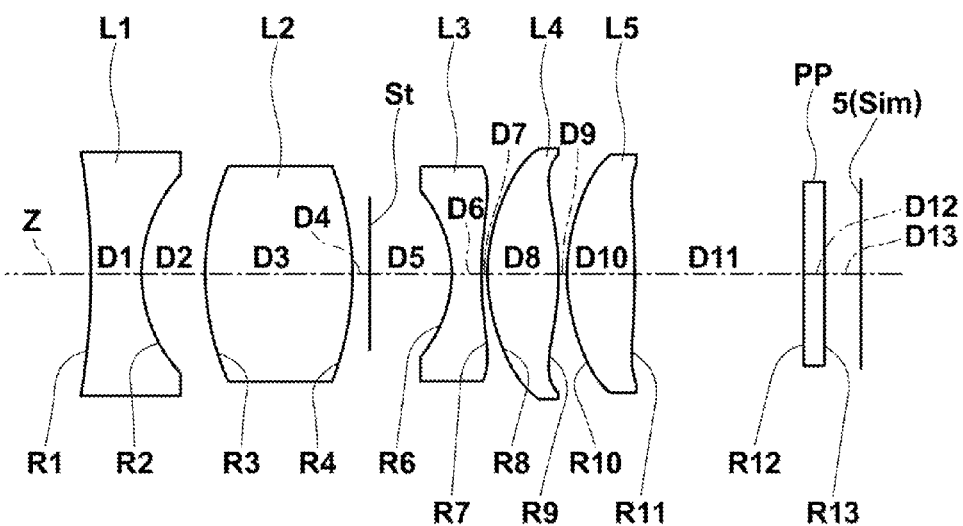
FIG.12  EXAMPLE 9
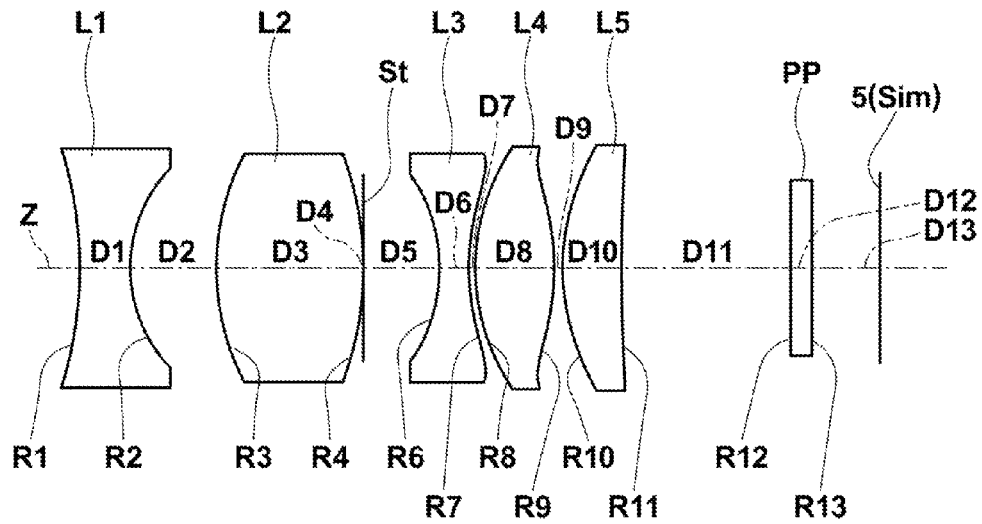

FIG.13  EXAMPLE 10
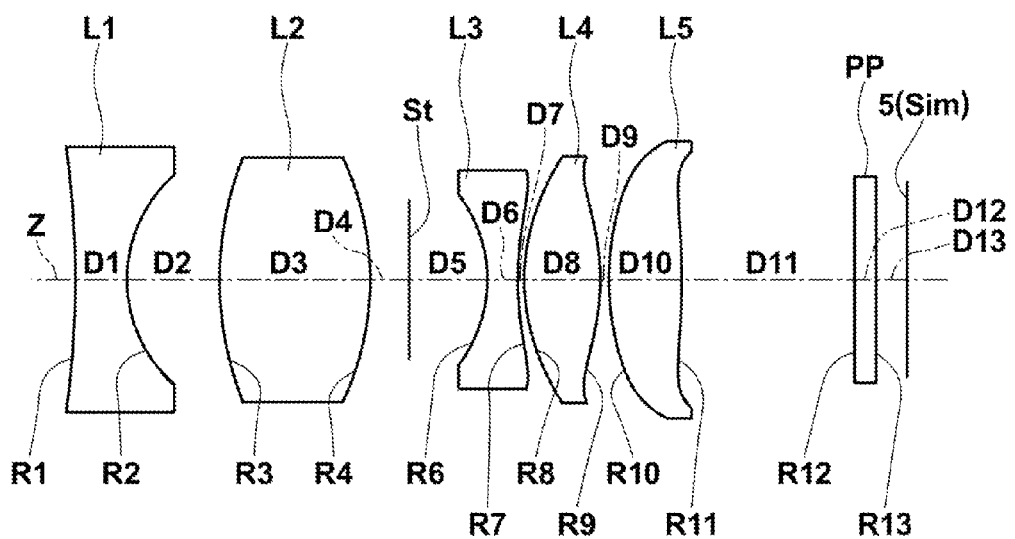
FIG.14  EXAMPLE 11
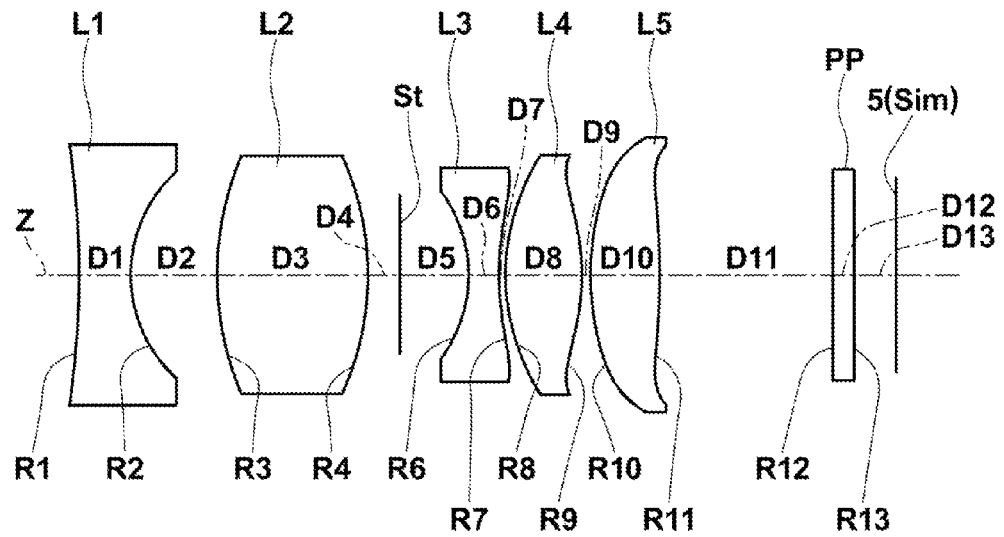

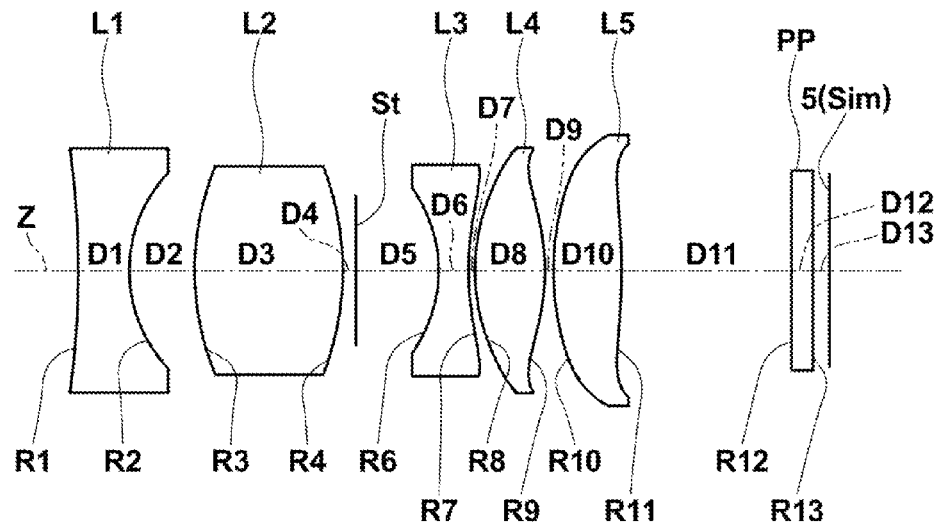
FIG.15  EXAMPLE 12
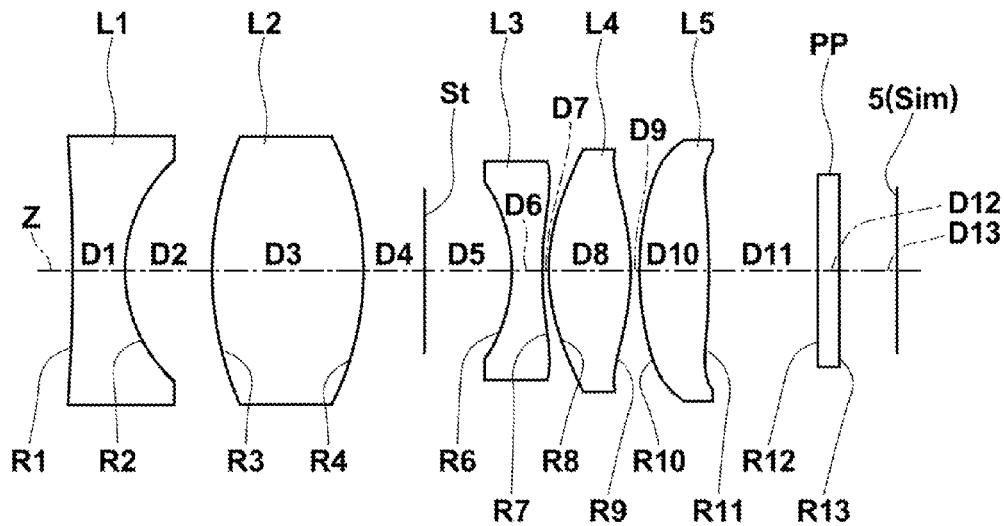
FIG.16  EXAMPLE 13

FIG.17   EXAMPLE 14
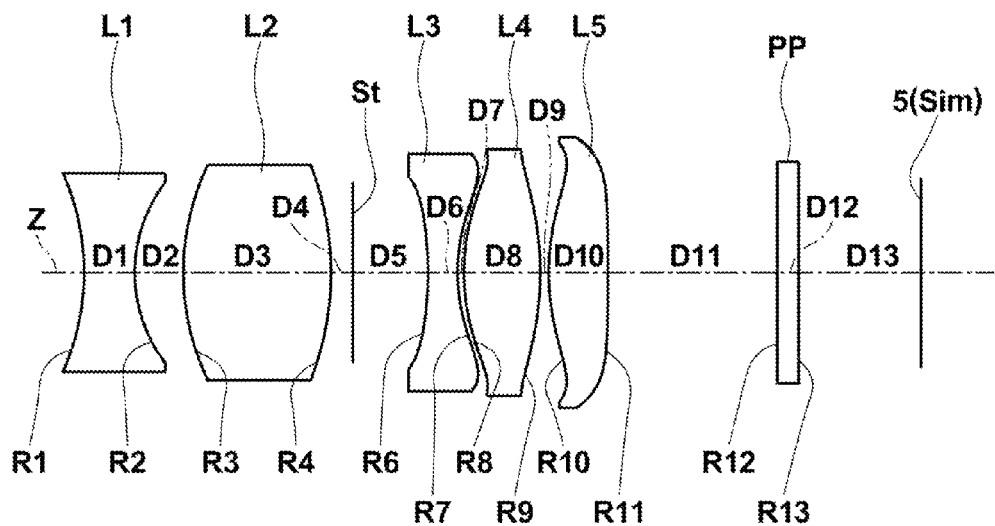
FIG.18   EXAMPLE 15
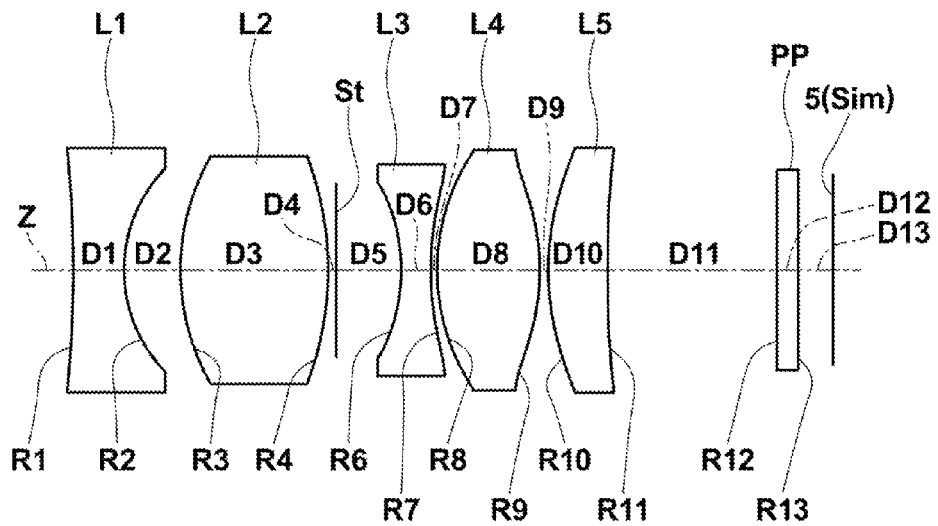

FIG.19  EXAMPLE 16
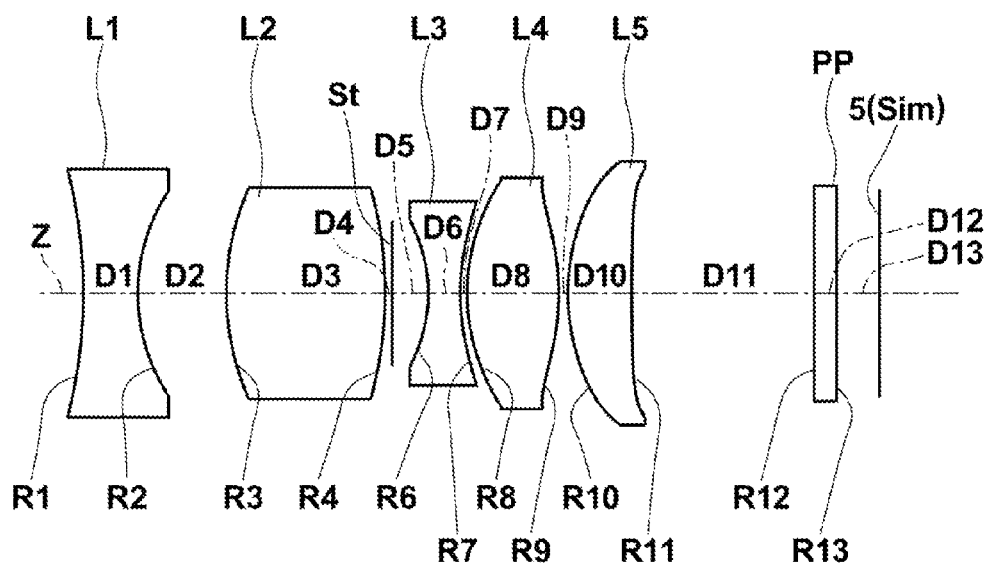
FIG.20  EXAMPLE 17
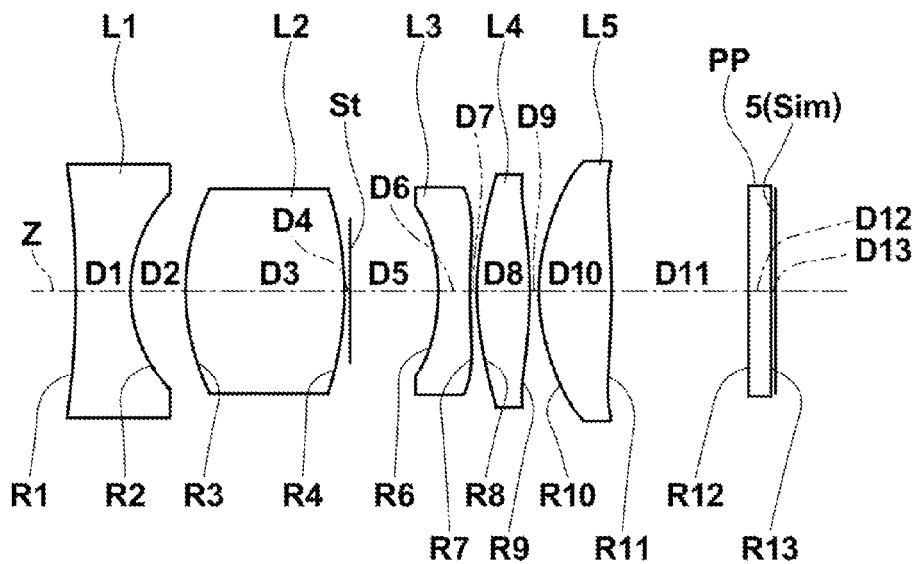

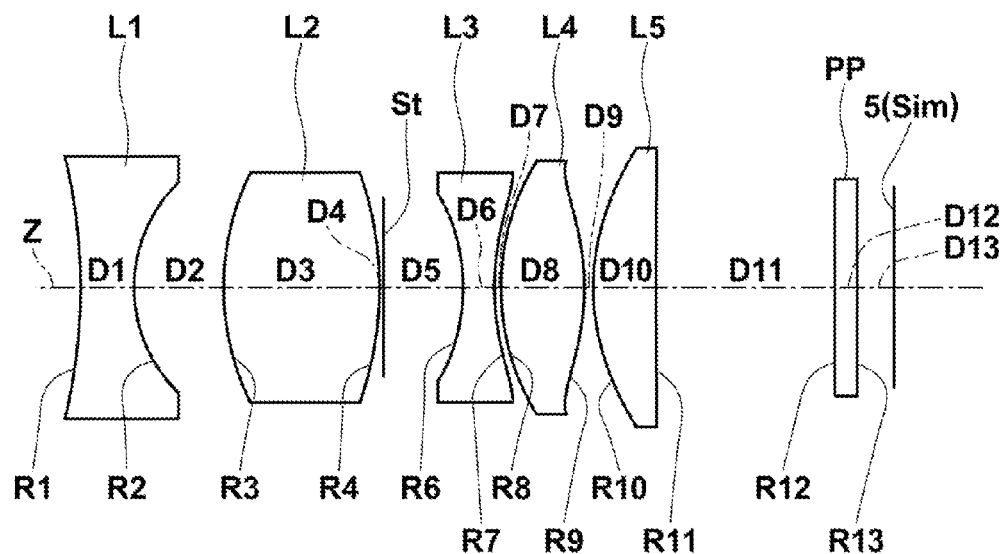
FIG.21  EXAMPLE 18
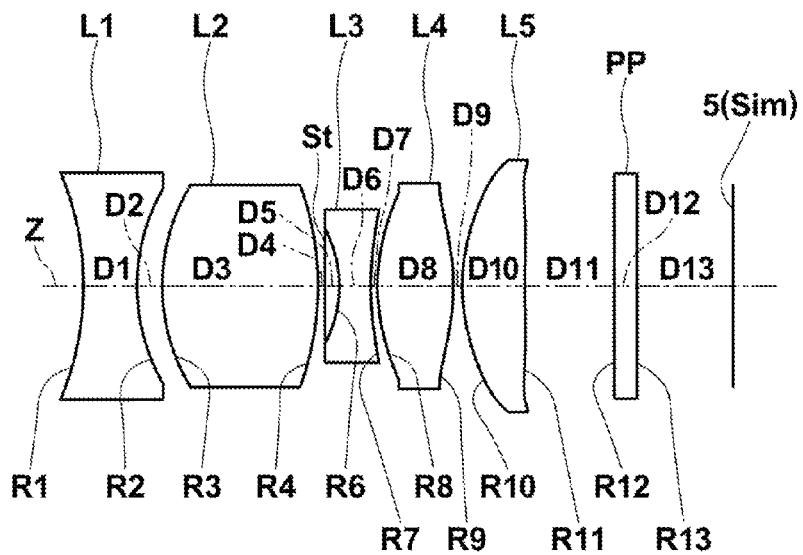
FIG.22  EXAMPLE 19

FIG.23  EXAMPLE 20
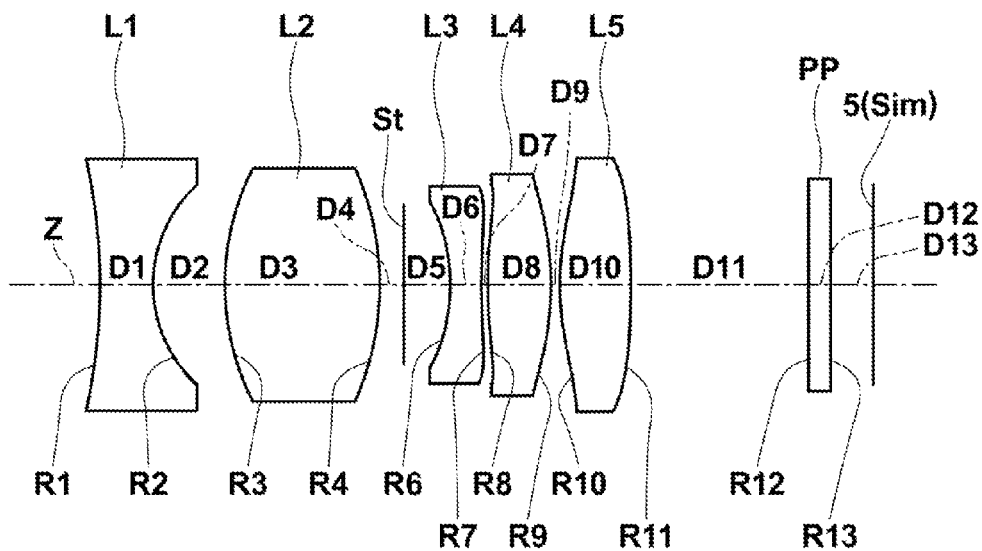
FIG.24  EXAMPLE 21
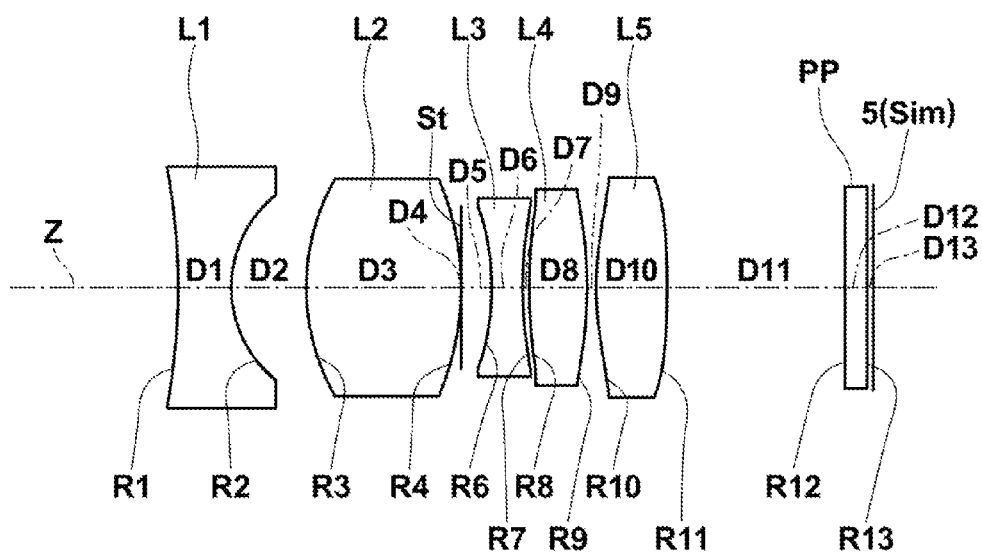

FIG.25  EXAMPLE 22
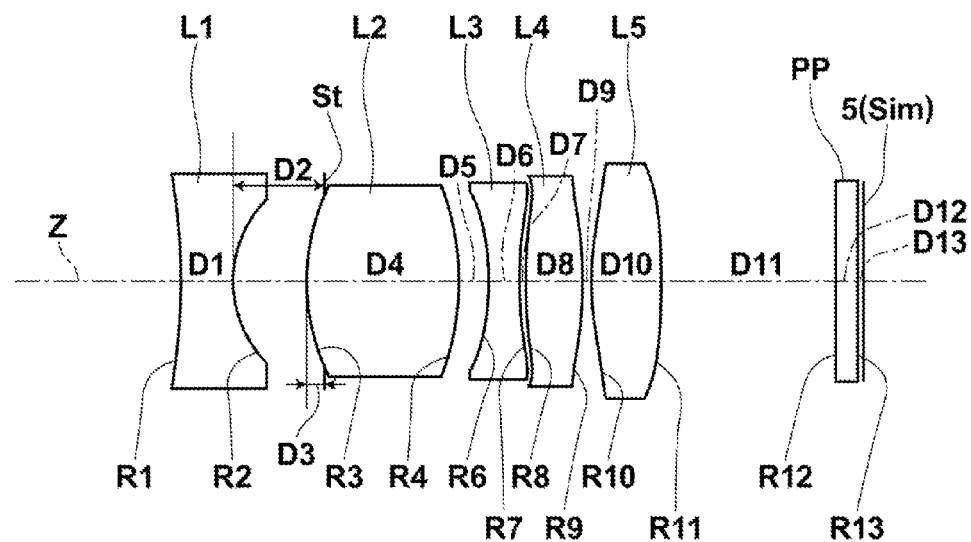
FIG.26  EXAMPLE 23
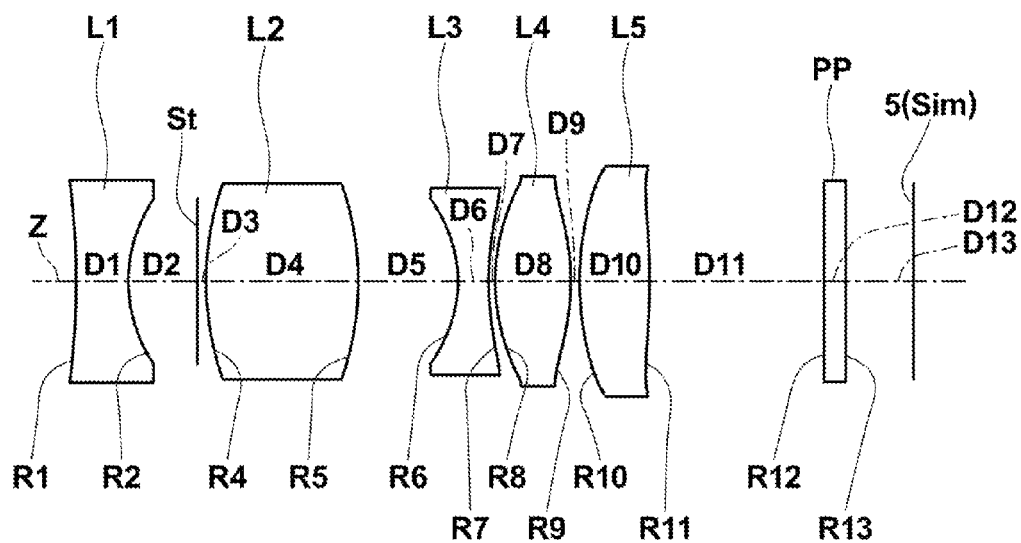

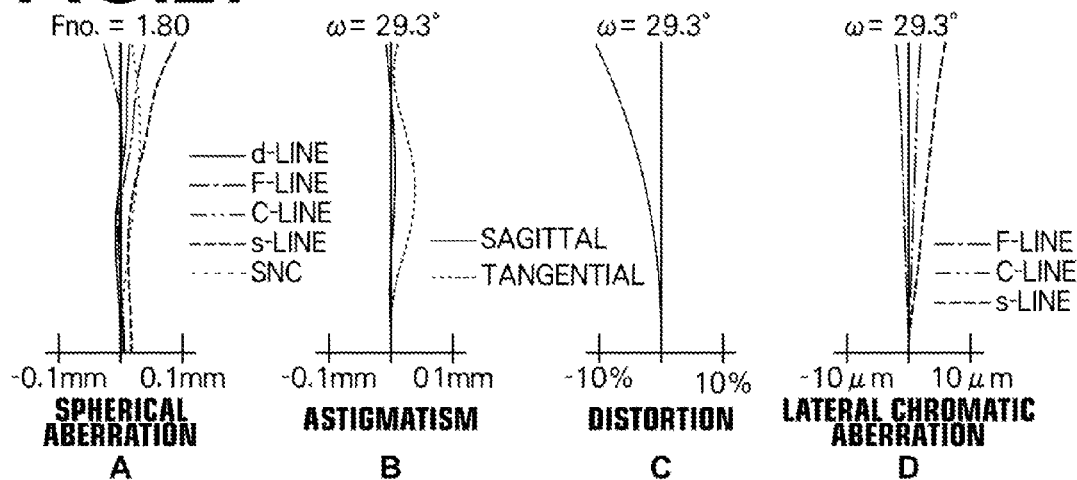
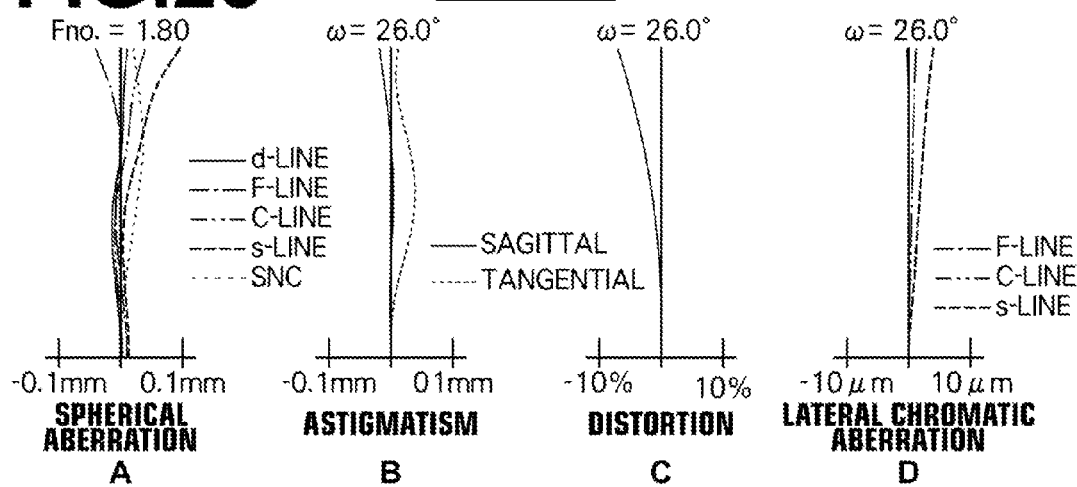
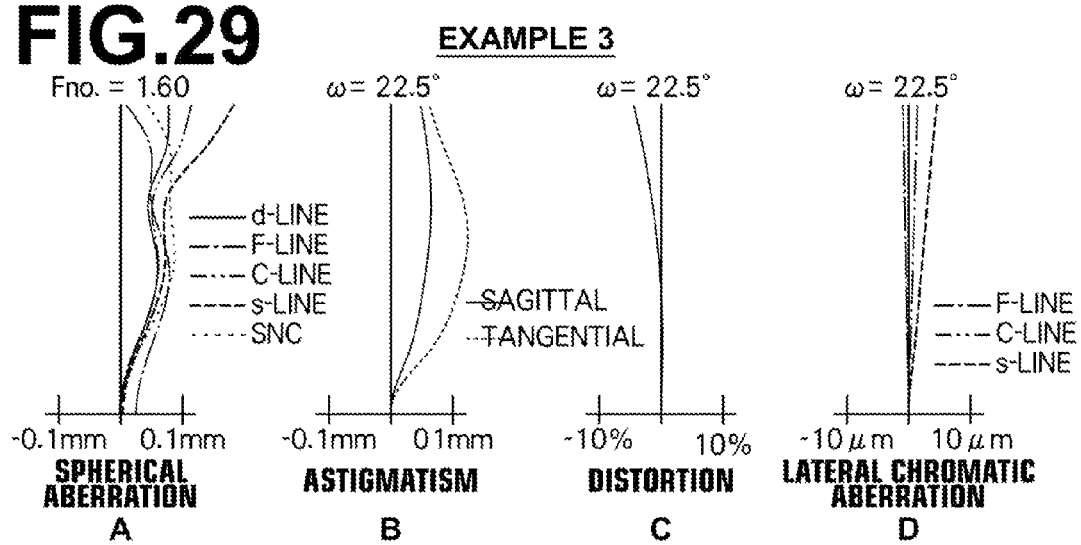

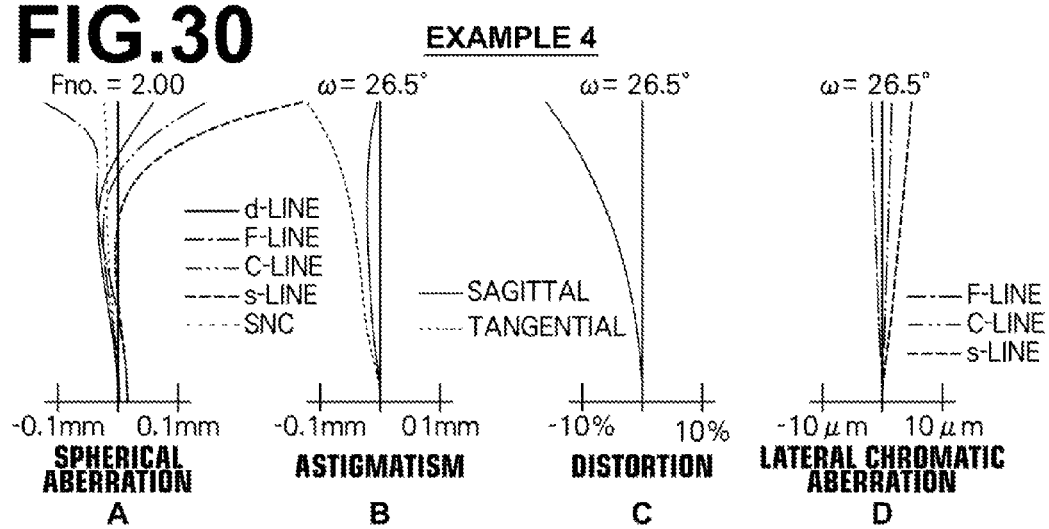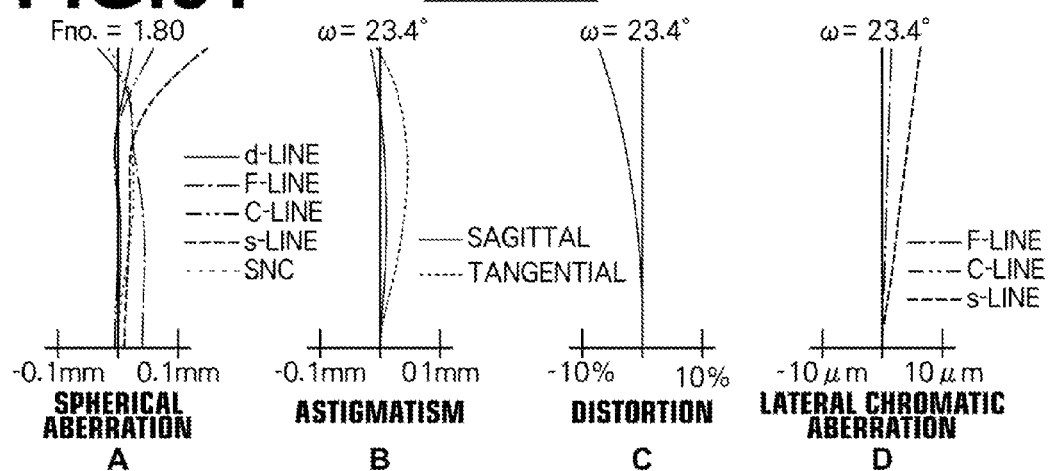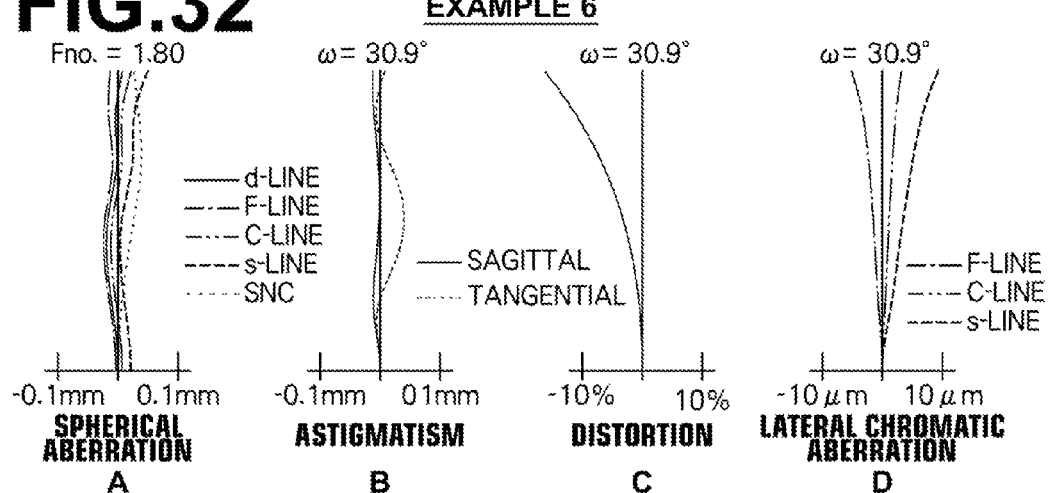

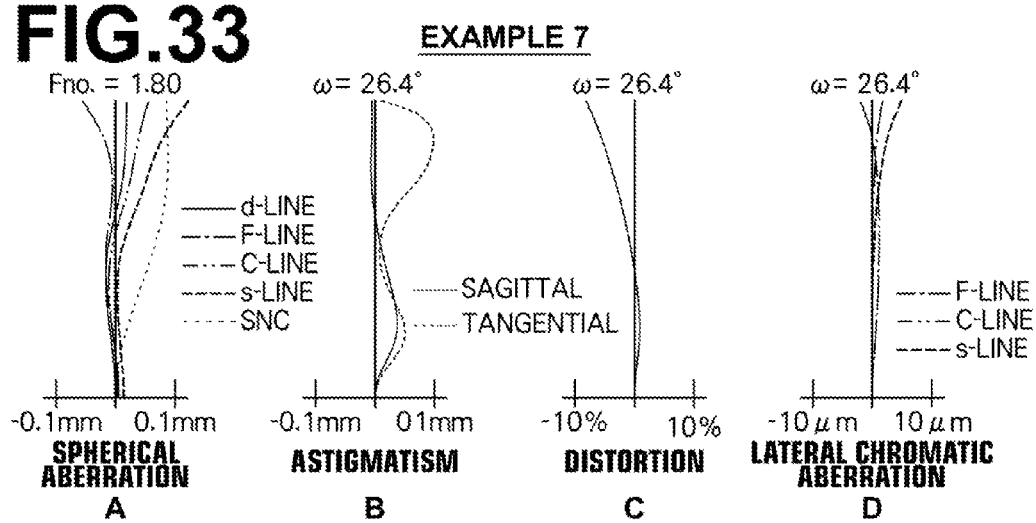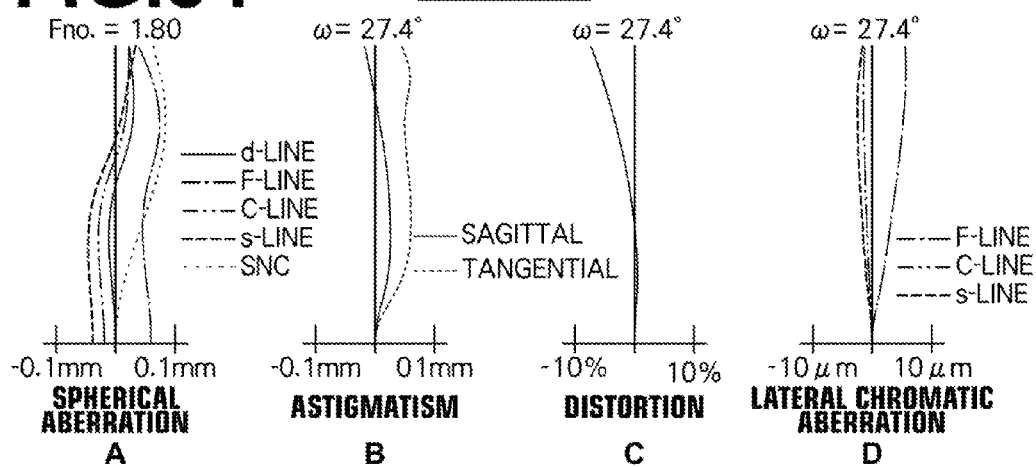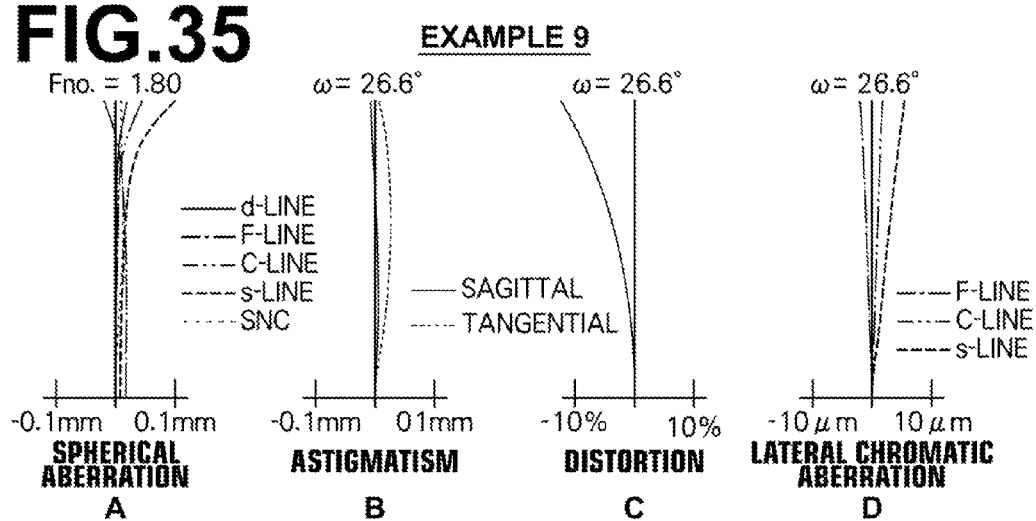

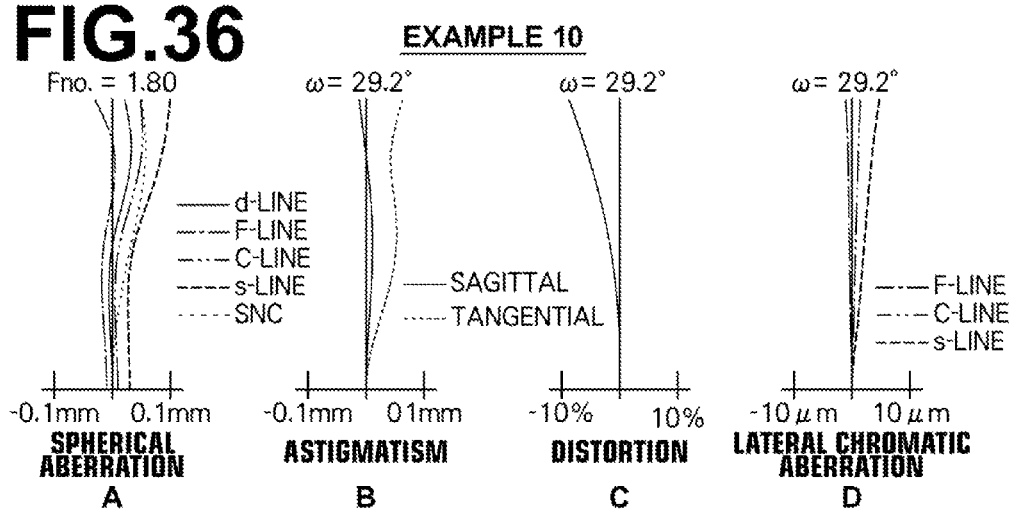
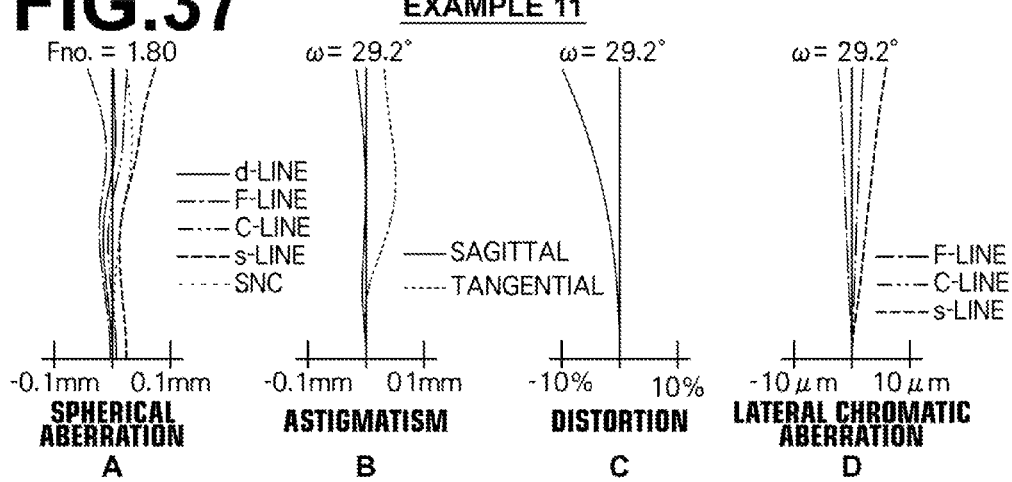
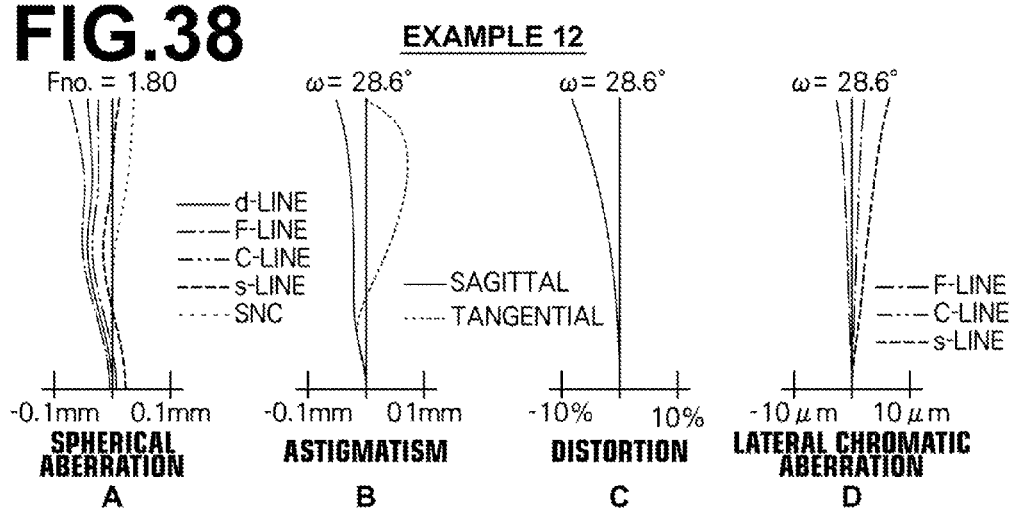

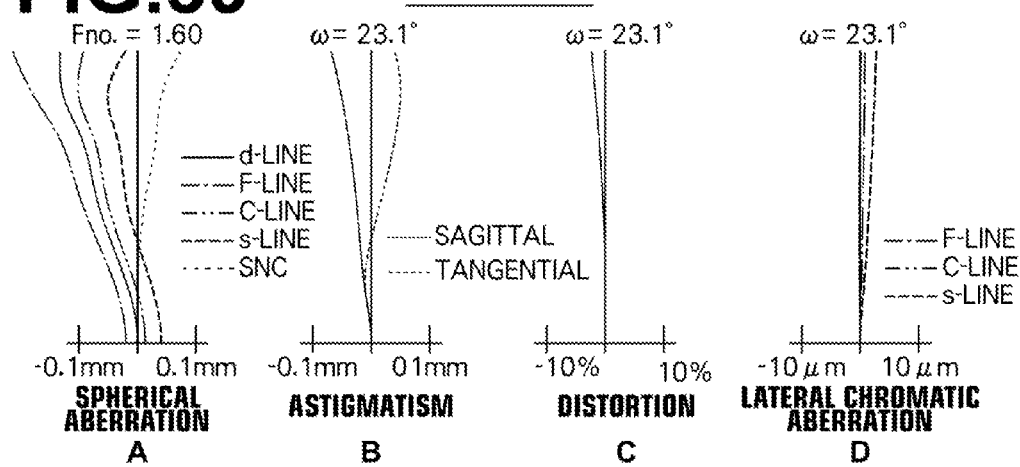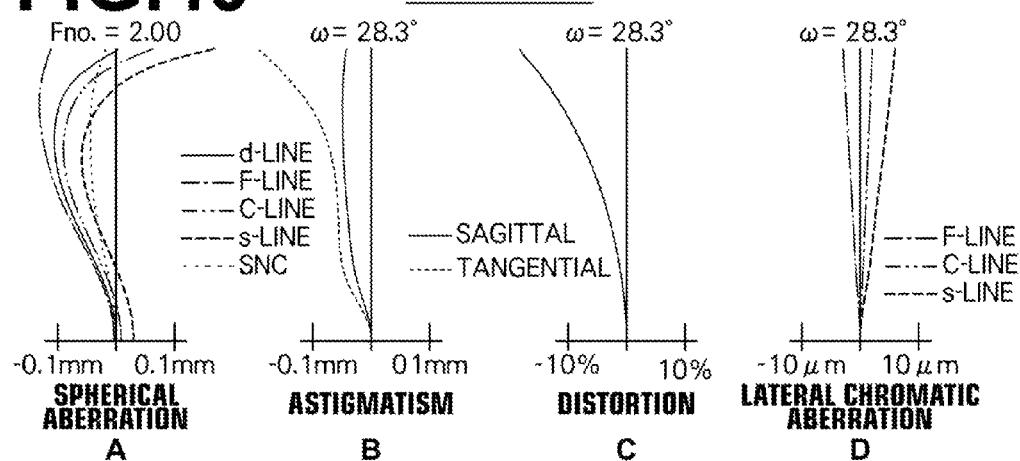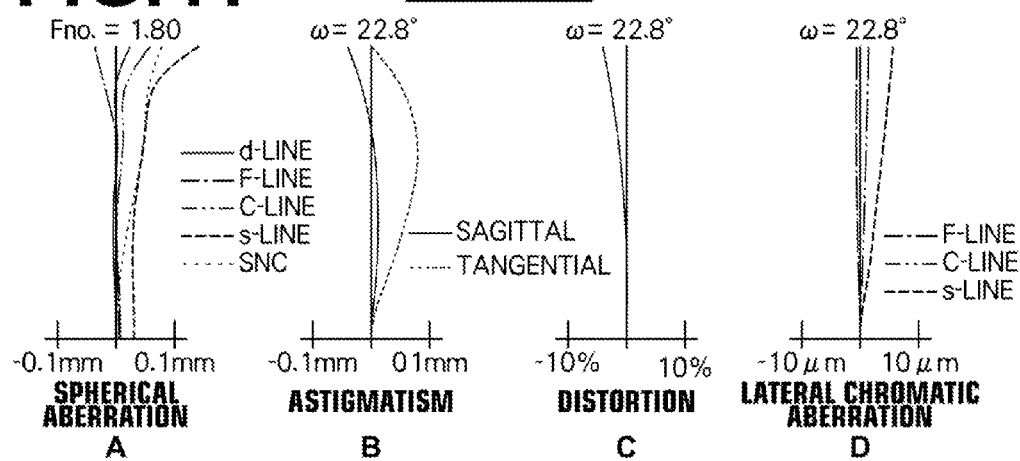

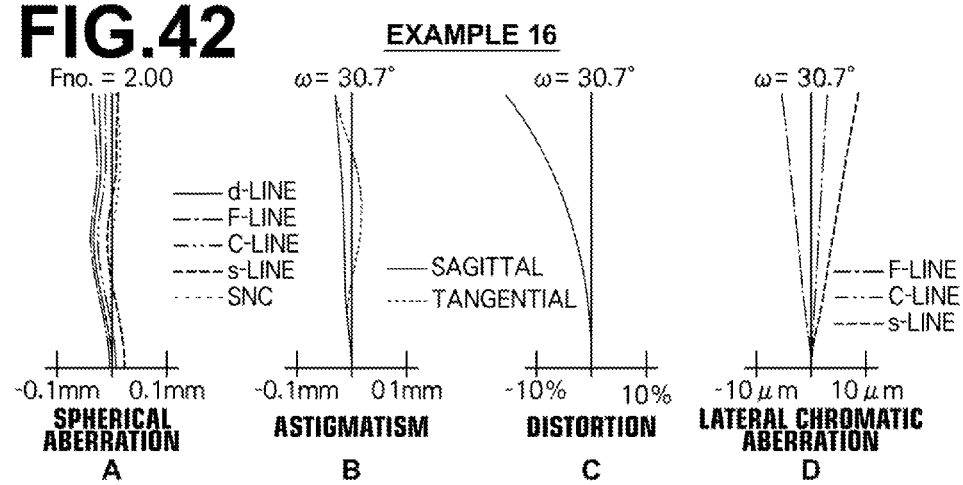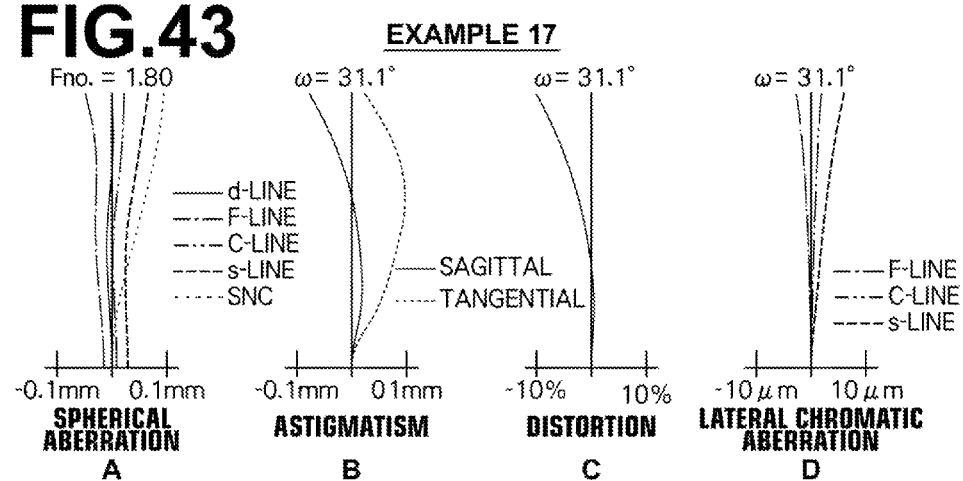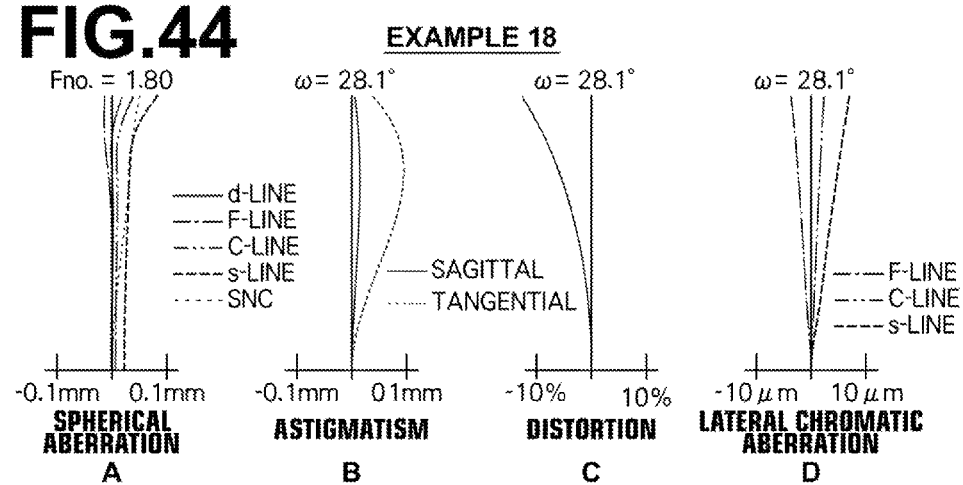

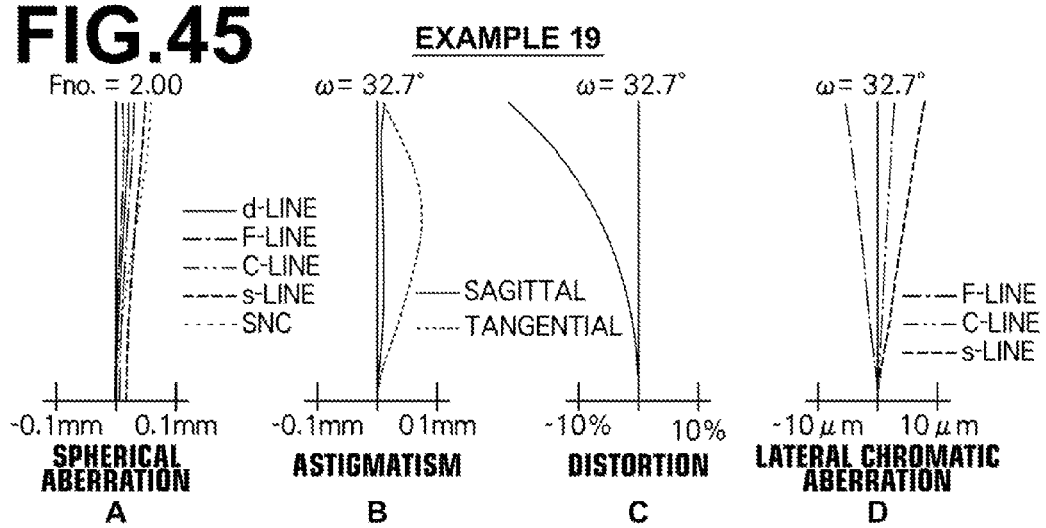
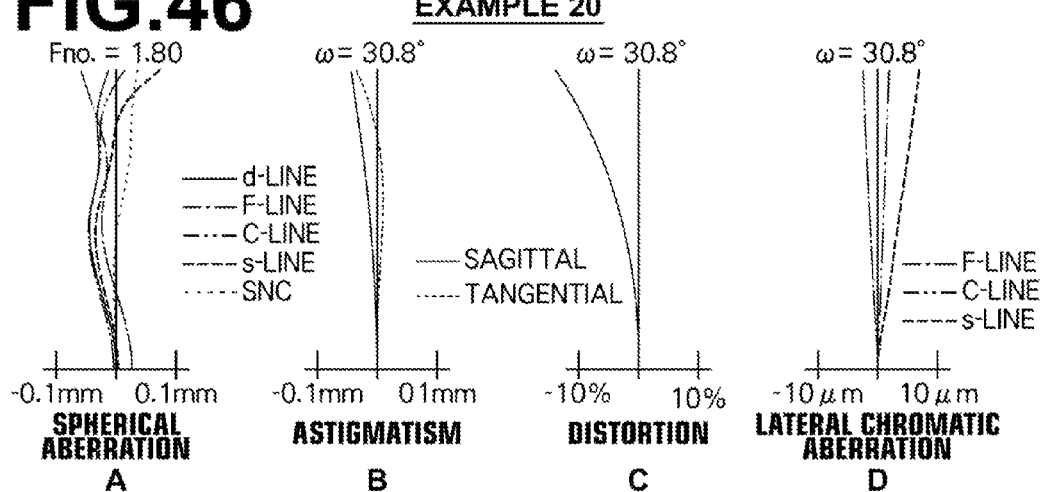
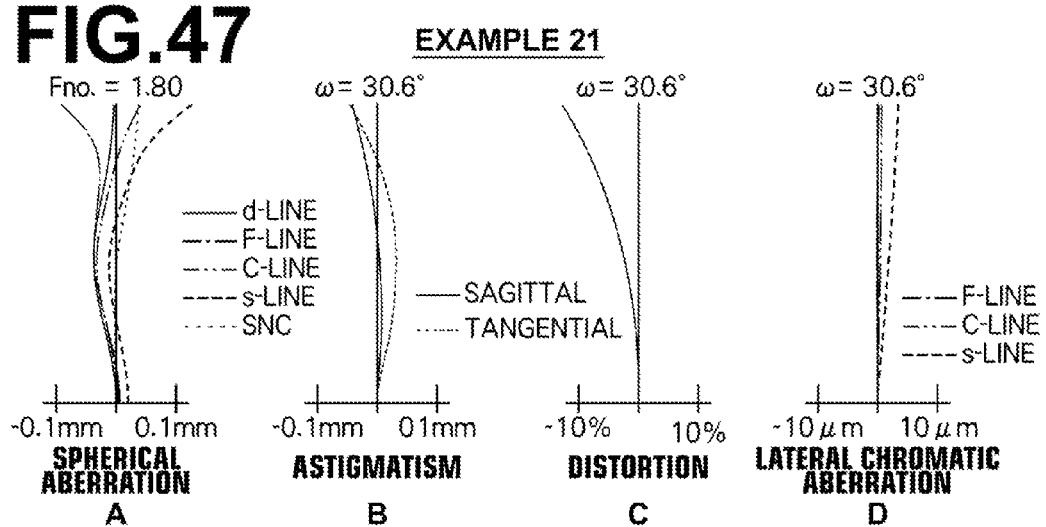

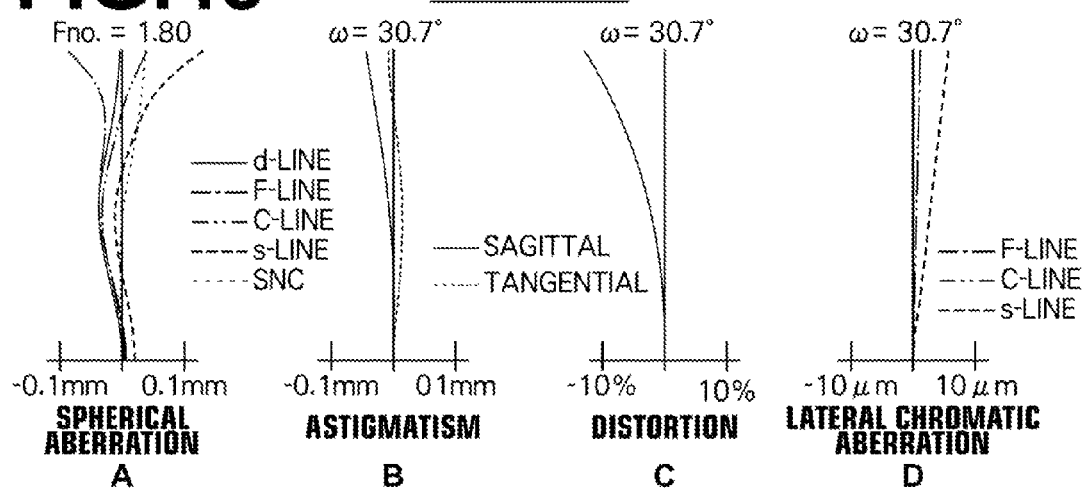
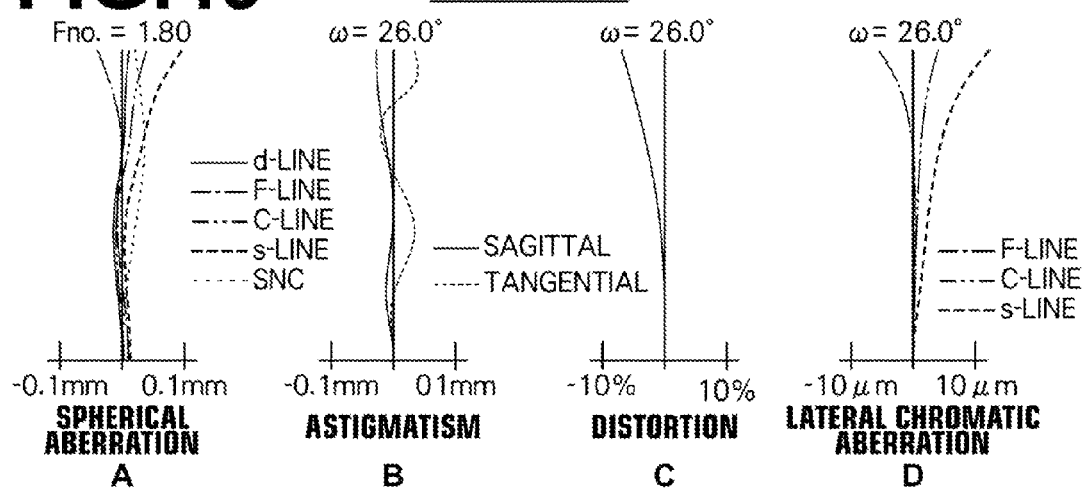

IMAGING LENS AND IMAGING APPARATUS

BACKGROUND OF THE INVENTION

1. Field of the Invention

The present invention relates to an imaging lens and an imaging apparatus. In particular, the present invention relates to an imaging lens appropriate for use in an in-vehicle camera, a camera for a mobile terminal, a surveillance camera, or the like using an imaging device, such as a CCD (Charge Coupled Device) and a CMOS (Complementary Metal Oxide Semiconductor). Further, the present invention relates to an imaging apparatus including the imaging lens.

2. Description of the Related Art

In recent years, the size of an imaging device, such as a CCD and a CMOS, became very small, and the resolution of the imaging device became very high. Consequently, the size of the body of imaging equipment including such an imaging device was reduced. Therefore, reduction in the size of an imaging lens mounted on the imaging equipment is also needed in addition to achievement of high optical performance. Meanwhile, lenses mounted on the in-vehicle camera, the surveillance camera and the like need to have excellent weather-resistance characteristics as well as being small-sized. Further, the lenses need to be lightweight and structurable at low cost. Further, the lenses need to have small F-numbers so that photography is possible even in low illumination conditions.

Japanese Unexamined Patent Publication No. 2008-008960 (Patent Document 1) discloses an imaging lens usable in an in-vehicle camera, a surveillance camera, and the like. The imaging lens consists of five lenses, and a most-object-side lens in the imaging lens is a negative meniscus lens having a convex object-side surface. Japanese Unexamined Patent Publication No. 11(1999)-142730 (Patent Document 2) discloses an imaging lens usable in a camera on which a small-size CCD is mounted. The imaging lens consists of five lenses including an aspherical lens.

SUMMARY OF THE INVENTION

Meanwhile, in recent years, a lens system is generally used together with an imaging device, such as a CCD. Therefore, it is desirable that a back focus is long so that various filters can be arranged between the lens system and the imaging device, and that the lens system has high telecentricity so that an angle of incidence of peripheral rays entering the imaging device is small. While satisfying such requirements, a lens system that realizes small size, low cost, high performance and a small F-number similar to or more than those of conventional lens systems is demanded.

In lens systems disclosed in Patent Document 1, U.S. Patent Application Publication No. 20100103537 (Patent Document 3), U.S. Pat. No. 6,940,662 (Patent Document 4), Japanese Unexamined Patent Publication No. 2000-066091 (Patent Document 5), and Japanese Unexamined Patent Publication No. 10(1998)-213742 (Patent Document 6), all the lenses of each lens system are spherical lenses. Therefore, if glass is used as the material of the lenses, it is possible to produce lenses having excellent weather-resistance characteristics at low cost. However, if an aspherical surface is adopted, an improvement in the performance of the lens system would be expectable. The lens system disclosed in Patent Document 2 has F-number of 2.8, which is large, or a small F-number. In the lens system having the small F-number, a most-object-side lens is a plastic lens. Therefore, when the lens system is used in an in-vehicle camera or a surveillance camera, a protection means, such as a cover glass, is needed, and that increases the cost of the lens system.

In view of the foregoing circumstances, it is an object of the present invention to provide an imaging lens that is small-sized and structurable at low cost, and that has high telecentricity, long back focus and a small F-number, and that can achieve high optical performance. Further, it is another object of the present invention to provide an imaging apparatus including the imaging lens.

A first imaging lens of the present invention is an imaging lens comprising:

a negative first lens having a concave object-side surface;
a positive second lens;
a negative third lens;
a positive fourth lens having a convex object-side surface; and
a positive fifth lens, which are in this order from an object side, wherein a stop is arranged between an image-side surface of the first lens and an object-side surface of the third lens, and wherein when the focal length of an entire system is f, and the focal length of the first lens is f1, the following formula (1) is satisfied:

$$-1.25 < f1/f < -0.5 \tag{1}$$

A second imaging lens of the present invention is an imaging lens comprising:

a negative first lens having a concave object-side surface;
a positive second lens;
a negative third lens;
a positive fourth lens having a convex object-side surface; and
a positive fifth lens, which are in this order from an object side, wherein a stop is arranged between an image-side surface of the first lens and an object-side surface of the third lens, and wherein when the focal length of an entire system is f, and the focal length of the second lens is f2, and the curvature radius of the object-side surface of the first lens and the curvature radius of the image-side surface of the first lens are R1 and R2, respectively, the following formulas (2) and (3) are satisfied:

$$0.4 < f2/f < 1.5 \tag{2}$$

and $$0.05 < (R1+R2)/(R1-R2) < 0.95 \tag{3}$$

A third imaging lens of the present invention is an imaging lens comprising:

a negative first lens having a concave object-side surface;
a positive second lens;
a negative third lens;
a positive fourth lens having a convex object-side surface; and
a positive fifth lens, which are in this order from an object side, wherein a stop is arranged between an image-side surface of the first lens and an object-side surface of the third lens, and wherein when the focal length of an entire system is f, and the focal length of the fifth lens is f5, the following formula (4) is satisfied:

$$0.99 < f5/f < 2.10 \tag{4}$$

In the first, second and third imaging lenses of the present invention, when the focal length of the entire system is f, and a distance between the second lens and the third lens on an optical axis is D23, it is desirable that the following formula (5) is satisfied:

$$0.05 < D23/f < 0.85 \quad (5).$$

In the first, second and third imaging lenses of the present invention, it is desirable that the first lens is a double concave lens.

In the first, second and third imaging lenses of the present invention, when the curvature radius of the object-side surface of the fifth lens and the curvature radius of the image-side surface of the fifth lens are R10 and R11, respectively, it is desirable that the following formula (6) is satisfied:

$$-1.40 < (R10+R11)/(R10-R11) < -0.2 \quad (6).$$

In the first, second and third imaging lenses of the present invention, when the focal length of the first lens is f1, and the focal length of the second lens is f2, it is desirable that the following formula (7) is satisfied:

$$-1.30 < f1/f2 < -0.65 \quad (7).$$

In the first, second and third imaging lenses of the present invention, it is desirable that an object-side surface of the third lens has negative power at a center and weaker negative power at an axial ray diameter edge, compared with the center.

In the first, second and third imaging lenses of the present invention, it is desirable that an image-side surface of the third lens has negative power at a center and weaker negative power at an axial ray diameter edge, compared with the center, or the image-side surface of the third lens has negative power at the center and positive power at the axial ray diameter edge.

In the first, second and third imaging lenses of the present invention, it is desirable that an image-side surface of the fourth lens has positive power at a center and weaker positive power at an axial ray diameter edge, compared with the center, or the image-side surface of the fourth lens has positive power at the center and negative power at the axial ray diameter edge.

In the first, second and third imaging lenses of the present invention, it is desirable that an image-side surface of the fifth lens has positive power at a center and weaker positive power at an axial ray diameter edge, compared with the center, or the image-side surface of the fifth lens has positive power at the center and negative power at the axial ray diameter edge.

In the imaging lens of the present invention, when a lens is an aspherical lens, the concave/convex shape of a surface, and the sign of refractive power (power) will be considered in a paraxial region unless otherwise noted. In the imaging lenses of the present invention, the sign of a curvature radius is positive when the shape of a surface is convex toward the object side, and the sign of a curvature radius is negative when the shape of a surface is convex toward the image side.

Here, the phrase "axial ray diameter of a surface" means the diameter of a circle composed of outermost points (points farthest from the optical axis) in the direction of the diameter when points at which all rays contributing to image formation on an axis and a lens surface intersect with each other are considered. Further, the term "axial ray diameter edge" means the outermost points. The axial ray diameter is determined by the F-number of a lens system. For example, the axial ray diameter edge is composed of points at which rays that have passed through the periphery of the aperture of an aperture stop intersect with a lens surface.

An imaging apparatus of the present invention includes one of the first, second and third imaging lenses of the present invention.

According to the first imaging lens of the present invention, the arrangement of power in the lens system, the position of the stop, the shapes of the surfaces of the first lens and the fourth lens, and the like are appropriately set in the lens system of at least five lenses, and formula (1) is satisfied. Therefore, it is possible to realize small-size low-cost structure, high telecentricity, long back focus, a small F-number, and high optical performance.

According to the second imaging lens of the present invention, the arrangement of power in the lens system, the position of the stop, the shapes of the surfaces of the first lens and the fourth lens, and the like are appropriately set in the lens system of at least five lenses, and formulas (2) and (3) are satisfied. Therefore, it is possible to realize small-size low-cost structure, high telecentricity, long back focus, a small F-number, and high optical performance.

According to the third imaging lens of the present invention, the arrangement of power in the lens system, the position of the stop, the shapes of the surfaces of the first lens and the fourth lens, and the like are appropriately set in the lens system of at least five lenses, and formula (4) is satisfied. Therefore, it is possible to realize small-size low-cost structure, high telecentricity, long back focus, a small F-number, and high optical performance.

The imaging apparatus of the present invention includes one of the first, second and third imaging lenses of the present invention. Therefore, it is possible to structure the imaging apparatus in small size and at low cost. Further, the imaging apparatus is usable even in low illumination photography conditions. It is possible to obtain an excellent high-resolution image using an imaging device.

BRIEF DESCRIPTION OF THE DRAWINGS

FIG. 3 is a diagram illustrating the structure of an imaging lens according to another embodiment of the present invention, and optical paths;

FIG. 4 is a cross section illustrating the lens structure of an imaging lens in Example 1 of the present invention;

FIG. 5 is a cross section illustrating the lens structure of an imaging lens in Example 2 of the present invention;

FIG. 6 is a cross section illustrating the lens structure of an imaging lens in Example 3 of the present invention;

FIG. 7 is a cross section illustrating the lens structure of an imaging lens in Example 4 of the present invention;

FIG. 8 is a cross section illustrating the lens structure of an imaging lens in Example 5 of the present invention;

FIG. 9 is a cross section illustrating the lens structure of an imaging lens in Example 6 of the present invention;

FIG. 10 is a cross section illustrating the lens structure of an imaging lens in Example 7 of the present invention;

FIG. 11 is a cross section illustrating the lens structure of an imaging lens in Example 8 of the present invention;

FIG. 12 is a cross section illustrating the lens structure of an imaging lens in Example 9 of the present invention;

FIG. 13 is a cross section illustrating the lens structure of an imaging lens in Example 10 of the present invention;

FIG. 14 is a cross section illustrating the lens structure of an imaging lens in Example 11 of the present invention;

FIG. 15 is a cross section illustrating the lens structure of an imaging lens in Example 12 of the present invention;

FIG. 16 is a cross section illustrating the lens structure of an imaging lens in Example 13 of the present invention;

FIG. 17 is a cross section illustrating the lens structure of an imaging lens in Example 14 of the present invention;

FIG. 18 is a cross section illustrating the lens structure of an imaging lens in Example 15 of the present invention;

FIG. 19 is a cross section illustrating the lens structure of an imaging lens in Example 16 of the present invention;

FIG. 20 is a cross section illustrating the lens structure of an imaging lens in Example 17 of the present invention;

FIG. 21 is a cross section illustrating the lens structure of an imaging lens in Example 18 of the present invention;

FIG. 22 is a cross section illustrating the lens structure of an imaging lens in Example 19 of the present invention;

FIG. 23 is a cross section illustrating the lens structure of an imaging lens in Example 20 of the present invention;

FIG. 24 is a cross section illustrating the lens structure of an imaging lens in Example 21 of the present invention;

FIG. 25 is a cross section illustrating the lens structure of an imaging lens in Example 22 of the present invention;

FIG. 26 is a cross section illustrating the lens structure of an imaging lens in Example 23 of the present invention;

FIG. 27, Section A through FIG. 27, Section D are diagrams illustrating aberrations of the imaging lens in Example 1 of the present invention;

FIG. 28, Section A through FIG. 28, Section D are diagrams illustrating aberrations of the imaging lens in Example 2 of the present invention;

FIG. 29, Section A through FIG. 29, Section D are diagrams illustrating aberrations of the imaging lens in Example 3 of the present invention;

FIG. 30, Section A through FIG. 30, Section D are diagrams illustrating aberrations of the imaging lens in Example 4 of the present invention;

FIG. 31, Section A through FIG. 31, Section D are diagrams illustrating aberrations of the imaging lens in Example 5 of the present invention;

FIG. 32, Section A through FIG. 32, Section D are diagrams illustrating aberrations of the imaging lens in Example 6 of the present invention; FIG. 33, Section A through FIG. 33, Section D are diagrams illustrating aberrations of the imaging lens in Example 7 of the present invention;

FIG. 34, Section A through FIG. 34, Section D are diagrams illustrating aberrations of the imaging lens in Example 8 of the present invention;

FIG. 35, Section A through FIG. 35, Section D are diagrams illustrating aberrations of the imaging lens in Example 9 of the present invention;

FIG. 36, Section A through FIG. 36, Section D are diagrams illustrating aberrations of the imaging lens in Example 10 of the present invention;

FIG. 37, Section A through FIG. 37, Section D are diagrams illustrating aberrations of the imaging lens in Example 11 of the present invention;

FIG. 38, Section A through FIG. 38, Section D are diagrams illustrating aberrations of the imaging lens in Example 12 of the present invention;

FIG. 39, Section A through FIG. 39, Section D are diagrams illustrating aberrations of the imaging lens in Example 13 of the present invention;

FIG. 40, Section A through FIG. 40, Section D are diagrams illustrating aberrations of the imaging lens in Example 14 of the present invention;

FIG. 41, Section A through FIG. 41, Section D are diagrams illustrating aberrations of the imaging lens in Example 15 of the present invention;

FIG. 42, Section A through FIG. 42, Section D are diagrams illustrating aberrations of the imaging lens in Example 16 of the present invention;

FIG. 43, Section A through FIG. 43, Section D are diagrams illustrating aberrations of the imaging lens in Example 17 of the present invention;

FIG. 44, Section A through FIG. 44, Section D are diagrams illustrating aberrations of the imaging lens in Example 18 of the present invention;

FIG. 45, Section A through FIG. 45, Section D are diagrams illustrating aberrations of the imaging lens in Example 19 of the present invention;

FIG. 46, Section A through FIG. 46, Section D are diagrams illustrating aberrations of the imaging lens in Example 20 of the present invention;

FIG. 47, Section A through FIG. 47, Section D are diagrams illustrating aberrations of the imaging lens in Example 21 of the present invention;

FIG. 48, Section A through FIG. 48, Section D are diagrams illustrating aberrations of the imaging lens in Example 22 of the present invention;

FIG. 49, Section A through FIG. 49, Section D are diagrams illustrating aberrations of the imaging lens in Example 23 of the present invention.

DESCRIPTION OF THE PREFERRED EMBODIMENTS

Figure 1:
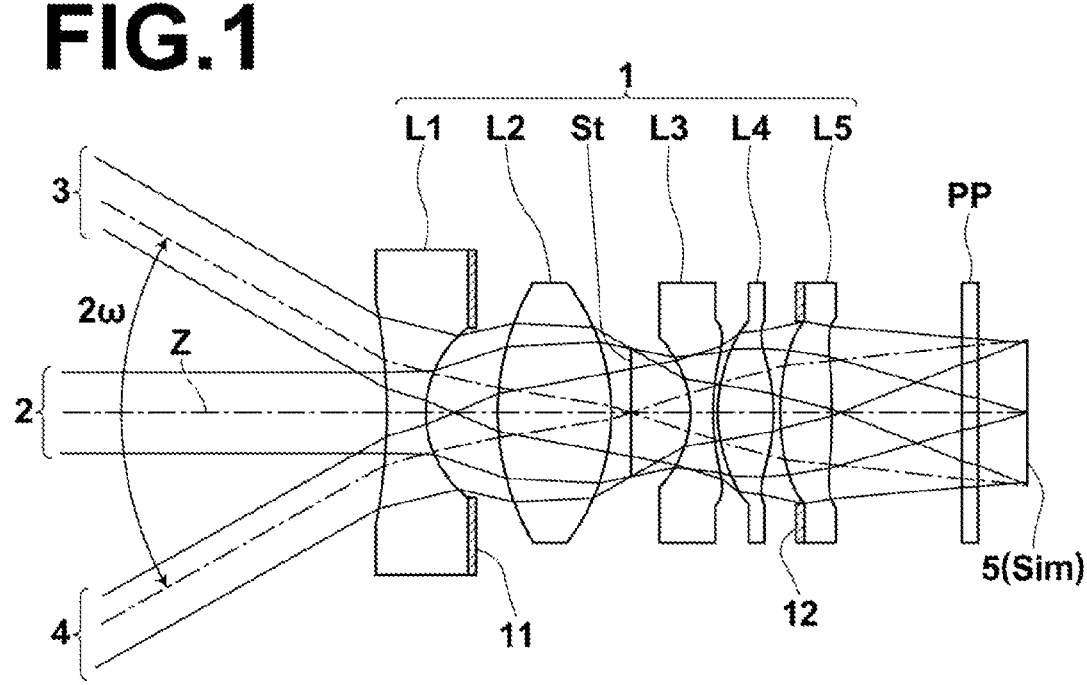
FIG. 1 is a diagram illustrating the structure of an imaging lens according to an embodiment of the present invention, and optical paths.

Hereinafter, embodiments of the present invention will be described with reference to drawings. First, an imaging lens according to an embodiment of the present invention will be described with reference to FIG. 1. FIG. 1 is a lens cross section of an imaging lens 1 according to an embodiment of the present invention. Further, FIG. 1 illustrates axial rays 2 from an object point at infinity, and off-axial rays 3, 4 at full angle of view 2. A structure example illustrated in FIG. 1 corresponds to an imaging lens in Example 1, which will be described later. In FIG. 1, the left side is the object side and the right side is the image side.

In FIG. 1, a case of applying the imaging lens 1 to an imaging apparatus is considered, and an imaging device 5 arranged at image plane Sim of the imaging lens 1 is also illustrated. In FIG. 1, the imaging device is illustrated in a simplified manner. However, in actual cases, the imaging device 5 is arranged in such a manner that the imaging plane of the imaging device 5 is located at the position of the image plane Sim. The imaging device 5 converts an optical image formed by the imaging lens 1 into electrical signals. For example, a CCD image sensor, a CMOS image sensor, or the like may be used as the imaging device 5.

When the imaging lens 1 is applied to an imaging apparatus, it is desirable to set a cover glass or various filters, such as a low-pass filter and an infrared ray cut filter, based on the structure of a camera on which the lens is mounted. FIG. 1 illustrates a case in which parallel-flat-plate-shaped optical member PP, which is assumed to be such elements, is arranged between the most-image-side lens and the imaging device 5 (image plane Sim). Especially when the imaging lens 1 is used together with the imaging device 5, the cover glass and various filters are arranged between the lens system and image plane Sim in many cases. Therefore, the lens system needs to have sufficiently long back focus for arranging these elements.

The imaging lens 1 includes, along optical axis Z, negative first lens L1 having a concave object-side surface, positive second lens L2, negative third lens L3, positive fourth lens L4 having a convex object-side surface, and positive fifth lens L5, which are in this order from an object side. Further, aperture stop St is arranged between an image-side surface of the first lens L1 and an object-side surface of the third lens L3. These are a basic structure of the imaging lens 1.

The negative first lens L1 is arranged on the most object side, and the positive fourth lens L4 and the positive fifth lens L5 are arranged on the image side. Therefore, it is possible to provide a retrofucus type lens system, and to easily widen the angle of view of the lens system. Further, it is possible to easily provide long back focus.

As in the example illustrated in FIG. 1, when aperture stop St is arranged between second lens L2 and third lens L3, and the arrangement of power is negative, positive, aperture stop St, negative, positive, and positive in this order from the object side, it is possible to substantially equalize power on the object side of the aperture stop St and power on the image side of the aperture stop St, and to easily correct curvature of field. Since the aperture stop St is arranged substantially at a middle of the lens system, it is possible to suppress the height of rays at each lens, and to make the diameter of each lens small. That is advantageous to reduction in size and cost.

As in an example, which will be described later, when aperture stop St is arranged between first lens L1 and second lens L2, and the arrangement of power is negative, aperture stop St, positive, negative, positive, and positive in this order from the object side, it is possible to suppress the height of rays especially at the first lens L1, and to reduce a lens diameter in a part exposed to the outside. That is advantageous to reduction in size. Further, since it is possible to move the position of an exit pupil toward the object side, it is possible to suppress an angle at which peripheral rays enter the imaging device 5, and to suppress shading. Further, axial rays and off-axial rays are easily separatable from each other at third lens L3, fourth lens L4 and fifth lens L5, and correction of curvature of field becomes easy.

Alternatively, aperture stop St may be arranged in such a manner that the aperture stop St, in the optical axis direction, is located between the vertex of the object-side surface of second lens L2 and the vertex of the image-side surface of the second lens L2. In such a case, it is possible to suppress the height of rays at each lens, and to further reduce the size of the lens system in the diameter direction.

When the positive power arranged on the most image side is divided and allocated to two lenses of fourth lens L4 and fifth lens L5, correction of a spherical aberration becomes easy. It is possible to correct aberrations in an excellent manner also in a lens system having a small F-number.

When third lens L3 is a negative lens, and fourth lens L4 and fifth lens L5 are positive lenses, it is possible to reduce an angle at which peripheral rays enter an imaging device while suppressing chromatic aberrations. Therefore, it is possible to realize a lens system having high telecentricity.

When the object-side surface of first lens L1 is a concave surface, it is possible to make the negative power of the first lens L1 strong, and to easily obtain a wide angle of view and a long back focus. When the object-side surface of fourth lens L4 is a convex surface, it is possible to make the positive power of the fourth lens L4 strong, and to easily correct chromatic aberrations in an excellent manner in cooperation with third lens L3.

The imaging lens 1 illustrated in FIG. 1 includes first, second and third modes, which will be described next, in addition to the aforementioned basic structure. The first mode satisfies the following formula (1) when the focal length of an entire system is f, and the focal length of the first lens L1 is f1:

$$-1.25 < f1/f < -0.5 \quad (1).$$

When the value exceeds the upper limit of the formula (1), the power of the first lens L1 becomes too strong, and correction of curvature of field becomes difficult. Further, back focus becomes too long, and it becomes difficult to reduce the size of the lens system. When the value is lower than the lower limit of the formula (1), the power of the first lens L1 becomes too weak, and it becomes difficult to widen an angle of view and to secure sufficient back focus.

The second mode satisfies the following formulas (2) and (3) when the focal length of an entire system is f, and the focal length of the second lens L2 is f2, and the curvature radius of the object-side surface of the first lens L1 and the curvature radius of the image-side surface of the first lens L1 are R1 and R2, respectively:

$$0.4 < f2/f < 1.5 \quad (2); \text{ and}$$

$$0.05 < (R1+R2)/(R1-R2) < 0.95 \quad (3).$$

When the value exceeds the upper limit of the formula (2), the power of the second lens L2 becomes weak, and correction of curvature of field becomes difficult. Further, when aperture stop St is arranged between the second lens L2 and the third lens L3, power on the object side of the aperture stop St and power on the image side of the aperture stop St become unbalanced. Therefore, correction of a coma aberration becomes difficult. When the value is lower than the lower limit of the formula (2), the power of the second lens L2 becomes too strong, and an allowable error with respect to eccentricity becomes small. Therefore, production becomes difficult, or a production cost increases.

The value of (R1+R2)/(R1−R2) in formula (3) is a positive value less than or equal to 1.0 when the first lens L1 is a double concave lens in which the absolute value of the curvature radius of the object-side surface is larger than the absolute value of the curvature radius of the image-side surface, or when the first lens L1 is a double convex lens in which the absolute value of the curvature radius of the object-side surface is larger than the absolute value of the curvature radius of the image-side surface. When the first lens L1 is a double convex lens, the first lens L1 is a positive lens, and that contradicts the basic structure in which the first lens L1 is a negative lens. Therefore, the formula (3) is satisfied when the first lens L1 is a double concave lens in which the absolute value of the curvature radius of the object-side surface is larger than the absolute value of the curvature radius of the image-side surface.

When the upper limit or the lower limit of the formula (3) is not satisfied, a spherical aberration is insufficiently or excessively corrected. Therefore, it is impossible to obtain an excellent image. When the value exceeds the upper limit of the formula (3), correction of curvature of field becomes difficult. When the value is lower than the lower limit of the formula (3), the first lens L1 is a double concave lens in which a difference between the absolute value of the curvature radius of the object-side surface and the absolute value of the curvature radius of the image-side surface is small. Therefore, correction of a spherical aberration and a coma aberration becomes difficult.

The third mode satisfies the following formula (4) when the focal length of an entire system is f, and the focal length of the fifth lens L5 is f5:

$$0.99 < f5/f < 2.10 \quad (4).$$

When the upper limit or the lower limit of the formula (4) is not satisfied, the power of the fifth lens L5 becomes too strong or too weak. Therefore, the power of the fourth lens L4 and the power of the fifth lens L5 become unbalanced, and correction of a spherical aberration becomes difficult.

It is desirable that each of the imaging lenses of the first, second and third modes has the following structure. As a desirable mode, an imaging lens may have one of the structures, or two or more arbitrary structures in combination.

When the focal length of the entire system is f, a distance in air between the second lens L2 and the third lens L3 on an optical axis is D23, it is desirable that the following formula (5) is satisfied:

$$0.05 < D23/f < 0.85 \qquad (5).$$

When the value exceeds the upper limit of the formula (5), the distance between the second lens L2 and the third lens L3 becomes too long, and it becomes difficult to reduce the total length of the imaging lens. Further, it becomes difficult to reduce the lens diameter of the first lens L1. When the value is lower than the lower limit of the formula (5), the distance between the second lens L2 and the third lens L3 becomes too short, and it becomes difficult to correct curvature of field and a coma aberration in an excellent manner.

When the curvature radius of the object-side surface of the fifth lens L5 is R10 and the curvature radius of the image-side surface of the fifth lens L5 is R11, it is desirable that the following formula (6) is satisfied:

$$-1.40 < (R10 + R11)/(R10 - R11) < -0.2 \qquad (6).$$

When the value of (R10+R11)/(R10−R11) in the formula (6) is a negative value exceeding the upper limit of the formula (6), the fifth lens L5 is a double convex lens in which the curvature radius of the object-side surface and the curvature radius of the image-side surface are close to each other (the curvature radius of the object-side surface is less than the curvature radius of the image-side surface), or a double concave lens in which the curvature radius of the object-side surface and the curvature radius of the image-side surface are close to each other (the curvature radius of the object-side surface is less than the curvature radius of the image-side surface). Since a double concave lens is a negative lens, the double concave lens contradicts the basic structure requirement that the fifth lens L5 is a positive lens. Therefore, the value exceeds the upper limit of the formula (6) when the fifth lens L5 is a double convex lens in which the absolute value of the curvature radius of the object-side surface and the absolute value of the curvature radius of the image-side surface are close to each other. However, when the fifth lens L5 is such a double convex lens, correction of a spherical aberration becomes difficult.

The value is lower than the lower limit of the formula (6) when the fifth lens L5 is a negative meniscus lens having a convex image-side surface or a positive meniscus lens having a convex object-side surface. Here, a case in which the fifth lens L5 is a positive meniscus lens having a convex object-side surface will be considered based on the basic structure requirement that the fifth lens L5 is a positive lens. When the fifth lens L5 is a positive meniscus lens having a convex object-side surface and the value is lower than the lower limit of the formula (6), a difference between the curvature radius of the object-side surface of the fifth lens L5 and the curvature radius of the image-side surface of the fifth lens L5 becomes too small, and positive power of the fifth lens L5 becomes weak. Therefore, the power of the fourth lens L4 and the power of the fifth lens L5 become unbalanced, and correction of a spherical aberration becomes difficult, or the absolute value of the curvature radius of the object-side surface of the fifth lens L5 becomes too small, and correction of curvature of field and a coma aberration becomes difficult.

When the focal length of the first lens L1 is f1, and the focal length of the second lens L2 is f2, it is desirable that the following formula (7) is satisfied:

$$-1.30 < f1/f2 < -0.65 \qquad (7).$$

When the value exceeds the upper limit of the formula (7), the negative power of the first lens L1 becomes too strong, compared with the positive power of the second lens L2. It is possible to easily widen an angle of view, but correction of curvature of field and a coma aberration becomes difficult. When the value is lower than the lower limit of the formula (7), the positive power of the second lens L2 becomes too strong, compared with the negative power of the first lens L1. Therefore, it becomes difficult to widen an angle of view and to secure sufficient back focus.

When the focal length of the entire system is f, and the focal length of the fourth lens L4 is f4, it is desirable that the following formula (8) is satisfied:

$$0.5 < f4/f < 2.5 \qquad (8).$$

When the value exceeds the upper limit of the formula (8), the power of the fourth lens L4 becomes too weak, and it becomes difficult to correct chromatic aberrations in an excellent manner in cooperation with the third lens, or since the power of the fourth lens L4 becomes too weak, the power of the fourth lens L4 and the power of the fifth lens L5 become unbalanced, and correction of a spherical aberration becomes difficult. When the value is lower than the lower limit of the formula (8), the power of the fourth lens L4 becomes too strong. Therefore, the power of the fourth lens L4 and the power of the fifth lens L5 become unbalanced, and correction of a spherical aberration becomes difficult.

When the focal length of the entire system is f and a distance in air between the first lens L1 and the second lens L2 on an optical axis is D2, it is desirable that the following formula (9) is satisfied:

$$0.1 < D2/f < 0.6 \qquad (9).$$

When the value exceeds the upper limit of the formula (9), the distance between the first lens L1 and the second lens L2 becomes too long, and the diameter of the first lens L1 becomes large. Therefore, it becomes difficult to reduce the size of the lens system. When the value is lower than the lower limit of the formula (9), the first lens L1 and the second lens L2 are too close to each other. Therefore, it becomes difficult to provide long back focus.

When the focal length of the entire system is f and a combined focal length of the third lens L3 through the fifth lens L5 is f345, it is desirable that the following formula (10) is satisfied:

$$1.2 < f345/f < 3.8 \qquad (10).$$

When the value exceeds the upper limit of the formula (10), the power of the fourth lens L4 and the fifth lens L5 becomes weak or the power of the third lens L3 becomes too strong. Therefore, it becomes difficult to suppress an angle of incidence at which rays from the lens system enter the imaging device 5, and it becomes difficult to produce a lens having high telecentricity. When the value is lower than the lower limit of the formula (10), it becomes difficult to correct curvature of field and a coma aberration in an excellent manner.

When a combined focal length of the first lens L1 and the second lens L2 is f12 and a combined focal length of the third lens L3 through the fifth lens L5 is f345, it is desirable that the following formula (11) is satisfied:

$$0.1 < |f12/f345| < 1.8 \qquad (11).$$

When the value exceeds the upper limit of the formula (11), the total length of the optical system becomes long, and it becomes impossible to achieve reduction in the size of the optical system. When the value is lower than the lower limit of the formula (11), correction of a coma aberration and curvature of field becomes difficult.

When a combined focal length of the first lens L1 and the second lens L2 is f12, it is desirable that the value of f12 is a positive value. When the value of f12 is a positive value, correction of curvature of field and a coma aberration becomes easy.

When the focal length of the entire system is f and the curvature radius of an object-side surface of the first lens L1 is R1, it is desirable that the following formula (12) is satisfied:

$$-10.0 < R1/f < -0.5 \qquad (12).$$

When the value exceeds the upper limit of the formula (12), the absolute value of the curvature radius of the object-side surface of the first lens L1 becomes too small. It is possible to easily widen an angle of view, but it becomes difficult to suppress distortion and curvature of field. When the value is lower than the lower limit of the formula (12), the absolute value of the curvature radius of the object-side surface of the first lens L1 becomes large, and correction of a spherical aberration becomes difficult, or it becomes difficult to reduce the size of the first lens L1 in the direction of its diameter.

When the focal length of the entire system is f and the focal length of the third lens L3 is f3, it is desirable that the following formula (13) is satisfied:

$$-1.5 < f3/f < -0.2 \qquad (13).$$

When the value exceeds the upper limit of the formula (13), the power of the third lens L3 becomes too strong. Therefore, it becomes difficult to suppress an angle of incidence at which rays from the lens system enter the imaging device 5, and it becomes difficult to produce a lens having high telecentricity. When the value is lower than the lower limit of the formula (13), the power of the third lens L3 becomes too weak, and correction of chromatic aberrations becomes difficult.

When the focal length of the entire system is f and a length from the object-side surface of the first lens L1 to image plane Sim on an optical axis is L, it is desirable that the following formula (14) is satisfied. Here, a length in air is used for a back focus portion of L.

$$2.5 < L/f < 5.0 \qquad (14).$$

When the value exceeds the upper limit of the formula (14), the size of the lens system becomes large. When the value is lower than the lower limit of the formula (14), it is possible to easily reduce the size of the lens system. However, an angle of view is insufficiently widened, or the total length of the lens system becomes too short. It is possible to easily reduce the size of the lens system, but the thickness of each lens needs to be reduced. Therefore, production of the lens system becomes difficult, or the cost of production increases.

Here, it is desirable that the value of L is less than or equal to 22 mm. When the value of L exceeds 22 mm, the lens system becomes large, and it becomes impossible to achieve reduction in size. It is more desirable that L is less than or equal to 20 mm. Further, it is even more desirable that L is less than or equal to 19 mm.

With respect to each of the aforementioned formulas, it is desirable to satisfy a modified lower limit and a modified upper limit as will be described next. As a desirable mode, each formula composed of a modified value of the lower limit and a modified value of the upper limit, as will be described next, in combination may be satisfied.

As a modified value of the lower limit of the formula (1), −1.20 is desirable, and −1.15 is more desirable, and −1.10 is even more desirable. As a modified value of the upper limit of the formula (1), −0.55 is desirable, and −0.6 is more desirable, and −0.8 is even more desirable.

For example, it is desirable that the following formula (1-2) is satisfied instead of the formula (1), and it is more desirable that the following formula (1-3) is satisfied:

$$-1.15 < f1/f < -0.55 \qquad (1\text{-}2); \text{ and}$$

$$-1.10 < f1/f < -0.60 \qquad (1\text{-}3).$$

As a modified value of the lower limit of the formula (2), 0.6 is desirable, and 0.7 is more desirable, and 0.8 is even more desirable. As a modified value of the upper limit of the formula (2), 1.3 is desirable, and 1.2 is more desirable.

As a modified value of the lower limit of the formula (3), 0.2 is desirable, and 0.4 is more desirable, and 0.6 is even more desirable. As a modified value of the upper limit of the formula (3), 0.90 is desirable, and 0.86 is more desirable, and 0.79 is even more desirable.

As a modified value of the lower limit of the formula (4), 1.00 is desirable, and 1.20 is more desirable, and 1.30 is even more desirable. As a modified value of the upper limit of the formula (4), 2.05 is desirable, and 1.98 is more desirable.

As a modified value of the lower limit of the formula (5), 0.20 is desirable, and 0.25 is more desirable, and 0.27 is even more desirable. Further, 0.30 is still even more desirable. As a modified value of the upper limit of the formula (5), 0.62 is desirable, and 0.61 is more desirable, and 0.60 is even more desirable.

As a modified value of the lower limit of the formula (6), −1.30 is desirable, and −1.20 is more desirable. As a modified value of the upper limit of the formula (6), −0.3 is desirable, and −0.4 is more desirable.

As a modified value of the lower limit of the formula (7), −1.25 is desirable, and −1.20 is more desirable, and −1.15 is even more desirable. As a modified value of the upper limit of the formula (7), −0.75 is desirable, and −0.85 is more desirable, and −0.90 is even more desirable.

As a modified value of the lower limit of the formula (8), 0.7 is desirable, and 0.8 is more desirable, and 0.9 is even more desirable. As a modified value of the upper limit of the formula (8), 1.5 is desirable, and 1.25 is more desirable, and 1.20 is even more desirable.

As a modified value of the lower limit of the formula (9), 0.2 is desirable. As a modified value of the upper limit of the formula (9), 0.51 is desirable.

As a modified value of the lower limit of the formula (10), 1.3 is desirable, and 1.4 is more desirable. As a modified value of the upper limit of the formula (10), 2.5 is desirable, and 2.4 is more desirable, and 2.3 is even more desirable. Further, 2.25 is still even more desirable.

As a modified value of the lower limit of the formula (11), 0.1 is desirable, and 0.2 is more desirable, and 0.3 is even more desirable. As a modified value of the upper limit of the formula (11), 1.5 is desirable, and 1.3 is more desirable, and 1.2 is even more desirable.

As a modified value of the lower limit of the formula (12), −6.0 is desirable, and −5.5 is more desirable, and −5.2 is even more desirable. As a modified value of the upper limit of the formula (12), −1.0 is desirable, and −1.5 is more desirable, and −1.7 is even more desirable.

As a modified value of the lower limit of the formula (13), −1.2 is desirable, and −1.1 is more desirable, and −1.0 is even more desirable. Further, −0.9 is still even more desirable. As a modified value of the upper limit of the formula (13), −0.3 is desirable, and −0.4 is more desirable, and −0.45 is even more desirable.

As a modified value of the lower limit of the formula (14), 2.8 is desirable, and 3.0 is more desirable, and 3.4 is even more desirable. As a modified value of the upper limit of the formula (14), 4.8 is desirable, and 4.6 is more desirable, and 4.5 is even more desirable.

When the Abbe number of the material of the first lens L1 for d-line is vd1, it is desirable that vd1 is greater than or equal to 40. In such a case, it is possible to correct a longitudinal chromatic aberration in an excellent manner. It is more desirable that vd1 is greater than or equal to 45 to correct the longitudinal chromatic aberration in a more excellent manner. Further, it is even more desirable that vd1 is greater than or equal to 55, and it is still even more desirable that vd1 is greater than or equal to 60.

When the Abbe number of the material of the second lens L2 for d-line is vd2, it is desirable that vd2 is greater than or equal to 35. In such a case, it is possible to correct a longitudinal chromatic aberration in an excellent manner. It is more desirable that vd2 is greater than or equal to 40 to correct the longitudinal chromatic aberration in a more excellent manner. Further, it is even more desirable that vd2 is greater than or equal to 45.

When the Abbe number of the material of the third lens L3 for d-line is vd3, it is desirable that vd3 is less than 35. In such a case, it is possible to correct a longitudinal chromatic aberration and a lateral chromatic aberration in an excellent manner. It is more desirable that vd3 is less than 30 to correct the longitudinal chromatic aberration and the lateral chromatic aberration in a more excellent manner. Further, it is even more desirable that vd3 is less than 27, and it is still even more desirable that vd3 is less than 26. Meanwhile, it is desirable that vd3 is greater than 15 to reduce the cost, and it is more desirable that vd3 is greater than 20.

When the Abbe number of the material of the fourth lens L4 for d-line is vd4, it is desirable that vd4 is greater than or equal to 40. In such a case, it is possible to correct a longitudinal chromatic aberration in an excellent manner. It is more desirable that vd4 is greater than or equal to 45 to correct the longitudinal chromatic aberration in a more excellent manner. Further, it is even more desirable that vd4 is greater than or equal to 52.

When the Abbe number of the material of the fifth lens L5 for d-line is vd5, it is desirable that vd5 is greater than or equal to 40. In such a case, it is possible to correct a longitudinal chromatic aberration in an excellent manner. It is more desirable that vd5 is greater than or equal to 45 to correct the longitudinal chromatic aberration in a more excellent manner. Further, it is even more desirable that vd5 is greater than or equal to 52.

When the refractive index of a material constituting the first lens L1 for d-line is Nd1, it is desirable that Nd1 is less than or equal to 1.80. When Nd1 is less than or equal to 1.80, it is possible to suppress the cost of the material constituting the first lens L1, and it becomes possible to select a material having a large Abbe number. It becomes possible to suppress generation of chromatic aberrations, and to produce a lens having high resolution performance while the lens has a wide angle of view. It is more desirable that Nd1 is less than or equal to 1.65, and it is even more desirable that Nd1 is less than or equal to 1.60. Further, it is desirable that Nd1 is greater than or equal to 1.46. When Nd1 is less than 1.46, it is possible to select a material having a large Abbe number, and to suppress generation of chromatic aberrations. However, the material has low abrasion resistance, and the material is soft material. Therefore, for example, when the lens is used as a lens for an in-vehicle camera or a lens for a surveillance camera, the weather resistance characteristic of the material is insufficient. It is more desirable that Nd1 is greater than or equal to 1.50.

When the refractive index of a material constituting the second lens L2 for d-line is Nd2, it is desirable that Nd2 is greater than or equal to 1.72. In such a case, it is possible to easily increase the power of the second lens L2, and correction of curvature of field becomes easy. It is more desirable that Nd2 is greater than or equal to 1.75, and it is even more desirable that Nd2 is greater than or equal to 1.80.

When the refractive index of the material of the third lens L3 for d-line is Nd3, it is desirable that Nd3 is less than 1.75. In such a case, it is possible to produce the third lens L3 at low cost, and to reduce the cost of the entire lens system. It is more desirable that Nd3 is less than 1.70 to produce the lens at lower cost. It is even more desirable that Nd3 is less than 1.68, and it is still even more desirable that Nd3 is less than 1.66. Meanwhile, the negative third lens 13 has a function of increasing the telecentricity while suppressing chromatic aberrations in cooperation with the positive fourth lens L4 and the positive fifth lens L5. Therefore, it is desirable that Nd3 is greater than 1.55 to maintain the power balance of the third lens L3 with the fourth lens L4 and the fifth lens L5 in an excellent manner. It is more desirable that Nd3 is greater than 1.59.

When the refractive index of the material of the fourth lens L4 for d-line is Nd4, it is desirable that Nd4 is less than or equal to 1.68. When Nd4 is greater than 1.68, the power of the fourth lens L4 becomes strong, and the power of the fourth lens L4 and the power of the fifth lens L5 become unbalanced, and correction of a spherical aberration becomes difficult, or if plastic is used as the material of the third lens L3, the fourth lens L4 and the fifth lens L5, the negative power of the third lens L3 and the positive power of the fourth lens L4 and the fifth lens L5 become unbalanced, and a movement amount of a focus becomes large when temperature changes. Further, since it is difficult to select a material having a large Abbe number from currently usable optical materials, correction of chromatic aberrations becomes difficult.

When the refractive index of the material of the fifth lens L5 for d-line is Nd5, it is desirable that Nd5 is less than or equal to 1.68. When Nd5 is greater than 1.68, the power of the fifth lens L5 becomes strong, and the power of the fourth lens L4 and the power of the fifth lens L5 become unbalanced, and correction of a spherical aberration becomes difficult, or if plastic is used as the material of the third lens L3, the fourth lens L4 and the fifth lens L5, the negative power of the third lens L3 and the positive power of the fourth lens L4 and the fifth lens L5 become unbalanced, and a movement amount of a focus becomes large when temperature changes. Further, since it is difficult to select a material having a large Abbe number from currently usable optical materials, correction of chromatic aberrations becomes difficult.

It is desirable that the first lens L1 is a double concave lens. In such a case, it is possible to increase the negative power of the first lens L1, and that is advantageous to widening an angle of view. Further, it is possible to easily provide long back focus.

It is desirable that the second lens L2 is a double convex lens. In such a case, it is possible to increase the power of the second lens L2. Even when the power of the first lens L1 is increased to widen an angle of view, it is possible to easily increase the power of the second lens L2. Since aberrations generated in the positive second lens L2 can cancel out aberrations that have been generated in the negative first lens L1, correction of a spherical aberration, a coma aberration and curvature of field becomes easy.

It is desirable that the third lens L3 is a double concave lens. In such a case, it is possible to increase the power of the third lens L3, and correction of a longitudinal chromatic aberration and a lateral chromatic aberration becomes easy.

It is desirable that the fourth lens L4 is a double convex lens. In such a case, it is possible to increase the power of the fourth lens L4, and it is possible to correct chromatic aberrations in an excellent manner in cooperation with the third lens L3.

It is desirable that the fifth lens L5 is a lens having a convex object-side surface. In such a case, correction of curvature of field becomes easy. When the fifth lens L5 is a double convex lens, correction of curvature of field is easy. When the fifth lens L5 is a meniscus lens having a convex object-side surface, correction of a spherical aberration becomes easy.

Here, the desirable shape of the surfaces of the first lens L1 through the fifth lens L5, as described above, is considered in a paraxial region when each lens is an aspherical lens.

It is desirable that at least one of the object-side surface and the image-side surface of the third lens L3 is an aspherical surface. In such a case, a longitudinal chromatic aberration and a lateral chromatic aberration are easily corrected in an excellent manner together with correction of a spherical aberration and curvature of field.

Here, when a surface is an aspherical surface, the center of each lens surface, i.e., a point of intersection of the surface and optical axis Z is Ci (i corresponds to a surface number which will be described later in the section of examples). Further, when a point on the lens surface is Xi, and a point of intersection of a normal to the lens surface at point Xi and optical axis Z is Pi, power at the point Xi is defined based on whether the point Pi is located on the object side of the point Ci or on the image side of the point Ci. When the aspherical surface is an object-side surface, if the point Pi is located on the image side of the point Ci, power at point Xi is defined as positive power. If the point Pi is located on the object side of the point Ci, power at point Xi is defined as negative power. In contrast, when the aspherical surface is an image-side surface, if the point Pi is located on the object side of the point Ci, power at point Xi is defined as positive power. If the point Pi is located on the image side of the point Ci, power at point Xi is defined as negative power.

Further, in an aspherical surface, a segment connecting point Xi and point Pi is defined as curvature radius Rxi at the point Xi. When the absolute value of RXi is |RXi|=|Xi−Pi|, and the absolute value of a curvature radius at point Ci is |Ri|, if the sign of power at the point Xi and the sign of power at the center are the same, a shape in which power at the point Xi is weaker than power at the center is a shape in which |RXi| is greater than |Ri|. A shape in which power at the point Xi is stronger than power at the center is a shape in which |RXi| is less than |Ri|.

The general explanation about the aspherical surface is applicable also to an arbitrary aspherical lens surface of an imaging lens of the present invention. In the explanation, the signs Ci, Xi, Pi, RXi, and Ri were used for the convenience of explanation, and are not limited. The point Xi in the above explanation may be an arbitrary point on a lens surface. For example, the point Xi may be regarded as a point at an axial ray diameter edge or a point at an effective diameter edge.

It is desirable that the object-side surface of the third lens L3 is an aspherical surface. In such a case, correction of a spherical aberration and curvature of field becomes easy. It is desirable that the object-side surface of the third lens L3 has a shape having negative power at the center and weaker negative power at an axial ray diameter edge, compared with the center. When the object-side surface of the third lens L3 is such a shape, correction of a spherical aberration and curvature of field becomes easy.

Figure 2:
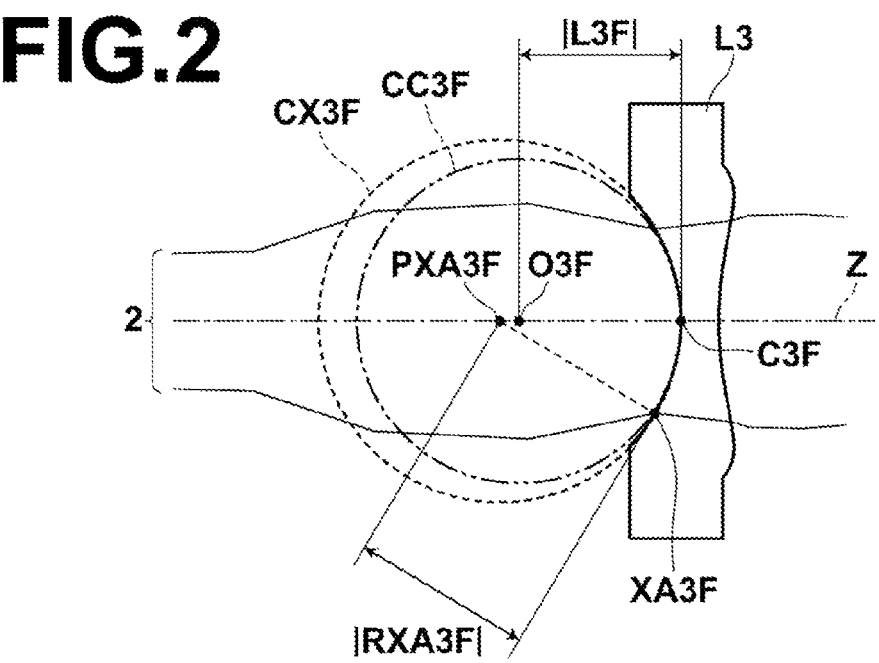
FIG. 2 is a diagram for explaining the aspherical surface shape of an object-side surface of the third lens in the imaging lens illustrated in FIG. 1.

Here, with reference to FIG. 2, the shape of the object-side surface of the third lens L3 will be described. FIG. 2 illustrates a cross section of the third lens L3 and axial rays 2. In FIG. 2, the other lenses are not illustrated so that the drawing does not become complex. In other words, FIG. 2 illustrates the axial rays 2 in an imaging lens 1 when first lens L1 through fifth lens L5 are present in the imaging lens 1.

In FIG. 2, point C3F is a center of the object-side surface of the third lens L3. The point C3F is a point of intersection of the object-side surface of the third lens L3 and optical axis Z. In FIG. 2, point XA3F is a point at an axial ray diameter edge on the object-side surface of the third lens L3. The point XA3F is a point of intersection of an outermost ray of the axial rays 2 and the object-side surface of the third lens L3. Here, a point of intersection of a normal to the lens surface at the point XA3F and optical axis Z is point PXA3F, as illustrated in FIG. 2.

At this time, a segment connecting the point XA3F and the point PXA3F is defined as curvature radius RXA3F at the point XA3F, and the length of the segment is defined as the absolute value |RXA3F| of the curvature radius RXA3F. Further, a curvature radius at point C3F, in other words, a curvature radius at the center of the object-side surface of the third lens L3 is defined as L3F, and the absolute value of the curvature radius is defined as |L3F|. In other words, when the center of curvature in a paraxial region of the object-side surface of the third lens L3 is point O3F, the length of a segment connection the point C3F and the point O3F is |L3F|.

The expression that the object-side surface of the third lens L3 "has negative power at the center" means that the shape of a paraxial region including the point C3F is concave. Further, the expression that the object-side surface of the third lens L3 has "a shape having weaker negative power at an axial ray diameter edge, compared with the center" means a shape in which the point PXA3F is located on the object side of the point C3F, and the value of |RXA3F| is larger than the value of |L3F|.

In FIG. 2, circle CC3F is drawn by a double dot dashed line, and circle CX3F is drawn by a broken line to help understanding of the drawing. The circle CC3F has a radius of |L3F|, and passes point C3F, and the center of the circle CC3F is point O3F on the optical axis. The circle CX3F has a radius of |RXA3F|, and passes point XA3F, and the center of the circle CX3F is point PXA3F on the optical axis. The circle CX3F is larger than the circle CC3F, and |RXA3F|>|L3F| is clearly illustrated.

it is desirable that the object-side surface of the third lens L3 has a shape having negative power at the center and weaker negative power at an effective diameter edge, compared with the center. When the object-side surface of the third lens L3 is such a shape, correction of a spherical aberration and curvature of field becomes easy.

Here, the phrase "effective diameter of a surface" means the diameter of a circle composed of outermost points (points farthest from the optical axis) in the direction of the diameter when points at which all rays contributing to image formation and a lens surface intersect with each other are considered. Further, the term "effective diameter edge" means the outermost points. When a system is rotationally symmetric with respect to an optical axis, a figure composed of the outermost points is a circle. However, when a system is not rotationally symmetric, a figure composed of the outermost points is not a circle in some cases. In such a case, an equivalent circle may be considered, and the diameter of the equivalent circle may be regarded as an effective diameter. For example, the effective diameter may be determined based on the size of an imaging plane of an imaging device when a lens system is used in combination with the imaging device. When the imaging plane is a rectangle, for example, ½ of the diagonal length of the rectangle may be determined as the maximum image height, and the effective diameter may be calculated.

It is desirable that the image-side surface of the third lens L3 is an aspherical surface. In such a case, correction of a spherical aberration and curvature of field is easy. It is desirable that the image-side surface of the third lens L3 has a shape having negative power at the center and weaker negative power at an axial ray diameter edge, compared with the center, or a shape having negative power at the center and positive power at an axial ray diameter edge. When the image-side surface of the third lens L3 is such a shape, correction of a spherical aberration and curvature of field becomes easy.

Further, it is desirable that the image-side surface of the third lens L3 has a shape having negative power at the center and weaker negative power at an effective diameter edge, compared with the center, or a shape having negative power at the center and positive power at the effective diameter edge. When the image-side surface of the third lens L3 is such a shape, correction of a spherical aberration and curvature of field is easy.

It is desirable that at least one of the object-side surface of fourth lens L4 and the image-side surface of the fourth lens L4 is an aspherical surface. In such a case, it is possible to easily correct a longitudinal chromatic aberration and a lateral chromatic aberration in an excellent manner together with correction of a spherical aberration and curvature of field.

It is desirable that the object-side surface of the fourth lens L4 is an aspherical surface. In such a case, correction of a spherical aberration becomes easy. It is desirable that the object-side surface of the fourth lens L4 has a shape having positive power at the center and weaker positive power at an axial ray diameter edge, compared with the center. When the object-side surface of the fourth lens L4 has such a shape, correction of a spherical aberration and curvature of field becomes easy.

It is desirable that the object-side surface of the fourth lens L4 has a shape having positive power at the center and weaker positive power at an effective diameter edge, compared with the center. When the object-side surface of the fourth lens L4 is such a shape, correction of a spherical aberration and curvature of field is easy.

It is desirable that the image-side surface of the fourth lens L4 is an aspherical surface. In such a case, correction of a spherical aberration becomes easy. It is desirable that the image-side surface of the fourth lens L4 has a shape having positive power at the center and weaker positive power at an axial ray diameter edge, compared with the center, or a shape having positive power at the center and negative power at the axial ray diameter edge. When the image-side surface of the fourth lens L4 has such a shape, correction of a spherical aberration and curvature of field becomes easy.

It is desirable that the image-side surface of the fourth lens L4 has a shape having positive power at the center and weaker positive power at an effective diameter edge, compared with the center, or a shape having positive power at the center and negative power at the effective diameter edge. When the image-side surface of the fourth lens L4 has such a shape, correction of a spherical aberration and curvature of field becomes easy.

It is desirable that at least one of the object-side surface of fifth lens L5 and the image-side surface of the fifth lens L5 is an aspherical surface. In such a case, it is possible to easily correct a spherical aberration, a coma aberration and curvature of field in an excellent manner. Further, it is possible to increase the telecentricity.

It is desirable that the object-side surface of the fifth lens L5 is an aspherical surface. In such a case, correction of a coma aberration and curvature of field becomes easy. It is desirable that the object-side surface of the fifth lens L5 has a shape having positive power at the center and stronger positive power at an axial ray diameter edge, compared with the center. When the object-side surface of the fifth lens L5 has such a shape, correction of a coma aberration and curvature of field becomes easy. Further, it is possible to increase the telecentricity.

It is desirable that the object-side surface of the fifth lens L5 has a shape having positive power at the center and stronger positive power at an effective diameter edge, compared with the center. When the object-side surface of the fifth lens L5 is such a shape, correction of a coma aberration and curvature of field is easy. Further, it is possible to increase the telecentricity.

It is desirable that the image-side surface of the fifth lens L5 is an aspherical surface. In such a case, correction of a spherical aberration becomes easy. It is desirable that the image-side surface of the fifth lens L5 has a shape having positive power at the center and weaker positive power at an axial ray diameter edge, compared with the center, or a shape having positive power at the center and negative power at the axial ray diameter edge. When the image-side surface of the fifth lens L5 has such a shape, correction of a spherical aberration and curvature of field becomes easy.

It is desirable that the image-side surface of the fifth lens L5 has a shape having positive power at the center and weaker positive power at an effective diameter edge, compared with the center, or a shape having positive power at the center and negative power at the effective diameter edge. When the image-side surface of the fifth lens L5 has such a shape, correction of a spherical aberration and curvature of field becomes easy.

When the focal length of the entire system is f, and the maximum half angle of view is ω, it is desirable that distortion is less than or equal to ±10% in a system in which an ideal image height is represented by f×tan (ω). In such a case, it is possible to obtain an image with little distortion. In the system in which the ideal image height is represented by f×tan (ω), it is more desirable that distortion is less than or equal to ±5%. In such a case, it is possible to further suppress distortion of an image.

It is desirable that none of the lenses constituting the lens system is a cemented lens. For example, when the lens system is used as an in-vehicle lens, the lens system needs to have high heat-resistant characteristics and high environment-resistant characteristics. If a cemented lens is used, a special adhesive needs to be used to improve the heat-resistant characteristics and the environment-resistant characteristics. Further, a process for improving the environment-resistant characteristics is necessary. Therefore, a cost becomes high. Hence, it is desirable that all of the first lens L1 through the fifth lens L5 are single lenses.

When an imaging lens is used in tough environment conditions, for example, such as use in an in-vehicle camera or a surveillance camera, the first lens L1, which is arranged on the most object side, needs to use a material resistant to a deterioration of a surface by wind and rain and a change in temperature by direct sun light, and resistant to chemicals, such as oils and fats and detergents. In other words, the material needs to be highly water-resistant, weather-resistant, acid-resistant, chemical-resistant, and the like. Further, in some cases, the material needs to be hard and not easily breakable. If the material of the first lens L1 is glass, it is possible to satisfy such needs. Alternatively, transparent ceramic may be used as the material of the first lens L1. It is desirable that the first lens L1 is a glass spherical lens under the above circumstances and also to lower cost. However, when high optical performance is important, a glass aspherical surface may be used as the first lens L1.

Further, a protection means may be applied to the object-side surface of the first lens L1 to increase the strength, scratch resistance, and chemical resistance of the surface. In that case, the material of the first lens L1 may be plastic. The protection means may be a hard coating or a water-repellent coating.

It is desirable that the material of the second lens L2 is glass. When the second lens L2 is a glass lens, the refractive index of the second lens L2 is selectable from a wider range of values, and it becomes possible to increase the refractive index of the second lens L2. When the refractive index of the second lens L2 is increased, it is possible to easily increase the power of the second lens L2, and correction of curvature of field becomes easy.

Here, the material of the second lens L2 may be plastic. When the second lens L2 is a plastic lens, it is possible to produce the lens system at low cost. Further, when an aspherical surface is adopted in the second lens L2, accurate regeneration of the aspherical surface becomes easy. Hence, it is possible to produce high performance lens.

It is desirable that the material of the third lens L3 is plastic. In such a case, it is possible to easily produce a surface having an accurate aspherical shape, and to easily secure high optical performance. Further, that is advantageous to reduction in cost and weight of the lens.

It is desirable that the material of the fourth lens L4 is plastic. In such a case, it is possible to easily produce a surface having an accurate aspherical shape, and to easily secure high optical performance. Further, that is advantageous to reduction in cost and weight of the lens.

It is desirable that the material of the fifth lens L5 is plastic. In such a case, it is possible to easily produce a surface having an accurate aspherical shape, and to easily secure high optical performance. Further, that is advantageous to reduction in cost and weight of the lens.

A plastic lens has a drawback that a movement amount of a focal position is large when temperature changes. If the third lens L3, the fourth lens L4 and the fifth lens L5 are plastic lenses, the movement amount of a focal position by positive lenses and the movement amount of a focal position by a negative lens are cancelled out by each other when temperature changes. Therefore, it is possible to suppress deterioration of performance due to a change in temperature.

When an imaging lens is used in an in-vehicle camera, it is desirable that the imaging lens is usable in a wide temperature range including an outdoor temperature in a cold district through a temperature in a car in summer in the tropical zone. For example, when the imaging lens is used in such tough conditions, the material of all of the lenses may be glass. When the third lens L3, the fourth lens L4 and the fifth lens L5 are glass lenses, a lens system having high heat-resistant characteristics is achievable.

Further, various kinds of filters that cut, pass or reflect light in a specific wavelength band, such as a UV (Ultra Violet) cut filter and an IR (InfraRed) cut filter, may be inserted between the lens system and the imaging device 5 based on the purpose of the imaging lens 1. Alternatively, a coating having a function similar to such a filter may be applied to a lens surface, or a material that absorbs ultraviolet light, blue light, infrared light or the like may be used as the material of one of the lenses.

It is desirable that the lens system consists of only five lenses of the first lens L1, the second lens L2, the third lens L3, the fourth lens L4 and the fifth lens L5. In such a case, it is possible to produce the lens system at low cost while high optical performance is maintained.

FIG. 1 illustrates a case of arranging optical member PP, which is assumed to be various filters, between a lens system and the imaging device 5. Alternatively, the various filters may be arranged between the lenses.

Here, rays of light passing the outside of the effective diameter between lenses may become stray light, and reach the image plane. Further, the stray light may become ghost. Therefore, it is desirable that a light shield means for blocking the stray light is provided, if necessary. The light shield means may be provided, for example, by applying an opaque paint to a portion of a lens in the outside of the effective diameter, or by providing there an opaque plate member. Alternatively, an opaque plate member, as a light shield means, may be provided in the optical path of rays that will become stray light. Alternatively, a hood-like member for blocking stray light may be provided further on the object-side of the most-object-side lens. FIG. 1 illustrates an example in which a light shield means 11 is provided in the outside of the effective diameter on the image-side surface of the first lens L1. The position at which the light shield means is provided is not limited to the example illustrated in FIG. 1. The light shield means may be arranged on another lens or between lenses. For example, in the lens system illustrated in FIG. 1, it is desirable that the light shield means for blocking rays that pass the outside of the effective diameter is provided between the fourth lens L4 and the fifth lens L5. In such a case, it is possible to prevent ghost.

Further, a member, such as a stop, may be arranged between lenses to block peripheral rays in such a manner that relative illumination is within a practically acceptable range. The peripheral rays are rays from an object point that is not on optical axis Z, and pass the peripheral portion of the entrance pupil of an optical system. When a member that blocks the peripheral rays is provided in such a manner, it is possible to improve the image quality in the peripheral portion of the image formation area. Further, the member can reduce ghost by blocking stray light that generates the ghost. As an example, FIG. 1 illustrates a case of providing a light shield means 12 for blocking peripheral rays and stray light on the object-side surface of the fifth lens L5. Here, the light shield means 12 functions as a vignetting stop that vignettes (VIGNETTING: vignetting).

It is not always necessary that the imaging lens of the present invention has the light shield member for blocking peripheral rays, as described above. For example, as illustrated in the structural diagram of the imaging lens 10 in FIG. 10, a structure using no light shield member for blocking peripheral rays is possible, and high optical performance is achievable also in such a structure. The imaging lens 10 illustrated in FIG. 3 corresponds to Example 11, which will be described later.

Next, numerical value examples of imaging lenses of the present invention will be described. Lens cross sections of imaging lenses of Example 1 through Example 23 are illustrated in FIG. 4 through FIG. 26, respectively. In FIG. 4 through FIG. 26, the left side of the diagram is the object side, and the right side of the diagram is the image side. Further, aperture stop St and optical member PP are illustrated. In each diagram, the aperture stop St does not represent the shape nor the size of the aperture stop St but the position of the aperture stop St on optical axis Z. In each example, signs Ri, Di (i=1, 2, 3, ...) in the lens cross section correspond to Ri, Di in lens data that will be described next.

Table 1 through Table 23 show lens data about the imaging lenses of Example 1 through Example 23, respectively. In each table, (A) shows basic lens data, and (B) shows various kinds of data, and (C) shows aspherical surface data.

In the basic lens data, column Si shows the surface number of the i-th surface (i=1, 2, 3, ...). The most object-side surface of composition elements is the first surface, and surface numbers sequentially increase toward the image side. Column Ri shows the curvature radius of the i-th surface, and column Di shows a distance between the i-th surface and the (i+1)th surface on optical axis Z. Here, the sign of a curvature radius is positive when the shape of a surface is convex toward the object side, and the sign of a curvature radius is negative when the shape of a surface is convex toward the image side. Further, column Ndj shows the refractive index of the j-th optical member (j=1, 2, 3, ...) for d-line (wavelength is 587.6 nm). The most-object side lens is the first optical member, and the number j sequentially increases toward the image side. The column νdj shows the Abbe number of the j-th optical element for d-line. Here, the basic lens data include aperture stop St and optical member PP. In the column of the curvature radius, the term (APERTURE STOP) is also written for a surface corresponding to aperture stop St.

In various kinds of data, L (in Air) is a length (a back focus portion is a length in air) on optical axis Z from the object-side surface of the first lens L1 to image plane Sim, and Bf (in Air) is a length (corresponding to back focus, length in air) on optical axis Z from the image-side surface of the most-image-side lens to image plane Sim, and f is the focal length of the entire system, and f1 is the focal length of the first lens L1, and f2 is the focal length of the second lens L2, and f3 is the focal length of the third lens L3, and f4 is the focal length of the fourth lens L4, and f5 is the focal length of the fifth lens L5, and f12 is the combined focal length of the first lens L1 and the second lens L2, and f345 is the combined focal length of the third lens L3 through the fifth lens L5.

Here, the imaging lenses of Examples 1, 3, 6, 7 and 23 are designed by assuming that a vignetting stop, which is a light shield means for blocking peripheral rays and stray light, is provided. The surface number of a surface on which the vignetting stop is provided and the radius of the vignetting stop are represented as a vignetting surface number and a vignetting aperture diameter, respectively.

In the basic lens data, mark "*" is attached to the surface number of an aspherical surface. The basic lens data show, as the curvature radius of the aspherical surface, the numerical value of a paraxial curvature radius (a curvature radius at the center). The aspherical surface data show the surface numbers of aspherical surfaces and aspherical surface coefficients related to the respective aspherical surfaces. In the aspherical surface data, "E-n" (n: integer) means "×10$^{-n}$", and "E+n" means "×10$^{n}$". Further, the aspherical surface coefficients are coefficients KA, RBm (m=3, 4, 5, ... 10) in the following aspherical equation:

$$Zd = \frac{C \times Y^2}{1 + \sqrt{1 - KA \times C^2 \times Y^2}} + \sum_m RB_m Y^m, \quad [\text{Formula 1}]$$

where

Zd: depth of an aspherical surface (the length of a perpendicular from a point on the aspherical surface at height Y to a flat plane that contacts with the vertex of the aspherical surface and is perpendicular to the optical axis), Y: height (the length from the optical axis to the lens surface), C: paraxial curvature, and KA, RBm: aspherical surface coefficients (m=3, 4, 5, ... 10)

In the tables in the specification of the present application, values are rounded to predetermined digits. As the unit of each numerical value, "mm" is used for length. However, the unit is only an example. Since an optical system can be used by proportionally enlarging or reducing the optical system, other appropriate units may be used.

TABLE 1

EXAMPLE 1

(A)

| Si | Ri | Di | Ndj | ν dj |
|---|---|---|---|---|
| 1 | −17.6041 | 1.1960 | 1.58913 | 61.1 |
| 2 | 3.2661 | 2.2234 | | |
| 3 | 7.8971 | 3.4858 | 1.80400 | 46.6 |
| 4 | −6.5645 | 0.6124 | | |
| 5 | ∞(APERTURE STOP) | 1.8245 | | |
| *6 | −2.9893 | 0.7000 | 1.61396 | 25.5 |
| *7 | 6.4986 | 0.1500 | | |
| *8 | 4.5835 | 1.7131 | 1.53389 | 56.0 |
| *9 | −5.2992 | 0.2000 | | |
| *10 | 6.2366 | 1.6000 | 1.53389 | 56.0 |
| *11 | −17.0323 | 4.0000 | | |
| 12 | ∞ | 0.5000 | 1.51680 | 64.2 |
| 13 | ∞ | 1.5170 | | |
| IMAGE PLANE | ∞ | | | |

(B)

| | |
|---|---|
| L(in Air) | 19.6 |
| Bf(in Air) | 5.8 |
| f | 4.47 |
| f1 | −4.58 |
| f2 | 5.00 |

TABLE 1-continued

EXAMPLE 1

| | | |
|---|---|---|
| f3 | | −3.24 |
| f4 | | 4.90 |
| f5 | | 8.76 |
| f12 | | 7.37 |
| f345 | | 8.89 |
| VIGNETTING SURFACE NUMBER | | 10 |
| VIGNETTING APERTURE DIAMETER | | 2.8 |

(C)

| Si | KA | RB3 | RB4 | RB5 | RB6 |
|---|---|---|---|---|---|
| 6 | 0.0000000E+00 | 2.3029384E−03 | −6.7610710E−04 | −3.9816903E−04 | −3.1362386E−05 |
| 7 | 0.0000000E+00 | −1.0985436E−03 | −1.4718811E−03 | −2.3103272E−04 | 8.4363620E−05 |
| 8 | −3.1504000E+00 | −3.1688661E−04 | 3.5297098E−03 | 2.6904688E−03 | −4.8694885E−05 |
| 9 | −5.2470000E+00 | −3.4650517E−03 | −4.7837120E−04 | 7.5059457E−06 | 2.8582122E−04 |
| 10 | 0.0000000E+00 | −2.7878716E−03 | −2.0819553E−04 | −3.7951051E−06 | 1.5983528E−06 |
| 11 | 0.0000000E+00 | 1.7245646E−03 | 1.4699690E−04 | −1.0376951E−04 | −9.2806379E−05 |

| Si | RB7 | RB8 | RB9 | RB10 |
|---|---|---|---|---|
| 6 | 4.1906724E−05 | 2.3912007E−05 | −3.5945129E−05 | −3.3457344E−06 |
| 7 | 4.6978272E−06 | −1.9943087E−04 | 7.7273291E−05 | −1.4400348E−05 |
| 8 | −1.8378460E−05 | −2.0745673E−07 | −1.3997640E−05 | 7.0681945E−06 |
| 9 | 6.2949307E−05 | 4.3940020E−05 | 0.0000000E+00 | 0.0000000E+00 |
| 10 | 3.2284896E−05 | 3.8972381E−05 | 0.0000000E+00 | 0.0000000E+00 |
| 11 | 1.3937354E−05 | 7.0946002E−05 | 0.0000000E+00 | 0.0000000E+00 |

TABLE 2

EXAMPLE 2

(A)

| Si | Ri | Di | Ndj | νdj |
|---|---|---|---|---|
| 1 | −18.1647 | 1.1960 | 1.58913 | 61.1 |
| 2 | 3.3716 | 1.7789 | | |
| 3 | 6.8045 | 3.4856 | 1.80400 | 46.6 |
| 4 | −6.6946 | 0.3309 | | |
| 5 | ∞(APERTURE STOP) | 1.9516 | | |
| *6 | −2.8582 | 0.7000 | 1.61396 | 25.5 |
| *7 | 6.4984 | 0.1500 | | |
| *8 | 4.4629 | 1.7309 | 1.53389 | 56.0 |
| *9 | −5.4406 | 0.2000 | | |
| *10 | 6.2267 | 1.6000 | 1.53389 | 56.0 |
| *11 | −17.0396 | 4.0000 | | |
| 12 | ∞ | 0.5000 | 1.51680 | 64.2 |
| 13 | ∞ | 1.5523 | | |
| IMAGE PLANE | ∞ | | | |

(B)

| | |
|---|---|
| L(in Air) | 19.0 |
| Bf(in Air) | 5.9 |
| f | 4.94 |
| f1 | −4.73 |
| f2 | 4.74 |
| f3 | −3.14 |
| f4 | 4.89 |
| f5 | 8.75 |
| f12 | 7.52 |
| f345 | 9.35 |

(C)

| Si | KA | RB3 | RB4 | RB5 | RB6 |
|---|---|---|---|---|---|
| 6 | 0.0000000E+00 | 2.4211837E−03 | −6.6506399E−04 | −3.3063392E−04 | −1.3399201E−05 |
| 7 | 0.0000000E+00 | −1.7820380E−03 | −1.5441170E−03 | −2.6462657E−04 | 7.5208098E−05 |
| 8 | −3.1504000E+00 | −1.0932246E−04 | 3.5133445E−03 | 2.9781696E−05 | −4.7734893E−05 |
| 9 | −5.2470000E+00 | −4.1032088E−03 | −2.1019828E−04 | 2.3298508E−05 | 2.8532085E−04 |

TABLE 2-continued

EXAMPLE 2

| | | | | |
|---|---|---|---|---|
| 10 | 0.0000000E+00 | −3.4705258E−03 | −3.9048060E−04 | −1.9867140E−05 | 2.9613758E−06 |
| 11 | 0.0000000E+00 | 2.4005343E−03 | 2.7149844E−04 | −1.2283620E−04 | −1.0031051E−04 |

| Si | RB7 | RB8 | RB9 | RB10 |
|---|---|---|---|---|
| 6 | 4.2381676E−05 | 2.1247127E−05 | −3.7023348E−05 | −4.1007793E−06 |
| 7 | 9.1039949E−06 | −1.9756776E−04 | 7.7273291E−05 | −1.4400348E−05 |
| 8 | −1.8416536E−05 | −4.2864122E−07 | −1.3917747E−05 | 7.1683756E−06 |
| 9 | 6.5827850E−05 | 4.5148009E−05 | 0.0000000E+00 | 0.0000000E+00 |
| 10 | 3.5450799E−05 | 4.1612595E−05 | 0.0000000E+00 | 0.0000000E+00 |
| 11 | 1.5002814E−05 | 7.2667201E−05 | 0.0000000E+00 | 0.0000000E+00 |

TABLE 3

EXAMPLE 3

(A)

| Si | Ri | Di | Ndj | νdj |
|---|---|---|---|---|
| 1 | −24.8732 | 1.4375 | 1.58913 | 61.1 |
| 2 | 4.1704 | 2.5882 | | |
| 3 | 9.6571 | 4.1894 | 1.77250 | 49.6 |
| 4 | −8.0848 | 0.8425 | | |
| 5 | ∞(APERTURE STOP) | 2.4039 | | |
| *6 | −3.6498 | 0.8414 | 1.61396 | 25.5 |
| *7 | 8.0394 | 0.1803 | | |
| *8 | 5.0595 | 2.0273 | 1.53389 | 56.0 |
| *9 | −6.8684 | 0.2404 | | |
| *10 | 8.0430 | 1.9232 | 1.53389 | 56.0 |
| *11 | −17.3958 | 4.8079 | | |
| 12 | ∞ | 0.6010 | 1.51680 | 64.2 |
| 13 | ∞ | 1.9390 | | |
| IMAGE PLANE | ∞ | | | |

(B)

| | |
|---|---|
| L(in Air) | 23.8 |
| Bf(in Air) | 7.1 |
| f | 5.66 |
| f1 | −5.95 |
| f2 | 6.35 |
| f3 | −3.98 |
| f4 | 5.80 |
| f5 | 10.58 |
| f12 | 10.07 |
| f345 | 10.50 |
| VIGNETTING SURFACE NUMBER | 9 |
| VIGNETTING APERTURE DIAMETER | 2.8 |

(C)

| Si | KA | RB3 | RB4 | RB5 | RB6 |
|---|---|---|---|---|---|
| 6 | 0.0000000E+00 | 1.8103973E−03 | −4.5937920E−04 | −1.5305922E−04 | 4.2040020E−06 |
| 7 | 0.0000000E+00 | −9.8500762E−04 | −9.2826150E−04 | −1.4349474E−04 | 2.7421138E−05 |
| 8 | −3.1504000E+00 | −5.1313165E−05 | 2.0519489E−03 | 3.5211976E−05 | −1.9168902E−05 |
| 9 | −5.2470000E+00 | −2.7391151E−03 | −2.6653303E−04 | −8.2752929E−06 | 1.1257296E−04 |
| 10 | 0.0000000E+00 | −2.9066131E−03 | −2.7316084E−04 | −2.7034027E−05 | −5.7440108E−06 |
| 11 | 0.0000000E+00 | 2.3667547E−03 | 1.0136395E−04 | −7.9998417E−05 | −4.3871636E−05 |

| Si | RB7 | RB8 | RB9 | RB10 |
|---|---|---|---|---|
| 6 | 1.4878858E−05 | 5.5843645E−06 | −9.0963383E−06 | −1.2982838E−06 |
| 7 | −1.5126228E−07 | −5.4907272E−05 | 1.7736183E−05 | −2.7498410E−06 |
| 8 | −7.1722144E−06 | −6.2697628E−07 | −3.3842052E−06 | 1.4070489E−06 |
| 9 | 2.2305240E−05 | 1.2367841E−05 | 0.0000000E+00 | 0.0000000E+00 |
| 10 | 1.2514596E−05 | 1.4305247E−05 | 0.0000000E+00 | 0.0000000E+00 |
| 11 | 8.0042145E−06 | 2.3254611E−05 | 0.0000000E+00 | 0.0000000E+00 |

TABLE 4

EXAMPLE 4

(A)

| Si | Ri | Di | Ndj | ν dj |
|---|---|---|---|---|
| 1 | −5.2628 | 1.1960 | 1.58913 | 61.1 |
| 2 | 3.6870 | 1.2017 | | |
| 3 | 5.9547 | 3.4859 | 1.78800 | 47.4 |
| 4 | −7.0071 | 0.2519 | | |
| 5 | ∞(APERTURE STOP) | 1.7728 | | |
| *6 | −7.6610 | 0.7000 | 1.61396 | 25.5 |
| *7 | 4.4030 | 0.1500 | | |
| *8 | 4.8809 | 1.4912 | 1.53389 | 56.0 |
| *9 | −7.6166 | 0.2000 | | |
| *10 | 5.7521 | 1.4002 | 1.53389 | 56.0 |
| *11 | −197.4905 | 4.0000 | | |
| 12 | ∞ | 0.5000 | 1.51680 | 64.2 |
| 13 | ∞ | 3.5462 | | |
| IMAGE PLANE | ∞ | | | |

(B)

| | |
|---|---|
| L(in Air) | 19.7 |
| Bf(in Air) | 7.9 |
| f | 5.36 |
| f1 | −3.32 |
| f2 | 4.63 |
| f3 | −4.46 |
| f4 | 5.81 |
| f5 | 10.49 |
| f12 | 12.87 |
| f345 | 11.50 |

(C)

| Si | KA | RB3 | RB4 | RB5 | RB6 |
|---|---|---|---|---|---|
| 6 | 0.0000000E+00 | 1.5624602E−03 | −7.3409652E−04 | −6.5499270E−04 | −1.6953382E−04 |
| 7 | 0.0000000E+00 | 1.2824492E−03 | −7.9771645E−04 | 6.7240857E−05 | 1.1100159E−04 |
| 8 | −3.1504000E+00 | −2.4470365E−04 | 3.6241320E−03 | 3.9051247E−05 | −2.8996025E−05 |
| 9 | −5.2470000E+00 | −5.7733491E−04 | −6.7546957E−04 | −4.4430002E−05 | 2.3586399E−04 |
| 10 | 0.0000000E+00 | −1.4340748E−03 | 1.9272302E−04 | 7.5359786E−05 | −2.5734168E−05 |
| 11 | 0.0000000E+00 | −1.6542243E−03 | −4.4405497E−04 | −7.0006110E−05 | −5.4556890E−05 |

| Si | RB7 | RB8 | RB9 | RB10 |
|---|---|---|---|---|
| 6 | −5.8866904E−06 | 2.1559584E−05 | −3.7577745E−05 | −5.2515473E−06 |
| 7 | −1.4645033E−04 | −2.1205040E−04 | 7.7273291E−05 | −1.4400348E−05 |
| 8 | −1.9503966E−06 | 1.1861003E−05 | −1.9295009E−05 | −1.6014011E−06 |
| 9 | −7.1735060E−05 | 4.4629446E−05 | 0.0000000E+00 | 0.0000000E+00 |
| 10 | −7.2055496E−05 | −3.8745703E−05 | 0.0000000E+00 | 0.0000000E+00 |
| 11 | −5.8819822E−05 | −1.8662301E−05 | 0.0000000E+00 | 0.0000000E+00 |

TABLE 5

EXAMPLE 5

(A)

| Si | Ri | Di | Ndj | ν dj |
|---|---|---|---|---|
| 1 | −18.4755 | 1.1960 | 1.58913 | 61.1 |
| 2 | 3.4671 | 1.7297 | | |
| 3 | 5.9015 | 3.4860 | 1.78800 | 47.4 |
| 4 | −7.7213 | 0.1108 | | |
| 5 | ∞(APERTURE STOP) | 1.7633 | | |
| *6 | −4.0673 | 0.7000 | 1.63355 | 23.6 |
| *7 | 5.6271 | 0.1500 | | |
| *8 | 4.5276 | 2.4330 | 1.51104 | 56.8 |
| *9 | −5.9265 | 0.2000 | | |
| *10 | 5.2795 | 1.4002 | 1.51104 | 56.8 |
| *11 | 85.0009 | 4.0000 | | |

TABLE 5-continued

EXAMPLE 5

| | | | | |
|---|---|---|---|---|
| 12 | ∞ | 0.5000 | 1.51680 | 64.2 |
| 13 | ∞ | 2.1403 | | |
| IMAGE PLANE | ∞ | | | |

(B)

| | |
|---|---|
| L(in Air) | 19.6 |
| Bf(in Air) | 6.5 |
| f | 5.58 |
| f1 | −4.86 |
| f2 | 4.78 |
| f3 | −3.62 |
| f4 | 5.45 |
| f5 | 10.95 |
| f12 | 8.09 |
| f345 | 11.18 |

(C)

| Si | KA | RB3 | RB4 | RB5 | RB6 |
|---|---|---|---|---|---|
| 6 | 0.0000000E+00 | 1.4453160E−03 | −5.0521608E−04 | −5.2169114E−04 | −1.1096814E−04 |
| 7 | 0.0000000E+00 | 4.9510916E−04 | −9.1258248E−04 | 1.1111402E−04 | 1.6056681E−04 |
| 8 | −3.1504000E+00 | 5.4063636E−04 | 3.7544397E−03 | 3.1597391E−05 | −4.9754543E−05 |
| 9 | −5.2470000E+00 | −2.8665440E−03 | −1.5089780E−03 | −1.6419681E−04 | 2.2237079E−04 |
| 10 | 0.0000000E+00 | −2.5309264E−03 | 3.2810710E−04 | 5.6581513E−05 | −2.2558428E−05 |
| 11 | 0.0000000E+00 | 1.4593309E−03 | 1.1815652E−04 | 1.2299779E−04 | −1.4591394E−05 |

| Si | RB7 | RB8 | RB9 | RB10 |
|---|---|---|---|---|
| 6 | 1.2875847E−05 | 1.7807387E−05 | −4.4373849E−05 | −1.0141562E−05 |
| 7 | −1.1977188E−04 | −2.2560934E−04 | 7.7273291E−05 | −1.4400348E−05 |
| 8 | −1.6703430E−05 | 1.2669522E−06 | −1.9229329E−05 | 3.9583927E−06 |
| 9 | −7.9565089E−06 | 5.6816421E−05 | 0.0000000E+00 | 0.0000000E+00 |
| 10 | −1.7116414E−05 | 3.7592580E−06 | 0.0000000E+00 | 0.0000000E+00 |
| 11 | −4.1124060E−05 | 1.7157576E−06 | 0.0000000E+00 | 0.0000000E+00 |

TABLE 6

EXAMPLE 6

(A)

| Si | Ri | Di | Ndj | v dj |
|---|---|---|---|---|
| 1 | −11.4152 | 1.1960 | 1.58913 | 61.1 |
| 2 | 3.9272 | 1.7728 | | |
| 3 | 6.7094 | 3.4860 | 1.88300 | 40.8 |
| 4 | −9.6591 | 0.1243 | | |
| 5 | ∞(APERTURE STOP) | 1.6734 | | |
| *6 | −3.4475 | 0.7000 | 1.61396 | 25.5 |
| *7 | 4.7314 | 0.1500 | | |
| *8 | 4.1986 | 1.9081 | 1.53389 | 56.0 |
| *9 | −5.1062 | 0.2000 | | |
| *10 | 4.1916 | 1.4002 | 1.53389 | 56.0 |
| *11 | 85.0000 | 4.0000 | | |
| 12 | ∞ | 0.5000 | 1.51680 | 64.2 |
| 13 | ∞ | 1.3076 | | |
| IMAGE PLANE | ∞ | | | |

(B)

| | |
|---|---|
| L(in Air) | 18.2 |
| Bf(in Air) | 5.6 |
| f | 4.48 |
| f1 | −4.82 |
| f2 | 4.98 |
| f3 | −3.15 |
| f4 | 4.65 |
| f5 | 8.21 |
| f12 | 9.09 |
| f345 | 7.71 |

TABLE 6-continued

EXAMPLE 6

| | | |
|---|---|---|
| VIGNETTING SURFACE NUMBER | | 9 |
| VIGNETTING APERTURE DIAMETER | | 2.2 |

(C)

| Si | KA | RB3 | RB4 | RB5 | RB6 |
|---|---|---|---|---|---|
| 6 | 0.0000000E+00 | 2.9478181E−G3 | −1.8432237E−04 | −3.2377537E−04 | −3.1452938E−05 |
| 7 | 0.0000000E+00 | −1.4104309E−03 | −1.5237875E−03 | −1.6840365E−04 | 8.3374830E−05 |
| 8 | −3.1504000E+00 | 1.2209421E−03 | 3.7204363E−03 | 1.2333169E−05 | −5.9977690E−05 |
| 9 | −5.2470000E+00 | −2.5453386E−03 | −1.1340166E−03 | −1.8154947E−04 | 2.2537805E−04 |
| 10 | 0.0000000E+00 | −1.7684863E−03 | 2.4052100E−04 | 9.3819857E−05 | 3.7850749E−06 |
| 11 | 0.0000000E+00 | 2.2782649E−03 | −4.9600831E−05 | −1.4738933E−04 | −8.0460043E−05 |

| Si | RB7 | RB8 | RB9 | RB10 |
|---|---|---|---|---|
| 6 | 3.8022394E−05 | 2.4576833E−05 | −3.6418063E−05 | −3.6185825E−06 |
| 7 | −4.6956476E−05 | −1.6979639E−04 | 7.7273291E−05 | −1.4400348E−05 |
| 8 | −1.7092366E−05 | 5.5820704E−06 | −1.1407915E−05 | 7.7194179E−06 |
| 9 | 2.7874529E−05 | 7.8546738E−05 | 0.0000000E+00 | 0.0000000E+00 |
| 10 | 1.6777153E−05 | 4.0132601E−05 | 0.0000000E+00 | 0.0000000E+00 |
| 11 | 2.9580250E−05 | 8.0292021E−05 | 0.0000000E+00 | 0.0000000E+00 |

TABLE 7

EXAMPLE 7

(A)

| Si | Ri | Di | Ndj | νdj |
|---|---|---|---|---|
| 1 | −24.3012 | 1.1960 | 1.62280 | 57.1 |
| 2 | 3.3097 | 1.2988 | | |
| 3 | 5.2743 | 3.4851 | 1.80400 | 46.6 |
| 4 | −7.7963 | 0.7720 | | |
| 5 | ∞(APERTURE STOP) | 1.9123 | | |
| *6 | −2.4768 | 0.7000 | 1.61396 | 25.5 |
| *7 | 6.4983 | 0.1500 | | |
| *8 | 3.4756 | 1.5959 | 1.53389 | 56.0 |
| *9 | −23.8660 | 0.2000 | | |
| *10 | 3.0156 | 1.6000 | 1.53389 | 56.0 |
| *11 | −17.0000 | 4.0000 | | |
| 12 | ∞ | 0.5000 | 1.51680 | 64.2 |
| 13 | ∞ | 0.6168 | | |
| IMAGE PLANE | ∞ | | | |

(B)

| | |
|---|---|
| L(in Air) | 17.9 |
| Bf(in Air) | 4.9 |
| f | 4.91 |
| f1 | −4.60 |
| f2 | 4.44 |
| f3 | −2.84 |
| f4 | 5.80 |
| f5 | 4.93 |
| f12 | 8.41 |
| f345 | 7.24 |
| VIGNETTING SURFACE NUMBER | 8 |
| VIGNETTING APERTURE DIAMETER | 2.5 |

(C)

| Si | KA | RB3 | RB4 | RB5 | RB6 |
|---|---|---|---|---|---|
| 6 | 0.0000000E+00 | 1.8060422E−02 | 4.3920273E−03 | −4.4064162E−03 | −1.4913778E−03 |
| 7 | 0.0000000E+00 | 1.2342086E−02 | −5.0550314E−03 | −2.3265026E−03 | −8.3807177E−04 |
| 8 | −3.1504000E+00 | −1.7718615E−03 | 2.7619887E−03 | −1.1632161E−04 | −2.7228007E−05 |
| 9 | −5.2470000E+00 | −1.9154239E−02 | 1.8201555E−03 | 5.2807537E−06 | −8.3870612E−06 |
| 10 | 0.0000000E+00 | −1.1200433E−02 | −1.9629633E−03 | −2.4476728E−04 | 1.8593513E−05 |
| 11 | 0.0000000E+00 | 1.2080429E−02 | 1.8278070E−03 | −3.5937889E−04 | −3.8744750E−04 |

TABLE 7-continued

EXAMPLE 7

| Si | RB7 | RB8 | RB9 | RB10 |
|---|---|---|---|---|
| 6 | −7.2171899E−05 | 1.7712384E−04 | 2.7234499E−05 | −7.9861424E−05 |
| 7 | −1.6877145E−04 | −1.0984769E−05 | 7.7273291E−05 | −1.4400348E−05 |
| 8 | −1.0536088E−06 | 3.2548557E−06 | −6.8527398E−06 | 8.8742110E−06 |
| 9 | 1.4996534E−04 | 1.2553928E−04 | 0.0000000E+00 | 0.0000000E+00 |
| 10 | 1.1328883E−04 | 3.0560554E−05 | 0.0000000E+00 | 0.0000000E+00 |
| 11 | −4.2254006E−05 | 9.5125218E−05 | 0.0000000E+00 | 0.0000000E+00 |

TABLE 8

EXAMPLE 8

(A)

| Si | Ri | Di | Ndj | νdj |
|---|---|---|---|---|
| 1 | −17.7105 | 1.1960 | 1.58913 | 61.1 |
| 2 | 3.4595 | 1.5072 | | |
| 3 | 6.2206 | 3.4854 | 1.80400 | 46.6 |
| 4 | −6.9826 | 0.4027 | | |
| 5 | ∞(APERTURE STOP) | 1.9496 | | |
| *6 | −2.7201 | 0.7000 | 1.65150 | 20.5 |
| *7 | 7.2202 | 0.1500 | | |
| *8 | 4.2415 | 1.6794 | 1.53389 | 56.0 |
| *9 | −6.7453 | 0.2000 | | |
| *10 | 4.1135 | 1.6000 | 1.53389 | 56.0 |
| *11 | −17.0571 | 4.0000 | | |
| 12 | ∞ | 0.5000 | 1.51680 | 64.2 |
| 13 | ∞ | 0.8564 | | |
| IMAGE PLANE | ∞ | | | |

(B)

| | |
|---|---|
| L(in Air) | 18.1 |
| Bf(in Air) | 5.2 |
| f | 4.66 |
| f1 | −4.81 |
| f2 | 4.64 |
| f3 | −2.95 |
| f4 | 5.15 |
| f5 | 6.38 |
| f12 | 7.87 |
| f345 | 7.48 |

(C)

| Si | KA | RB3 | RB4 | RB5 | RB6 |
|---|---|---|---|---|---|
| 6 | 0.0000000E+00 | 4.0043442E−03 | −2.3526472E−03 | −2.5837156E−04 | 3.7670280E−05 |
| 7 | 0.0000000E+00 | −6.5481554E−03 | −2.0769373E−03 | −6.4260934E−04 | −5.3767222E−05 |
| 8 | −3.1504000E+00 | 4.6355685E−04 | 3.3380410E−03 | 1.9186304E−05 | −4.6619790E−05 |
| 9 | −5.2470000E+00 | −2.7742716E−03 | 1.2603090E−03 | 8.1429602E−05 | 2.7318580E−04 |
| 10 | 0.0000000E+00 | −5.8996603E−03 | −9.1067721E−04 | −8.0206423E−05 | −6.3372135E−06 |
| 11 | 0.0000000E+00 | 4.4476880E−03 | 7.0447659E−04 | −1.5975850E−04 | −1.2226354E−04 |

| Si | RB7 | RB8 | RB9 | RB10 |
|---|---|---|---|---|
| 6 | 3.9400951E−05 | 6.8376618E−06 | −4.6108111E−05 | −9.8547046E−06 |
| 7 | −8.0366851E−06 | −1.8259486E−04 | 7.7273291E−05 | −1.4400348E−05 |
| 8 | −1.7146520E−05 | 5.4337950E−07 | −1.2618301E−05 | 8.2552989E−06 |
| 9 | 7.0379162E−05 | 5.3922487E−05 | 0.0000000E+00 | 0.0000000E+00 |
| 10 | 4.1950882E−05 | 5.1165981E−05 | 0.0000000E+00 | 0.0000000E+00 |
| 11 | 2.0706981E−05 | 8.2841831E−05 | 0.0000000E+00 | 0.0000000E+00 |

TABLE 9

EXAMPLE 9

(A)

| Si | Ri | Di | Ndj | ν dj |
|---|---|---|---|---|
| 1 | −9.4301 | 1.1960 | 1.48749 | 70.2 |
| 2 | 3.4141 | 2.0362 | | |
| 3 | 5.8387 | 3.4859 | 1.75500 | 52.3 |
| 4 | −7.6550 | −0.0038 | | |
| 5 | ∞(APERTURE STOP) | 1.7993 | | |
| *6 | −3.9967 | 0.7000 | 1.61396 | 25.5 |
| *7 | 5.6042 | 0.1500 | | |
| *8 | 4.9902 | 1.8691 | 1.53389 | 56.0 |
| *9 | −6.0554 | 0.2000 | | |
| *10 | 5.0862 | 1.4002 | 1.53389 | 56.0 |
| *11 | 74.9993 | 4.0000 | | |
| 12 | ∞ | 0.5000 | 1.51680 | 64.2 |
| 13 | ∞ | 1.6104 | | |
| IMAGE PLANE | ∞ | | | |

(B)

| | |
|---|---|
| L(in Air) | 18.8 |
| Bf(in Air) | 5.9 |
| f | 5.11 |
| f1 | −4.99 |
| f2 | 4.94 |
| f3 | −3.70 |
| f4 | 5.44 |
| f5 | 10.15 |
| f12 | 7.54 |
| f345 | 11.14 |

(C)

| Si | KA | RB3 | RB4 | RB5 | RB6 |
|---|---|---|---|---|---|
| 6 | 0.0000000E+00 | 2.1869563E−04 | −6.5536129E−04 | −6.6240892E−04 | −1.6041917E−04 |
| 7 | 0.0000000E+00 | 6.9153266E−04 | −1.0025523E−03 | 6.0242397E−05 | 1.5294276E−04 |
| 8 | −3.1504000E+00 | 4.2516609E−04 | 3.7182543E−03 | 1.5985155E−05 | −4.8259166E−05 |
| 9 | −5.2470000E+00 | −2.9256157E−03 | −1.2205174E−03 | −1.0665609E−04 | 2.2736747E−04 |
| 10 | 0.0000000E+00 | −2.2071320E−03 | 3.3674072E−04 | 4.3155583E−05 | −9.7597209E−06 |
| 11 | 0.0000000E+00 | 1.1788886E−03 | 4.9143804E−05 | 1.0595181E−04 | −2.6838948E−05 |

| Si | RB7 | RB8 | RB9 | RB10 |
|---|---|---|---|---|
| 6 | 2.4647780E−05 | 3.5090119E−05 | −3.1859105E−05 | −1.9862309E−06 |
| 7 | −7.9734979E−05 | −1.8833267E−04 | 7.7273291E−05 | −1.4400348E−05 |
| 8 | −1.0026883E−05 | 7.7639222E−06 | −1.5073410E−05 | 3.8485476E−06 |
| 9 | −1.3698269E−05 | 6.4367970E−05 | 0.0000000E+00 | 0.0000000E+00 |
| 10 | −1.2584054E−05 | 4.5692829E−06 | 0.0000000E+00 | 0.0000000E+00 |
| 11 | −2.4672577E−05 | 5.3531323E−06 | 0.0000000E+00 | 0.0000000E+00 |

TABLE 10

EXAMPLE 10

(A)

| Si | Ri | Di | Ndj | ν dj |
|---|---|---|---|---|
| 1 | −22.3614 | 1.1960 | 1.58913 | 61.1 |
| 2 | 3.2384 | 2.1398 | | |
| 3 | 7.6293 | 3.4858 | 1.80400 | 46.6 |
| 4 | −6.5984 | 0.9013 | | |
| 5 | ∞(APERTURE STOP) | 1.8113 | | |
| *6 | −3.0520 | 0.7000 | 1.61396 | 25.5 |
| *7 | 6.9639 | 0.1500 | | |
| *8 | 4.6065 | 1.7582 | 1.53389 | 56.0 |
| *9 | −5.3413 | 0.2000 | | |
| *10 | 5.8964 | 1.6820 | 1.53389 | 56.0 |
| *11 | −16.6937 | 4.0000 | | |

TABLE 10-continued

EXAMPLE 10

| | | | | |
|---|---|---|---|---|
| 12 | ∞ | 0.5000 | 1.51680 | 64.2 |
| 13 | ∞ | 0.7139 | | |
| IMAGE PLANE | ∞ | | | |

(B)

| | |
|---|---|
| L(in Air) | 19.1 |
| Bf(in Air) | 5.0 |
| f | 4.39 |
| f1 | −4.72 |
| f2 | 4.94 |
| f3 | −3.37 |
| f4 | 4.94 |
| f5 | 8.38 |
| f12 | 7.34 |
| f345 | 7.93 |

(C)

| Si | KA | RB3 | RB4 | RB5 | RB6 |
|---|---|---|---|---|---|
| 6 | 0.0000000E+00 | 2.0722181E−03 | −1.2362155E−03 | −6.1834968E−04 | −7.8133295E−05 |
| 7 | 0.0000000E+00 | −1.7812604E−03 | −1.6535624E−03 | −3.3775493E−04 | 1.3913228E−04 |
| 8 | −3.1504000E+00 | −4.5711547E−04 | 3.5222935E−03 | 5.2499046E−05 | −3.4015944E−05 |
| 9 | −5.2470000E+00 | −2.6909203E−03 | −4.1504499E−04 | −1.9663766E−06 | 3.0684511E−04 |
| 10 | 0.0000000E+00 | −2.4699929E−03 | −1.9346358E−04 | −3.8738403E−05 | −2.1593064E−05 |
| 11 | 0.0000000E+00 | 2.2235938E−03 | 1.2193945E−04 | −1.1982907E−04 | −8.5511696E−05 |

| Si | RB7 | RB8 | RB9 | RB10 |
|---|---|---|---|---|
| 6 | 4.6035219E−05 | 3.2854820E−05 | −3.1171885E−05 | −3.6495510E−06 |
| 7 | 4.9807935E−05 | −2.2114935E−04 | 7.7273291E−05 | −1.4400348E−05 |
| 8 | −1.5481925E−05 | −1.9392023E−06 | −1.5712458E−05 | 5.3320077E−06 |
| 9 | 6.5483691E−05 | 2.4460013E−05 | 0.0000000E+00 | 0.0000000E+00 |
| 10 | 3.0838719E−05 | 4.5327337E−05 | 0.0000000E+00 | 0.0000000E+00 |
| 11 | 2.5384594E−05 | 7.6931898E−05 | 0.0000000E+00 | 0.0000000E+00 |

TABLE 11

EXAMPLE 11

(A)

| Si | Ri | Di | Ndj | νdj |
|---|---|---|---|---|
| 1 | −20.6876 | 1.1960 | 1.58913 | 61.1 |
| 2 | 3.2342 | 1.9998 | | |
| 3 | 7.0374 | 3.4858 | 1.80400 | 46.6 |
| 4 | −6.6240 | 0.7344 | | |
| 5 | ∞(APERTURE STOP) | 1.5965 | | |
| *6 | −3.0440 | 0.7000 | 1.61396 | 25.5 |
| *7 | 6.5061 | 0.1500 | | |
| *8 | 4.7528 | 1.7667 | 1.53389 | 56.0 |
| *9 | −5.2625 | 0.2000 | | |
| *10 | 5.9372 | 1.6000 | 1.53389 | 56.0 |
| *11 | −15.9569 | 4.0000 | | |
| 12 | ∞ | 0.5000 | 1.51680 | 64.2 |
| 13 | ∞ | 0.9678 | | |
| IMAGE PLANE | ∞ | | | |

(B)

| | |
|---|---|
| L(in Air) | 18.7 |
| Bf(in Air) | 5.3 |
| f | 4.45 |
| f1 | −4.66 |
| f2 | 4.79 |
| f3 | −3.29 |
| f4 | 4.98 |
| f5 | 8.32 |
| f12 | 7.21 |
| f345 | 8.21 |

TABLE 11-continued

EXAMPLE 11

(C)

| Si | KA | RB3 | RB4 | RB5 | RB6 |
|---|---|---|---|---|---|
| 6 | 0.0000000E+00 | 2.2820765E-03 | -1.2352655E-03 | -5.5678464E-04 | -2.8296771E-05 |
| 7 | 0.0000000E+00 | -1.8803077E-03 | -1.6400649E-03 | -3.0771395E-04 | 7.3037624E-05 |
| 8 | -3.1504000E+00 | -1.1280643E-03 | 3.4334312E-03 | 4.9428824E-05 | -3.8986490E-05 |
| 9 | -5.2470000E+00 | -3.2533317E-03 | -3.1756872E-04 | 5.3206875E-05 | 2.9519968E-04 |
| 10 | 0.0000000E+00 | -2.5254415E-03 | -1.7810999E-04 | 1.3346522E-05 | 1.0968766E-05 |
| 11 | 0.0000000E+00 | 1.3112888E-03 | 1.2219960E-04 | -1.0953295E-04 | -9.6297224E-05 |

| Si | RB7 | RB8 | RB9 | RB10 |
|---|---|---|---|---|
| 6 | 6.6937122E-05 | 3.3885141E-05 | -3.8453317E-05 | -1.0429531E-05 |
| 7 | 1.7425138E-05 | -2.2032529E-04 | 7.7273291E-05 | -1.4400348E-05 |
| 8 | -1.8869013E-05 | -2.3535064E-06 | -1.5371632E-05 | 6.0821184E-06 |
| 9 | 6.9578277E-05 | 4.3240961E-05 | 0.0000000E+00 | 0.0000000E+00 |
| 10 | 3.7021783E-05 | 3.8744691E-05 | 0.0000000E+00 | 0.0000000E+00 |
| 11 | 1.3114347E-05 | 6.9692800E-05 | 0.0000000E+00 | 0.0000000E+00 |

TABLE 12

EXAMPLE 12

(A)

| Si | Ri | Di | Ndj | νdj |
|---|---|---|---|---|
| 1 | -20.6485 | 1.1960 | 1.58913 | 61.1 |
| 2 | 3.3471 | 1.5362 | | |
| 3 | 6.3853 | 3.4856 | 1.80400 | 46.6 |
| 4 | -6.7446 | 0.3108 | | |
| 5 | ∞(APERTURE STOP) | 1.9482 | | |
| *6 | -3.0432 | 0.7000 | 1.61396 | 25.5 |
| *7 | 6.6761 | 0.1500 | | |
| *8 | 4.4417 | 1.6444 | 1.53389 | 56.0 |
| *9 | -5.2058 | 0.2000 | | |
| *10 | 5.7589 | 1.6000 | 1.53389 | 56.0 |
| *11 | -14.5488 | 4.0000 | | |
| 12 | ∞ | 0.5000 | 1.51680 | 64.2 |
| 13 | ∞ | 0.4004 | | |
| IMAGE PLANE | ∞ | | | |

(B)

| | |
|---|---|
| L(in Air) | 17.5 |
| Bf(in Air) | 4.7 |
| f | 4.48 |
| f1 | -4.80 |
| f2 | 4.63 |
| f3 | -3.31 |
| f4 | 4.77 |
| f5 | 7.95 |
| f12 | 7.72 |
| f345 | 7.37 |

(C)

| Si | KA | RB3 | RB4 | RB5 | RB6 |
|---|---|---|---|---|---|
| 6 | 0.0000000E+00 | 2.9095201E-03 | -9.1895569E-04 | -2.6296197E-04 | 9.4757872E-05 |
| 7 | 0.0000000E+00 | -1.6381060E-03 | -1.4354548E-03 | -2.3296620E-04 | 1.1128550E-04 |
| 8 | -3.1504000E+00 | -4.7519149E-04 | 3.4636070E-03 | 5.7369523E-05 | -3.5670350E-05 |
| 9 | -5.2470000E+00 | -4.7975994E-03 | -1.7887832E-04 | 5.3864406E-05 | 2.9872505E-04 |
| 10 | 0.0000000E+00 | -3.3864288E-03 | -4.4627145E-04 | -2.5219404E-05 | 8.4826557E-06 |
| 11 | 0.0000000E+00 | 2.0681477E-03 | 3.6583470E-04 | -6.6145354E-05 | -8.1137367E-05 |

| Si | RB7 | RB8 | RB9 | RB10 |
|---|---|---|---|---|
| 6 | 9.9686846E-05 | 3.4513061E-05 | -4.2988324E-05 | -1.4726255E-05 |
| 7 | 4.3601880E-05 | -2.1925819E-04 | 7.7273291E-05 | -1.4400348E-05 |
| 8 | -1.7374296E-05 | -2.0736428E-06 | -1.4571187E-05 | 6.5644194E-06 |

TABLE 12-continued

EXAMPLE 12

| | | | | |
|---|---|---|---|---|
| 9 | 7.0633891E−05 | 3.9422060E−05 | 0.0000000E+00 | 0.0000000E+00 |
| 10 | 3.7175960E−05 | 4.2070433E−05 | 0.0000000E+00 | 0.0000000E+00 |
| 11 | 1.5699505E−05 | 6.8844380E−05 | 0.0000000E+00 | 0.0000000E+00 |

TABLE 13

EXAMPLE 13

(A)

| Si | Ri | Di | Ndj | ν dj |
|---|---|---|---|---|
| 1 | −49.0584 | 1.4375 | 1.58913 | 61.1 |
| 2 | 4.1188 | 2.4024 | | |
| 3 | 9.2203 | 4.1894 | 1.77250 | 49.6 |
| 4 | −8.1764 | 1.6871 | | |
| 5 | ∞(APERTURE STOP) | 2.4039 | | |
| *6 | −4.2965 | 0.8414 | 1.61396 | 25.5 |
| *7 | 9.2384 | 0.1803 | | |
| *8 | 5.1396 | 2.2586 | 1.53389 | 56.0 |
| *9 | −6.8954 | 0.2404 | | |
| *10 | 7.5892 | 1.9232 | 1.53389 | 56.0 |
| *11 | −17.2385 | 3.0000 | | |
| 12 | ∞ | 0.6010 | 1.51680 | 64.2 |
| 13 | ∞ | 1.5865 | | |
| IMAGE PLANE | ∞ | | | |

(B)

| | |
|---|---|
| L(in Air) | 22.5 |
| Bf(in Air) | 5.0 |
| f | 5.39 |
| f1 | −6.39 |
| f2 | 6.27 |
| f3 | −4.67 |
| f4 | 5.90 |
| f5 | 10.14 |
| f12 | 10.03 |
| f345 | 8.14 |

(C)

| Si | KA | RB3 | RB4 | RB5 | RB6 |
|---|---|---|---|---|---|
| 6 | 0.0000000E+00 | 1.6941217E−03 | −1.1376016E−03 | −2.4962918E−04 | 3.8312353E−05 |
| 7 | 0.0000000E+00 | −1.9612267E−03 | −1.1052671E−03 | −2.1948131E−04 | 9.5591962E−06 |
| 8 | −3.1504000E+00 | −6.6185586E−04 | 1.8843873E−03 | −7.1673398E−04 | −2.8963858E−05 |
| 9 | −5.2470000E+00 | −2.8983549E−03 | −9.4299547E−05 | 3.5326308E−05 | 1.2336303E−04 |
| 10 | 0.0000000E+00 | −2.4626533E−03 | −3.1516622E−04 | −3.1025268E−05 | 2.1468379E−06 |
| 11 | 0.0000000E+00 | 1.8662833E−03 | 2.4407650E−04 | −2.5033399E−05 | −2.8849868E−05 |

| Si | RB7 | RB8 | RB9 | RB10 |
|---|---|---|---|---|
| 6 | 4.0542793E−05 | 1.1841171E−05 | −1.1532597E−05 | −5.0830790E−06 |
| 7 | 3.5278132E−06 | −5.4887690E−05 | 1.7736173E−05 | −2.7498392E−06 |
| 8 | −1.1381264E−05 | −2.5373697E−06 | −4.1482322E−06 | 1.3098283E−06 |
| 9 | 1.8000560E−05 | 4.3119181E−06 | 0.0000000E+00 | 0.0000000E+00 |
| 10 | 1.4923555E−05 | 1.5811113E−05 | 0.0000000E+00 | 0.0000000E+00 |
| 11 | 1.3356898E−05 | 2.1833442E−05 | 0.0000000E+00 | 0.0000000E+00 |

TABLE 14

EXAMPLE 14

(A)

| Si | Ri | Di | Ndj | ν dj |
|---|---|---|---|---|
| 1 | −5.7499 | 1.1960 | 1.62041 | 60.3 |
| 2 | 3.5117 | 1.1482 | | |
| 3 | 5.8779 | 3.4859 | 1.78800 | 47.4 |

TABLE 14-continued

EXAMPLE 14

| | | | | |
|---|---|---|---|---|
| 4 | −6.9260 | 0.5203 | | |
| 5 | ∞(APERTURE STOP) | 1.7679 | | |
| *6 | −8.3685 | 0.7000 | 1.61396 | 25.5 |
| *7 | 4.3815 | 0.1500 | | |
| *8 | 5.1185 | 1.8000 | 1.53389 | 56.0 |
| *9 | −7.4307 | 0.2000 | | |
| *10 | 5.6183 | 1.4002 | 1.53389 | 56.0 |
| *11 | −89.1466 | 4.0000 | | |
| 12 | ∞ | 0.5000 | 1.51680 | 64.2 |
| 13 | ∞ | 2.8920 | | |
| IMAGE PLANE | ∞ | | | |

(B)

| | |
|---|---|
| L(in Air) | 19.6 |
| Bf(in Air) | 7.2 |
| f | 5.10 |
| f1 | −3.35 |
| f2 | 4.59 |
| f3 | −4.59 |
| f4 | 5.97 |
| f5 | 9.95 |
| f12 | 12.84 |
| f345 | 10.13 |

(C)

| Si | KA | RB3 | RB4 | RB5 | RB6 |
|---|---|---|---|---|---|
| 6 | 0.0000000E+00 | 1.9647839E−03 | −7.8432787E−04 | −6.6235359E−04 | −1.6300405E−04 |
| 7 | 0.0000000E+00 | 1.2253061E−03 | −6.9892884E−04 | 1.1859474E−04 | 1.2369374E−04 |
| 8 | −3.1504000E+00 | −7.0640648E−04 | 3.4462725E−03 | −6.7297913E−06 | −3.9840963E−05 |
| 9 | −5.2470000E+00 | −1.5746642E−03 | −7.6628348E−04 | −7.2953797E−05 | 2.0071540E−04 |
| 10 | 0.0000000E+00 | −1.3476359E−03 | 1.1801481E−04 | 8.0031161E−05 | −1.7330647E−05 |
| 11 | 0.0000000E+00 | −1.4118633E−03 | −3.4514338E−04 | −8.7575651E−05 | −9.5907359E−05 |

| Si | RB7 | RB8 | RB9 | RB10 |
|---|---|---|---|---|
| 6 | −1.9360412E−06 | 2.1726026E−05 | −4.1718846E−05 | −9.7049178E−06 |
| 7 | −1.6529863E−04 | −2.1259750E−04 | 7.7273291E−05 | −1.4400348E−05 |
| 8 | −5.9385381E−06 | 9.7202452E−06 | −2.1000509E−05 | −2.5358430E−06 |
| 9 | −1.2016458E−04 | 4.3753765E−05 | 0.0000000E+00 | 0.0000000E+00 |
| 10 | −8.1174407E−05 | −4.7738318E−05 | 0.0000000E+00 | 0.0000000E+00 |
| 11 | −9.6026604E−05 | −1.4952729E−05 | 0.0000000E+00 | 0.0000000E+00 |

TABLE 15

EXAMPLE 15

(A)

| Si | Ri | Di | Ndj | νdj |
|---|---|---|---|---|
| 1 | −27.8765 | 1.1960 | 1.58913 | 61.1 |
| 2 | 3.4409 | 1.3315 | | |
| 3 | 5.3988 | 3.4859 | 1.78800 | 47.4 |
| 4 | −7.5103 | 0.1965 | | |
| 5 | ∞(APERTURE STOP) | 1.5267 | | |
| *6 | −4.3503 | 0.7000 | 1.63355 | 23.6 |
| *7 | 7.2713 | 0.1500 | | |
| *8 | 4.9101 | 2.4224 | 1.51104 | 56.8 |
| *9 | −5.5280 | 0.2000 | | |
| *10 | 6.1001 | 1.4002 | 1.51104 | 56.8 |
| *11 | 75.3572 | 4.0000 | | |
| 12 | ∞ | 0.5000 | 1.51680 | 64.2 |
| 13 | ∞ | 0.8241 | | |
| IMAGE PLANE | ∞ | | | |

(B)

| | |
|---|---|
| L(in Air) | 17.8 |
| Bf(in Air) | 5.2 |
| f | 5.55 |
| f1 | −5.13 |

TABLE 15-continued

EXAMPLE 15

| | |
|---|---|
| f2 | 4.52 |
| f3 | −4.20 |
| f4 | 5.52 |
| f5 | 12.90 |
| f12 | 7.89 |
| f345 | 10.36 |

(C)

| Si | KA | RB3 | RB4 | RB5 | RB6 |
|---|---|---|---|---|---|
| 6 | 0.0000000E+00 | 2.7440981E−06 | −9.6345305E−04 | −6.4239487E−04 | −5.2163716E−05 |
| 7 | 0.0000000E+00 | −1.2911222E−03 | −9.5196425E−04 | 4.1149386E−04 | 4.2120433E−04 |
| 8 | −3.1504000E+00 | −1.4902256E−03 | 3.5535859E−03 | 1.3340416E−04 | 4.1279565E−05 |
| 9 | −5.2470000E+00 | −4.9032362E−03 | −1.8539365E−03 | −1.6877995E−04 | 2.4208521E−04 |
| 10 | 0.0000000E+00 | −2.1962282E−03 | 5.3251865E−04 | 9.2118751E−05 | −2.7613823E−05 |
| 11 | 0.0000000E+00 | 4.2458089E−03 | 5.9757467E−04 | 1.7503558E−04 | −3.8332672E−05 |

| Si | RB7 | RB8 | RB9 | RB10 |
|---|---|---|---|---|
| 6 | 1.0528584E−04 | 7.5800068E−05 | −3.2348986E−05 | −2.5366681E−05 |
| 7 | 7.3725520E−05 | −2.5307069E−04 | 7.7273291E−05 | −1.4400348E−05 |
| 8 | 2.1416530E−05 | 1.0289107E−05 | −1.8921903E−05 | 3.0905318E−06 |
| 9 | −7.9950162E−06 | 3.6742002E−05 | 0.0000000E+00 | 0.0000000E+00 |
| 10 | −2.0470402E−05 | −5.5298423E−07 | 0.0000000E+00 | 0.0000000E+00 |
| 11 | −6.0283584E−05 | 6.9269169E−06 | 0.0000000E+00 | 0.0000000E+00 |

TABLE 16

EXAMPLE 16

(A)

| Si | Ri | Di | Ndj | νdj |
|---|---|---|---|---|
| 1 | −10.7518 | 1.1960 | 1.58913 | 61.1 |
| 2 | 4.0976 | 1.9412 | | |
| 3 | 5.6648 | 3.4861 | 1.88300 | 40.8 |
| 4 | −8.5981 | 0.1541 | | |
| 5 | ∞(APERTURE STOP) | 0.7942 | | |
| *6 | −3.2163 | 0.7000 | 1.61396 | 25.5 |
| *7 | 4.9408 | 0.1500 | | |
| *8 | 4.2239 | 2.0147 | 1.53389 | 56.0 |
| *9 | −5.3496 | 0.2000 | | |
| *10 | 4.6585 | 1.4002 | 1.53389 | 56.0 |
| *11 | 74.9995 | 4.0000 | | |
| 12 | ∞ | 0.5000 | 1.51680 | 64.2 |
| 13 | ∞ | 0.9343 | | |
| IMAGE PLANE | ∞ | | | |

(B)

| | |
|---|---|
| L(in Air) | 17.3 |
| Bf(in Air) | 5.3 |
| f | 4.48 |
| f1 | −4.89 |
| f2 | 4.37 |
| f3 | −3.07 |
| f4 | 4.77 |
| f5 | 9.24 |
| f12 | 6.11 |
| f345 | 9.66 |

(C)

| Si | KA | RB3 | RB4 | RB5 | RB6 |
|---|---|---|---|---|---|
| 6 | 0.0000000E+00 | 3.2487664E−04 | −3.0433278E−04 | −2.5044545E−04 | 2.8380751E−05 |
| 7 | 0.0000000E+00 | −1.3898717E−03 | −1.4974243E−03 | −1.1883616E−04 | 1.2403156E−04 |
| 8 | −3.1504000E+00 | 8.2421994E−04 | 3.6466508E−03 | 9.4341211E−06 | −5.4218695E−05 |
| 9 | −5.2470000E+00 | −3.4963850E−03 | −4.2876187E−04 | 6.0405406E−05 | 2.6649827E−04 |
| 10 | 0.0000000E+00 | −4.4122977E−04 | 1.5120126E−04 | 1.8071005E−05 | −3.0005740E−05 |
| 11 | 0.0000000E+00 | 3.6350878E−03 | 4.7198832E−05 | −3.5361784E−04 | −1.9207910E−04 |

TABLE 16-continued

| EXAMPLE 16 | | | | |
|---|---|---|---|---|
| Si | RB7 | RB8 | RB9 | RB10 |
| 6 | 7.3176261E−05 | 4.1173565E−05 | −3.2526995E−05 | −6.8112242E−06 |
| 7 | −2.9658062E−05 | −1.6553625E−04 | 7.7273291E−05 | −1.4400348E−05 |
| 8 | −1.4943625E−05 | 5.3259581E−06 | −1.2250389E−05 | 6.9794471E−06 |
| 9 | 1.4128441E−05 | 7.0641803E−05 | 0.0000000E+00 | 0.0000000E+00 |
| 10 | 1.1206384E−05 | 5.0153717E−05 | 0.0000000E+00 | 0.0000000E+00 |
| 11 | 2.0212315E−05 | 9.1380311E−05 | 0.0000000E+00 | 0.0000000E+00 |

TABLE 17

| EXAMPLE 17 | | | | |
|---|---|---|---|---|
| (A) | | | | |
| Si | Ri | Di | Ndj | νdj |
| 1 | −20.0019 | 1.1960 | 1.58913 | 61.1 |
| 2 | 3.1076 | 1.2157 | | |
| 3 | 5.0305 | 3.4851 | 1.80400 | 46.6 |
| 4 | −7.1446 | 0.1243 | | |
| 5 | ∞(APERTURE STOP) | 1.9342 | | |
| *6 | −4.4273 | 0.7000 | 1.65150 | 20.5 |
| *7 | 13.5091 | 0.1500 | | |
| *8 | 6.2196 | 1.1555 | 1.53389 | 56.0 |
| *9 | −12.1878 | 0.2000 | | |
| *10 | 3.9633 | 1.6000 | 1.53389 | 56.0 |
| *11 | −12.1764 | 3.0000 | | |
| 12 | ∞ | 0.5000 | 1.51680 | 64.2 |
| 13 | ∞ | 0.1001 | | |
| IMAGE PLANE | ∞ | | | |

| (B) | |
|---|---|
| L(in Air) | 15.2 |
| Bf(in Air) | 3.4 |
| f | 4.13 |
| f1 | −4.48 |
| f2 | 4.21 |
| f3 | −5.04 |
| f4 | 7.89 |
| f5 | 5.80 |
| f12 | 7.54 |
| f345 | 6.55 |

| (C) | | | | |
|---|---|---|---|---|
| Si | KA | RB3 | RB4 | RB5 | RB6 |
| 6 | 0.0000000E+00 | −6.4231067E−05 | −3.3407490E−03 | −1.0042060E−03 | −3.6341117E−04 |
| 7 | 0.0000000E+00 | −8.5979703E−03 | −2.4554326E−03 | −5.9813925E−04 | −4.4078288E−04 |
| 8 | −3.1504000E+00 | −4.0714402E−03 | 2.2423607E−03 | −3.2273213E−04 | −1.1847967E−04 |
| 9 | −5.2470000E+00 | −6.0230339E−03 | 1.5227937E−03 | 2.5152107E−04 | 1.3968091E−04 |
| 10 | 0.0000000E+00 | −6.6043814E−03 | −7.3381681E−04 | −6.2229254E−05 | −2.7136782E−05 |
| 11 | 0.0000000E+00 | 8.2836213E−03 | 1.8185902E−03 | −6.2833672E−05 | −3.1363072E−04 |

| Si | RB7 | RB8 | RB9 | RB10 |
|---|---|---|---|---|
| 6 | −3.7343213E−05 | 5.7275342E−05 | −2.5924874E−05 | −6.0684250E−05 |
| 7 | −3.2990098E−04 | −6.0891454E−05 | 7.7273291E−05 | −1.4400348E−05 |
| 8 | −3.2069528E−05 | −1.3015647E−05 | −2.1161965E−05 | 1.2672429E−05 |
| 9 | −6.8139592E−05 | 6.5745505E−05 | 0.0000000E+00 | 0.0000000E+00 |
| 10 | 1.9050309E−05 | 3.7097695E−05 | 0.0000000E+00 | 0.0000000E+00 |
| 11 | −8.8284459E−05 | 8.2660848E−05 | 0.0000000E+00 | 0.0000000E+00 |

TABLE 18

EXAMPLE 18

(A)

| Si | Ri | Di | Ndj | νdj |
|---|---|---|---|---|
| 1 | −12.4407 | 1.1960 | 1.48749 | 70.2 |
| 2 | 3.2760 | 1.9991 | | |
| 3 | 5.7789 | 3.4860 | 1.75500 | 52.3 |
| 4 | −7.6982 | 0.0844 | | |
| 5 | ∞(APERTURE STOP) | 1.7836 | | |
| *6 | −4.3468 | 0.7000 | 1.61396 | 25.5 |
| *7 | 5.8513 | 0.1500 | | |
| *8 | 5.7096 | 1.8566 | 1.53389 | 56.0 |
| *9 | −5.8467 | 0.2000 | | |
| *10 | 4.8518 | 1.4002 | 1.53389 | 56.0 |
| *11 | 317.7800 | 4.0000 | | |
| 12 | ∞ | 0.5000 | 1.51680 | 64.2 |
| 13 | ∞ | 0.8208 | | |
| IMAGE PLANE | ∞ | | | |

(B)

| | |
|---|---|
| L(in Air) | 18.0 |
| Bf(in Air) | 5.2 |
| f | 4.80 |
| f1 | −5.19 |
| f2 | 4.92 |
| f3 | −3.96 |
| f4 | 5.73 |
| f5 | 9.21 |
| f12 | 7.53 |
| f345 | 9.37 |

(C)

| Si | KA | RB3 | RB4 | RB5 | RB6 |
|---|---|---|---|---|---|
| 6 | 0.0000000E+00 | 1.6844785E−04 | −7.5853320E−04 | −6.6426729E−04 | −1.3533735E−04 |
| 7 | 0.0000000E+00 | 7.0185338E−04 | −9.0933989E−04 | 1.0256076E−04 | 1.8259186E−04 |
| 8 | −3.1504000E+00 | −1.0649616E−04 | 3.6065443E−03 | 3.1934651E−05 | −2.7835748E−05 |
| 9 | −5.2470000E+00 | −3.2246333E−03 | −1.1898333E−03 | −9.3408724E−05 | 2.2570536E−04 |
| 10 | 0.0000000E+00 | −2.1197810E−03 | 3.0189441E−04 | 6.4734432E−05 | 9.5909049E−06 |
| 11 | 0.0000000E+00 | 1.0659509E−03 | 8.2790745E−05 | 8.2858011E−05 | −5.8983724E−05 |

| Si | RB7 | RB8 | RB9 | RB10 |
|---|---|---|---|---|
| 6 | 4.3079874E−05 | 4.1654509E−05 | −3.3789136E−05 | −7.2526843E−06 |
| 7 | −5.5511200E−05 | −1.8194937E−04 | 7.7273291E−05 | −1.4400348E−05 |
| 8 | −3.1609953E−06 | 7.7356887E−06 | −1.5324902E−05 | 3.8865615E−06 |
| 9 | −1.9686644E−05 | 5.4148567E−05 | 0.0000000E+00 | 0.0000000E+00 |
| 10 | −9.2494990E−06 | 4.4304458E−07 | 0.0000000E+00 | 0.0000000E+00 |
| 11 | −4.7543481E−05 | 1.3665930E−05 | 0.0000000E+00 | 0.0000000E+00 |

TABLE 19

EXAMPLE 19

(A)

| Si | Ri | Di | Ndj | νdj |
|---|---|---|---|---|
| 1 | −6.5062 | 1.1958 | 1.48749 | 70.2 |
| 2 | 4.3836 | 0.5636 | | |
| 3 | 4.3237 | 3.4848 | 1.75500 | 52.3 |
| 4 | −6.5040 | 0.1506 | | |
| 5 | ∞(APERTURE STOP) | 0.3234 | | |
| *6 | −2.5605 | 0.7000 | 1.61396 | 25.5 |
| *7 | 6.5160 | 0.1500 | | |
| *8 | 4.2952 | 1.6959 | 1.53389 | 56.0 |
| *9 | −5.0791 | 0.2000 | | |
| *10 | 4.1491 | 1.4002 | 1.53389 | 56.0 |
| *11 | 74.9994 | 2.0000 | | |

TABLE 19-continued

EXAMPLE 19

| Si | Ri | Di | Ndj | νdj |
|---|---|---|---|---|
| 12 | ∞ | 0.5000 | 1.51680 | 64.2 |
| 13 | ∞ | 2.1475 | | |
| IMAGE PLANE | ∞ | | | |

(B)

| | |
|---|---|
| L(in Air) | 14.3 |
| Bf(in Air) | 4.5 |
| f | 4.47 |
| f1 | −4.27 |
| f2 | 3.46 |
| f3 | −2.91 |
| f4 | 4.65 |
| f5 | 8.17 |
| f12 | 5.84 |
| f345 | 8.77 |

(C)

| Si | KA | RB3 | RB4 | RB5 | RB6 |
|---|---|---|---|---|---|
| 6 | 0.0000000E+00 | −7.1471791E−04 | 1.5015374E−03 | 1.7137235E−04 | 9.7164668E−05 |
| 7 | 0.0000000E+00 | −2.0461088E−03 | −3.7646786E−03 | −2.1645818E−04 | 4.6274356E−04 |
| 8 | −3.1504000E+00 | −1.8934633E−03 | 4.0319023E−03 | −1.5718906E−04 | −1.9351214E−04 |
| 9 | −5.2470000E+00 | −3.0678122E−03 | 4.0625899E−04 | 1.1855348E−03 | 5.3182740E−04 |
| 10 | 0.0000000E+00 | −2.4312513E−03 | −7.0511945E−04 | −4.5986995E−04 | −1.6180663E−04 |
| 11 | 0.0000000E+00 | 1.7457169E−03 | −2.0174086E−03 | −1.1064439E−03 | −4.0667853E−04 |

| Si | RB7 | RB8 | RB9 | RB10 |
|---|---|---|---|---|
| 6 | 9.9787165E−05 | 6.7790984E−05 | −2.5469936E−05 | −2.4538801E−05 |
| 7 | 1.0545090E−04 | −2.1989069E−04 | 7.7273291E−05 | −1.4400348E−05 |
| 8 | −6.0051815E−05 | 1.0292793E−06 | −9.2391201E−06 | 1.0242852E−05 |
| 9 | −7.5975661E−05 | 1.3681751E−05 | 0.0000000E+00 | 0.0000000E+00 |
| 10 | 4.6357267E−06 | 8.2231321E−05 | 0.0000000E+00 | 0.0000000E+00 |
| 11 | 3.2860131E−05 | 1.2555748E−04 | 0.0000000E+00 | 0.0000000E+00 |

TABLE 20

EXAMPLE 20

(A)

| Si | Ri | Di | Ndj | νdj |
|---|---|---|---|---|
| 1 | −12.9662 | 1.1960 | 1.58913 | 61.1 |
| 2 | 3.0601 | 1.6148 | | |
| 3 | 5.7786 | 3.4850 | 1.80400 | 46.6 |
| 4 | −6.4546 | 0.5379 | | |
| 5 | ∞(APERTURE STOP) | 1.0481 | | |
| *6 | −4.3738 | 0.7000 | 1.71982 | 19.2 |
| *7 | 13.5001 | 0.1500 | | |
| *8 | 12.5714 | 1.4152 | 1.60550 | 51.8 |
| *9 | −7.6262 | 0.2000 | | |
| *10 | 5.6544 | 1.6000 | 1.60550 | 51.8 |
| *11 | −17.0116 | 4.0000 | | |
| 12 | ∞ | 0.5000 | 1.51680 | 64.2 |
| 13 | ∞ | 0.9497 | | |
| IMAGE PLANE | ∞ | | | |

(B)

| | |
|---|---|
| L(in Air) | 17.2 |
| Bf(in Air) | 5.3 |
| f | 4.36 |
| f1 | −4.09 |
| f2 | 4.34 |
| f3 | −4.52 |
| f4 | 8.05 |
| f5 | 7.20 |
| f12 | 6.98 |
| f345 | 9.22 |

TABLE 20-continued

EXAMPLE 20

(C)

| Si | KA | RB3 | RB4 | RB5 | RB6 |
|---|---|---|---|---|---|
| 6 | 0.0000000E+00 | −1.4499634E−03 | −2.6178720E−03 | −7.7890516E−04 | 1.5523916E−05 |
| 7 | 0.0000000E+00 | −5.8196648E−03 | −1.4494315E−03 | −8.2516177E−05 | 1.8627565E−04 |
| 8 | −3.1504000E+00 | −2.5921619E−03 | 2.7291479E−03 | −2.8407467E−04 | −1.9001915E−04 |
| 9 | −5.2470000E+00 | −6.3770351E−03 | −3.1802614E−04 | −1.6318339E−04 | 1.4498174E−04 |
| 10 | 0.0000000E+00 | −5.3201992E−03 | −1.2533087E−03 | −3.5474502E−04 | −2.3251604E−04 |
| 11 | 0.0000000E+00 | 2.1191253E−03 | 8.0973092E−04 | −3.6236807E−04 | −4.3730615E−04 |

| Si | RB7 | RB8 | RB9 | RB10 |
|---|---|---|---|---|
| 6 | 1.4482495E−04 | 8.1140804E−05 | −3.6607315E−05 | −3.7006371E−05 |
| 7 | 2.3750967E−05 | −3.8461973E−04 | 7.7273291E−05 | −1.4400348E−05 |
| 8 | −7.4516990E−05 | −2.2551582E−05 | −3.0303570E−05 | −9.2119803E−06 |
| 9 | −1.5756176E−05 | 3.9600991E−05 | 0.0000000E+00 | 0.0000000E+00 |
| 10 | −7.0620052E−05 | 3.9624904E−05 | 0.0000000E+00 | 0.0000000E+00 |
| 11 | −1.0017944E−04 | 4.3631072E−05 | 0.0000000E+00 | 0.0000000E+00 |

TABLE 21

EXAMPLE 21

(A)

| Si | Ri | Di | Ndj | νdj |
|---|---|---|---|---|
| 1 | −14.5449 | 1.1959 | 1.54036 | 63.1 |
| 2 | 2.6658 | 1.6857 | | |
| 3 | 4.9308 | 3.4845 | 1.85692 | 41.4 |
| 4 | −6.1681 | 0.0000 | | |
| 5 | ∞(APERTURE STOP) | 0.6837 | | |
| *6 | −6.4281 | 0.7000 | 1.68522 | 18.5 |
| *7 | 8.3818 | 0.1500 | | |
| *8 | 13.6254 | 1.3016 | 1.59779 | 61.1 |
| *9 | −10.2580 | 0.2000 | | |
| *10 | 6.0196 | 1.6000 | 1.52097 | 63.9 |
| *11 | −17.0152 | 4.0000 | | |
| 12 | ∞ | 0.5000 | 1.51680 | 64.2 |
| 13 | ∞ | 0.1345 | | |
| IMAGE PLANE | ∞ | | | |

(B)

| | |
|---|---|
| L(in Air) | 15.5 |
| Bf(in Air) | 4.5 |
| f | 4.34 |
| f1 | −4.07 |
| f2 | 3.74 |
| f3 | −5.21 |
| f4 | 9.99 |
| f5 | 8.74 |
| f12 | 4.90 |
| f345 | 15.40 |

(C)

| Si | KA | RB3 | RB4 | RB5 | RB6 |
|---|---|---|---|---|---|
| 6 | 0.0000000E+00 | −1.6133752E−03 | −2.5637207E−03 | −6.7562558E−04 | 3.6478590E−06 |
| 7 | 0.0000000E+00 | −4.0242821E−03 | −9.0141859E−04 | 5.7626938E−04 | 4.9192873E−04 |
| 8 | −3.1504000E+00 | −3.9270789E−05 | 3.4000629E−03 | 3.9585003E−05 | −8.7333691E−05 |
| 9 | −5.2470000E+00 | −4.9784739E−03 | 5.8974593E−04 | −1.3594942E−04 | 9.4617592E−05 |
| 10 | 0.0000000E+00 | −6.7098911E−03 | −1.6704424E−03 | −4.4846308E−04 | −2.7065816E−04 |
| 11 | 0.0000000E+00 | 1.8978387E−03 | 3.6574620E−04 | −7.9919767E−04 | −5.7301179E−04 |

| Si | RB7 | RB8 | RB9 | RB10 |
|---|---|---|---|---|
| 6 | 1.1470557E−04 | 7.1957676E−05 | −3.3909148E−05 | −2.5975393E−05 |
| 7 | 1.1119269E−04 | −4.3506716E−04 | 7.7273291E−05 | −1.4400348E−05 |
| 8 | −5.5403399E−05 | −2.5812943E−05 | −3.8321734E−05 | −1.3678202E−05 |
| 9 | −9.1263183E−06 | 6.9476572E−05 | 0.0000000E+00 | 0.0000000E+00 |

TABLE 21-continued

EXAMPLE 21

| | | | | |
|---|---|---|---|---|
| 10 | −6.2827457E−05 | 6.6381204E−05 | 0.0000000E+00 | 0.0000000E+00 |
| 11 | −2.4677361E−05 | 4.6317877E−05 | 0.0000000E+00 | 0.0000000E+00 |

TABLE 22

EXAMPLE 22

(A)

| Si | Ri | Di | Ndj | ν dj |
|---|---|---|---|---|
| 1 | −14.5449 | 1.1959 | 1.54036 | 63.1 |
| 2 | 2.6658 | 2.1000 | | |
| 3 | ∞(APERTURE STOP) | −0.4143 | | |
| 4 | 4.9308 | 3.4845 | 1.85692 | 41.4 |
| 5 | −6.1681 | 0.6837 | | |
| *6 | −6.4281 | 0.7000 | 1.68522 | 18.5 |
| *7 | 8.3818 | 0.1500 | | |
| *8 | 13.6254 | 1.3016 | 1.59779 | 61.1 |
| *9 | −10.2580 | 0.2000 | | |
| *10 | 6.0196 | 1.6000 | 1.52097 | 63.9 |
| *11 | −17.0152 | 4.0000 | | |
| 12 | ∞ | 0.5000 | 1.51680 | 64.2 |
| 13 | ∞ | 0.1345 | | |
| IMAGE PLANE | ∞ | | | |

(B)

| | |
|---|---|
| L(in Air) | 15.5 |
| Bf(in Air) | 4.5 |
| f | 4.34 |
| f1 | −4.07 |
| f2 | 3.74 |
| f3 | −5.21 |
| f4 | 9.99 |
| f5 | 8.74 |
| f12 | 4.90 |
| f345 | 15.40 |

(C)

| Si | KA | RB3 | RB4 | RB5 | RB6 |
|---|---|---|---|---|---|
| 6 | 0.0000000E+00 | −1.6133752E−03 | −2.5637207E−03 | −6.7562558E−04 | 3.6478590E−06 |
| 7 | 0.0000000E+00 | −4.0242821E−03 | −9.0141859E−05 | 5.7626938E−04 | 4.9192873E−04 |
| 8 | −3.1504000E+00 | −3.9270789E−05 | 3.4000629E−03 | 3.9585003E−05 | −8.7333691E−05 |
| 9 | −5.2470000E+00 | −4.9784739E−03 | 5.8974593E−04 | −1.3594942E−03 | 9.4617592E−05 |
| 10 | 0.0000000E+00 | −6.7098911E−03 | −1.6710424E−03 | −4.4846308E−04 | −2.7065816E−04 |
| 11 | 0.0000000E+00 | 1.8978387E−03 | 3.6574620E−04 | −7.9919767E−04 | −5.7301179E−04 |

| Si | RB7 | RB8 | RB9 | RB10 |
|---|---|---|---|---|
| 6 | 1.1470557E−04 | 7.1957676E−05 | −3.3909148E−05 | −2.5975393E−05 |
| 7 | 1.1119269E−04 | −4.3506716E−04 | 7.7273291E−05 | −1.4400348E−05 |
| 8 | −5.5403399E−05 | −2.5812943E−05 | −3.8321734E−05 | −1.3678202E−05 |
| 9 | −9.1263183E−06 | 6.9476572E−05 | 0.0000000E+00 | 0.0000000E+00 |
| 10 | −6.2827457E−05 | 6.6381204E−05 | 0.0000000E+00 | 0.0000000E+00 |
| 11 | −2.4677361E−05 | 4.6317877E−05 | 0.0000000E+00 | 0.0000000E+00 |

TABLE 23

EXAMPLE 23

(A)

| Si | Ri | Di | Ndj | ν dj |
|---|---|---|---|---|
| 1 | −18.1647 | 1.1960 | 1.58913 | 61.1 |
| 2 | 3.3716 | 1.5789 | | |

TABLE 23-continued

EXAMPLE 23

| | | |  | |
|---|---|---|---|---|
| 3 | ∞(APERTURE STOP) | 0.2000 | | |
| 4 | 6.8045 | 3.4856 | 1.80400 | 46.6 |
| 5 | −6.6946 | 2.2825 | | |
| *6 | −2.8582 | 0.7000 | 1.61396 | 25.5 |
| *7 | 6.4984 | 0.1500 | | |
| *8 | 4.4629 | 1.7309 | 1.53389 | 56.0 |
| *9 | −5.4406 | 0.2000 | | |
| *10 | 6.2267 | 1.6000 | 1.53389 | 56.0 |
| *11 | −17.0396 | 4.0000 | | |
| 12 | ∞ | 0.5000 | 1.51680 | 64.2 |
| 13 | ∞ | 1.5523 | | |
| IMAGE PLANE | ∞ | | | |

(B)

| | |
|---|---|
| L(in Air) | 19.0 |
| Bf(in Air) | 5.9 |
| f | 4.94 |
| f1 | −4.73 |
| f2 | 4.74 |
| f3 | −3.14 |
| f4 | 4.89 |
| f5 | 8.75 |
| f12 | 7.52 |
| f345 | 9.35 |
| VIGNETTING SURFACE NUMBER | 8 |
| VIGNETTING APERTURE DIAMETER | 2.3 |

(C)

| Si | KA | RB3 | RB4 | RB5 | RB6 |
|---|---|---|---|---|---|
| 6 | 0.0000000E+00 | 2.4211837E−03 | −6.6506399E−04 | −3.3063392E−04 | −1.3399201E−05 |
| 7 | 0.0000000E+00 | −1.7820380E−03 | −1.5441170E−03 | −2.6462657E−04 | 7.5208098E−05 |
| 8 | −3.1504000E+00 | −1.0932246E−04 | 3.5133445E−03 | 2.9781696E−05 | −4.7734893E−05 |
| 9 | −5.2470000E+00 | −4.1032088E−03 | −2.1019828E−04 | 2.3298508E−05 | 2.8532085E−04 |
| 10 | 0.0000000E+00 | −3.4705258E−03 | −3.9048060E−04 | −1.9867140E−05 | 2.9613758E−06 |
| 11 | 0.0000000E+00 | 2.4005343E−03 | 2.7149844E−04 | −1.2283620E−04 | −1.0031051E−04 |

| Si | RB7 | RB8 | RB9 | RB10 |
|---|---|---|---|---|
| 6 | 4.2381676E−05 | 2.1247127E−05 | −3.7023348E−05 | −4.1007793E−06 |
| 7 | 9.1039949E−06 | −1.9756776E−04 | 7.7273291E−05 | −1.4400348E−05 |
| 8 | −1.8416536E−05 | −4.2864122E−07 | −1.3917747E−05 | 7.1683756E−06 |
| 9 | 6.5827850E−05 | 4.5148009E−05 | 0.0000000E+00 | 0.0000000E+00 |
| 10 | 3.5450799E−05 | 4.1612595E−05 | 0.0000000E+00 | 0.0000000E+00 |
| 11 | 1.5002814E−05 | 7.2667201E−05 | 0.0000000E+00 | 0.0000000E+00 |

In all of the imaging lenses of Examples 1 through 23, the first lens L1 and the second lens L2 are spherical lenses of glass, and the third lens L3, the fourth lens L4 and the fifth lens L5 are aspherical lenses of plastic.

Table 24 shows values in the imaging lenses of Examples 1 through 23 corresponding to formulas (1) through (14). In Examples 1 through 23, d-line is a reference wavelength, and Table 24 shows each value at the reference wavelength.

TABLE 24

| | FORMULA | | | | | | | | | | | | | |
|---|---|---|---|---|---|---|---|---|---|---|---|---|---|---|
| EXAMPLE | (1) f1/f | (2) f2/f | (3) (R1+R2)/(R1−R2) | (4) f5/f | (5) D23/f | (6) (R10+R11)/(R10−R11) | (7) f1/f2 | (8) f4/f | (9) D2/f | (10) f345/f | (11) \|f12/f345\| | (12) R1/f | (13) f3/f | (14) L/f |
| 1 | −1.03 | 1.12 | 0.69 | 1.96 | 0.55 | −0.46 | −0.92 | 1.10 | 0.50 | 1.99 | 0.83 | −3.94 | −0.73 | 4.38 |
| 2 | −0.96 | 0.96 | 0.69 | 1.77 | 0.46 | −0.46 | −1.00 | 0.99 | 0.36 | 1.89 | 0.81 | −3.68 | −0.64 | 3.85 |
| 3 | −1.05 | 1.12 | 0.71 | 1.87 | 0.57 | −0.37 | −0.94 | 1.02 | 0.46 | 1.85 | 0.96 | −4.39 | −0.70 | 4.21 |
| 4 | −0.62 | 0.86 | 0.18 | 1.96 | 0.38 | −0.94 | −0.72 | 1.08 | 0.22 | 2.15 | 1.12 | −0.98 | −0.83 | 3.68 |
| 5 | −0.87 | 0.86 | 0.68 | 1.96 | 0.34 | −1.13 | −1.02 | 0.98 | 0.31 | 2.00 | 0.72 | −3.31 | −0.65 | 3.52 |
| 6 | −1.08 | 1.11 | 0.49 | 1.83 | 0.40 | −1.10 | −0.97 | 1.04 | 0.40 | 1.72 | 1.18 | −2.55 | −0.70 | 4.08 |
| 7 | −0.94 | 0.90 | 0.76 | 1.00 | 0.55 | −0.70 | −1.04 | 1.18 | 0.26 | 1.47 | 1.16 | −4.95 | −0.58 | 3.64 |
| 8 | −1.03 | 1.00 | 0.67 | 1.37 | 0.50 | −0.61 | −1.04 | 1.11 | 0.32 | 1.61 | 1.05 | −3.80 | −0.63 | 3.88 |
| 9 | −0.98 | 0.97 | 0.47 | 1.99 | 0.35 | −1.15 | −1.01 | 1.07 | 0.40 | 2.18 | 0.68 | −1.85 | −0.72 | 3.68 |
| 10 | −1.08 | 1.13 | 0.75 | 1.91 | 0.62 | −0.48 | −0.96 | 1.12 | 0.49 | 1.81 | 0.93 | −5.09 | −0.77 | 4.34 |
| 11 | −1.05 | 1.08 | 0.73 | 1.87 | 0.52 | −0.46 | −0.97 | 1.12 | 0.45 | 1.85 | 0.88 | −4.65 | −0.74 | 4.21 |
| 12 | −1.07 | 1.03 | 0.72 | 1.77 | 0.50 | −0.43 | −1.04 | 1.07 | 0.34 | 1.65 | 1.05 | −4.61 | −0.74 | 3.91 |
| 13 | −1.19 | 1.16 | 0.85 | 1.88 | 0.76 | −0.39 | −1.02 | 1.10 | 0.45 | 1.51 | 1.23 | −9.11 | −0.87 | 4.19 |
| 14 | −0.66 | 0.90 | 0.24 | 1.95 | 0.45 | −0.88 | −0.73 | 1.17 | 0.23 | 1.99 | 1.27 | −1.13 | −0.90 | 3.84 |

TABLE 24-continued

| | | | FORMULA | | | | | | | | | | | |
|---|---|---|---|---|---|---|---|---|---|---|---|---|---|---|
| EXAMPLE | (1) f1/f | (2) f2/f | (3) (R1+R2) (R1−R2) | (4) f5/f | (5) D23/f | (6) (R10+R11) (R10−R11) | (7) f1/f2 | (8) f4/f | (9) D2/f | (10) f345/f | (11) \|f12/f345\| | (12) R1/f | (13) f3/f | (14) L/f |
| 15 | −0.92 | 0.82 | 0.78 | 2.33 | 0.31 | −1.18 | −1.13 | 1.00 | 0.24 | 1.87 | 0.76 | −5.03 | −0.76 | 3.20 |
| 16 | −1.09 | 0.98 | 0.45 | 2.06 | 0.21 | −1.13 | −1.12 | 1.07 | 0.43 | 2.16 | 0.63 | −2.40 | −0.69 | 3.86 |
| 17 | −1.09 | 1.02 | 0.73 | 1.41 | 0.50 | −0.51 | −1.06 | 1.91 | 0.29 | 1.59 | 1.15 | −4.85 | −1.22 | 3.68 |
| 18 | −1.08 | 1.02 | 0.58 | 1.92 | 0.39 | −1.03 | −1.05 | 1.19 | 0.42 | 1.95 | 0.80 | −2.59 | −0.82 | 3.75 |
| 19 | −0.96 | 0.78 | 0.19 | 1.83 | 0.11 | −1.12 | −1.23 | 1.04 | 0.13 | 1.96 | 0.67 | −1.46 | −0.65 | 3.21 |
| 20 | −0.94 | 1.00 | 0.62 | 1.65 | 0.36 | −0.50 | −0.94 | 1.85 | 0.37 | 2.12 | 0.76 | −2.98 | −1.04 | 3.95 |
| 21 | −0.94 | 0.86 | 0.69 | 2.02 | 0.16 | −0.48 | −1.09 | 2.30 | 0.39 | 3.55 | 0.32 | −3.35 | −1.20 | 3.56 |
| 22 | −0.94 | 0.86 | 0.69 | 2.02 | 0.16 | −0.48 | −1.09 | 2.30 | 0.39 | 3.55 | 0.32 | −3.35 | −1.20 | 3.56 |
| 23 | −0.96 | 0.96 | 0.69 | 1.77 | 0.46 | −0.46 | −1.00 | 0.99 | 0.36 | 1.89 | 0.81 | −3.68 | −0.64 | 3.85 |

FIG. 27, Section A through FIG. 27, Section D, FIG. 28, Section A through FIG. 28, Section D, FIG. 29, Section A through FIG. 29, Section D, FIG. 30, Section A through FIG. 30, Section D, FIG. 31, Section A through FIG. 31, Section D, FIG. 32, Section A through FIG. 32, Section D, FIG. 33, Section A through FIG. 33, Section D, FIG. 34, Section A through FIG. 34, Section D, FIG. 35, Section A through FIG. 35, Section D, FIG. 36, Section A through FIG. 36, Section D, FIG. 37, Section A through FIG. 37, Section D, FIG. 38, Section A through FIG. 38, Section D, FIG. 39, Section A through FIG. 39, Section D, FIG. 40, Section A through FIG. 40, Section D, FIG. 41, Section A through FIG. 41, Section D, FIG. 42, Section A through FIG. 42, Section D, FIG. 43, Section A through FIG. 43, Section D, FIG. 44, Section A through FIG. 44, Section D, FIG. 45, Section A through FIG. 45, Section D, FIG. 46, Section A through FIG. 46, Section D, FIG. 47, Section A through FIG. 47, Section D, FIG. 48, Section A through FIG. 48, Section D, and FIG. 49, Section A through FIG. 49, Section D show aberration diagrams of the imaging lenses of Examples 1 through 23, respectively.

Here, the aberration diagrams of Example 1 will be explained as an example, but the aberration diagrams of the other examples are similar to those of Example 1. FIG. 27, Section A, FIG. 27, Section B, FIG. 27, Section C and FIG. 27, Section D illustrate a spherical aberration, astigmatism, distortion (distortion aberration), and a lateral chromatic aberrations (chromatic aberrations of magnification) in the imaging lens of Example 1, respectively. In the diagram of the spherical aberration, Fno. represents F-number, and in the other diagrams, ω represents a half angle of view. In the diagram of the distortion, a shift amount from an ideal image height f×tan (φ) is illustrated by using focal length f of the entire system and angle φ of view (variable, 0≤φ≤ω). Each aberration diagram illustrates an aberration when d-line (587.56 nm) is a reference wavelength. The aberration diagram of the spherical aberration illustrates aberrations also with respect to F-line (wavelength 486.13 nm), C-line (wavelength 656.27 nm), s-line (wavelength 852.11 nm) and an offense against the sine condition (indicated as SNC). Further, the diagram of lateral chromatic aberration illustrates aberrations with respect to F-line, C-line and s-line. Since the types of lines used in the lateral chromatic aberration diagram are the same as those used in the spherical aberration diagram, they are not written in the lateral chromatic aberration diagram.

As these data show, the imaging lenses of Examples 1 through 23 are small-sized and structured at low cost. Further, the F-number is in the range of 1.60 to 2.00, which is small, and the full angle of view is 45.0° through 65.4°. Further, the imaging lens has a sufficiently long back focus. The imaging lens has high optical performance in which various aberrations are corrected in an excellent manner. These imaging lenses are appropriate for use in a surveillance camera, an in-vehicle camera for imaging an image on the front side, the lateral sides, the rear side or the like of a car, or the like.

Figure 50:
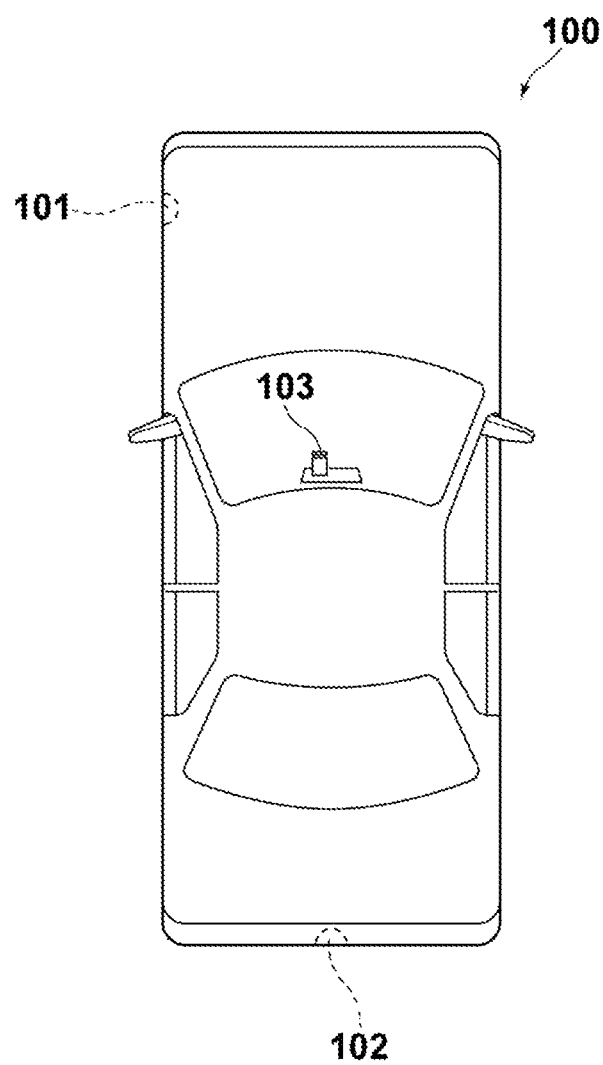
FIG. 50 is a diagram for explaining the arrangement of an imaging apparatus for in-vehicle use according to an embodiment of the present invention.

FIG. 50 illustrates, as an example, a manner of mounting an imaging apparatus including the imaging lens of the present embodiment in a car 100. In FIG. 50, the car 100 includes an exterior camera 101 for imaging a driver's blind spot on a side of a seat next to the driver, an exterior camera 102 for imaging a driver's blind spot on a rear side of the car 100, and an interior camera 103 for imaging the same range as the driver's visual field. The interior camera 103 is attached to the back side of a rearview mirror. The exterior camera 101, the exterior camera 102, and the interior camera 103 are imaging apparatuses according to an embodiment of the present invention, and they include an imaging lens according to an embodiment of the present invention and an imaging device for converting an optical image formed by the imaging lens into electrical signals.

The imaging lenses according to the embodiments of the present invention have the aforementioned advantages. Therefore, the exterior cameras 101 and 102, and the interior camera 103 can be structured in small size and at low cost, and used even in low illumination photography conditions. Further, high-resolution excellent images are obtainable by using an imaging device.

So far, the present invention has been described by using embodiments and examples. However, the present invention is not limited to the aforementioned embodiments nor examples, and various modifications are possible. For example, values of a curvature radius, a distance between surfaces, a refractive index, an Abbe number, and aspherical surface coefficients of each lens element are not limited to the values in the aforementioned examples of numerical values, but may be other values.

In the embodiment of the imaging apparatus, a case in which the present invention is applied to an in-vehicle camera was described. However, the use of the present invention is not limited to this purpose. For example, the present invention may be applied to a camera for a mobile terminal, a surveillance camera, and the like.

What is claimed is:
1. An imaging lens consisting of:
a negative first lens having a concave object-side surface;
a positive second lens;
a negative third lens;
a positive fourth lens having a convex object-side surface; and a positive fifth lens, which are in this order from an object side, wherein a stop is arranged between an image-side surface of the first lens and an object-side surface of the third lens, and wherein when the focal length of an entire system is f, and the focal length of the first lens is f1, and the focal length of the second lens is f2, and the combined focal length of the first lens and the second lens is f12, and the combined focal length of the third lens, the fourth lens and the fifth lens is f345, the following formulas (1), (7) and (11') are satisfied:

$$-1.25<f1/f<-0.5 \quad (1);$$

$$-1.30<f1/f2<-0.65 \quad (7); \text{ and}$$

$$0.1<|f12/f345|<1.3 \quad (11').$$

2. An imaging lens, as defined in claim 1, wherein when the focal length of the entire system is f, a distance between the second lens and the third lens on an optical axis is D23, the following formula (5) is satisfied:

$$0.05<D23/f<0.85 \quad (5).$$

3. An imaging lens, as defined in claim 1, wherein the first lens is a double concave lens.

4. An imaging lens, as defined in claim 1, wherein when the curvature radius of the object-side surface of the fifth lens and the curvature radius of the image-side surface of the fifth lens are R10 and R11, respectively, the following formula (6) is satisfied:

$$-1.40<(R10+R11)/(R10-R11)<-0.2 \quad (6).$$

5. An imaging lens, as defined in claim 1, wherein an object-side surface of the third lens has negative power at a center and weaker negative power at an axial ray diameter edge, compared with the center.

6. An imaging lens, as defined in claim 1, wherein an image-side surface of the third lens has negative power at a center and weaker negative power at an axial ray diameter edge, compared with the center, or the image-side surface of the third lens has negative power at the center and positive power at the axial ray diameter edge.

7. An imaging lens, as defined in claim 1, wherein an image-side surface of the fourth lens has positive power at a center and weaker positive power at an axial ray diameter edge, compared with the center, or the image-side surface of the fourth lens has positive power at the center and negative power at the axial ray diameter edge.

8. An imaging lens, as defined in claim 1, wherein an image-side surface of the fifth lens has positive power at a center and weaker positive power at an axial ray diameter edge, compared with the center, or the image-side surface of the fifth lens has positive power at the center and negative power at the axial ray diameter edge.

9. An imaging lens, as defined in claim 1, wherein when the focal length of the entire system is f, and the focal length of the first lens is f1, the following formula (1-3) is satisfied:

$$-1.10<f1/f<-0.60 \quad (1-3).$$

10. An imaging lens, as defined in claim 1, wherein when the focal length of the entire system is f, and the focal length of the second lens is f2, the following formula (2-1) is satisfied:

$$0.7<f2/f<1.2 \quad (2-1).$$

11. An imaging lens, as defined in claim 1, wherein when the curvature radius of the object-side surface of the first lens and the curvature radius of the image-side surface of the first lens are R1 and R2, respectively, the following formula (3-1) is satisfied:

$$0.6<(R1+R2)/(R1-R2)<0.90 \quad (3-1).$$

12. An imaging lens, as defined in claim 1, wherein when the focal length of an entire system is f, and the focal length of the fifth lens is f5, the following formula (4-1) is satisfied:

$$1.30<f5/f<2.05 \quad (4-1).$$

13. An imaging lens, as defined in claim 1, wherein the following formula (11") is satisfied:

$$0.2<|f12/f345|<1.2 \quad (11'').$$

14. An imaging apparatus comprising an imaging lens, as defined in claim 1.

15. An imaging lens consisting of:
a negative first lens having a concave object-side surface;
a positive second lens;
a negative third lens;
a positive fourth lens having a convex object-side surface; and
a positive fifth lens, which are in this order from an object side, wherein a stop is arranged between an image-side surface of the first lens and an object-side surface of the third lens, and wherein when the focal length of an entire system is f, and the focal length of the second lens is f2, and the curvature radius of the object-side surface of the first lens and the curvature radius of the image-side surface of the first lens are R1 and R2, respectively, and the focal length of the first lens is f1, and the combined focal length of the first lens and the second lens is f12, and the combined focal length of the third lens, the fourth lens and the fifth lens is f345, the following formulas (2), (3), (7) and (11') are satisfied:

$$0.4<f2/f<1.5 \quad (2); \text{ and}$$

$$0.05<(R1+R2)/(R1-R2)<0.95 \quad (3);$$

$$-1.30<f1/f2<-0.65 \quad (7);$$

$$0.1<|f12/f345|<1.3 \quad (11').$$

16. An imaging lens consisting of:
a negative first lens having a concave object-side surface;
a positive second lens;
a negative third lens;
a positive fourth lens having a convex object-side surface; and
a positive fifth lens, which are in this order from an object side, wherein a stop is arranged between an image-side surface of the first lens and an object-side surface of the third lens, and wherein when the focal length of an entire system is f, and the focal length of the fifth lens is f5, and the focal length of the first lens f1, and the focal length of the second lens is f2, and the combined focal length of the first lens and the second lens is f12, and the combined focal length of the third lens, the fourth lens and the fifth lens is f345, the following formulas (4), (7) and (11') are satisfied:

$$0.99<f5/f<2.10 \quad (4);$$

$$-1.30<f1/f2<-0.65 \quad (7);$$

$$0.1<|f12/f345|<1.3 \quad (11').$$

* * * * *